US005951239A

United States Patent [19]

Averill et al.

[11] Patent Number: 5,951,239

[45] Date of Patent: Sep. 14, 1999

[54] SYSTEM FOR THE PRINTING OF SMALL FLAT OBJECTS USING DIRECT ROTARY PRINTING APPARATUS

[75] Inventors: Michael J. Averill, Salem; William M. Karlyn, Lynnfield, both of Mass.

[73] Assignee: Autoroll Machine Company, L.L.C., Middleton, Mass.

[21] Appl. No.: 08/966,326

[22] Filed: Nov. 7, 1997

Related U.S. Application Data

[62] Division of application No. 08/778,760, Jan. 6, 1997, Pat. No. 5,730,048.

[51] Int. Cl.[6] .................................................. B65G 57/16

[52] U.S. Cl. ........................ 414/801; 198/346.2; 414/908

[58] Field of Search ........................... 198/346.2; 414/27, 414/223, 788.7, 908, 801, 806

[56] References Cited

U.S. PATENT DOCUMENTS

| | | | |
|---|---|---|---|
| 4,143,776 | 3/1979 | Meyers et al. | 198/346.2 |
| 5,165,340 | 11/1992 | Karlyn et al. | 101/126 |
| 5,451,130 | 9/1995 | Kempf | 414/788.7 X |
| 5,456,169 | 10/1995 | Rohwetter et al. | 101/35 |
| 5,609,102 | 3/1997 | Rapp | 101/127.1 |

*Primary Examiner*—Janice L. Krizek
*Attorney, Agent, or Firm*—Herbert L. Gatewood

[57] ABSTRACT

A system for the flexographic printing of compact discs is provided in which the transport member for the compact discs travels in an oval-shaped path. The transport member is made up of individual segments connected together so that each end can be pivoted on a vertical axis. These individual segments are provided with top and bottom rollers that are engaged by a sprocket drive. A support member for a compact disc tooling fixture is attached to each of the individual segments. The flexographic print heads are caused to move at the same rate as the transport member for the compact discs by rack segments that are provided on each of the individual segments of the transport member and which mesh with a toothed gear on the print heads. The flexographic print heads can be moved laterally and radially to provide registration of the decoration to be printed on the compact disc supported by a particular tooling fixture for the compact disc. A vacuum manifold is provided that is mounted to, and moves with, the transport member that supplies vacuum to each of the compact disc tooling fixtures.

16 Claims, 20 Drawing Sheets

SYSTEM FOR THE PRINTING OF SMALL FLAT OBJECTS USING DIRECT ROTARY PRINTING APPARATUS

CROSS-REFERENCE TO RELATED APPLICATION

This is a division of application Ser. No. 08/778,760, filed on Jan. 6, 1997 now U.S. Pat. No. 5,730,048.

BACKGROUND OF THE INVENTION (1). Field of the Invention

This invention relates to a complete system, in its broader aspects, for the printing of relatively small flat objects, e.g. piece parts such as compact discs. The system comprises means for sending the small flat objects from a stack thereof to a means for loading the small flat objects onto transport apparatus, means for loading the small flat objects onto transport apparatus, transport apparatus traveling in an oblong-shaped path to move the objects to one or more printing stations, one or more means mounted so as to face outwardly for the printing of the top surface of the objects with information or a decoration, after which the printed small flat objects are eventually transported to an off-loading station where the objects are off-loaded from the transport apparatus, means for off-loading the objects from the transport apparatus and means for receiving the small flat objects and providing them in a vertically disposed stack. In particular, the invention comprises a method of, and means for, loading and off-loading small flat objects onto and from transport apparatus, means for, and method of, delivering vacuum from a fixed vacuum source to a moving vacuum manifold provided on, and moving in unison with, transport apparatus, and printing apparatus mounted in combination with the transport apparatus for the printing of continuously moving small flat objects. More particularly, the invention relates to means for transferring vacuum from a stationary source to tooling mounted around the perimeter of a transport member or conveyor traveling in an oblong or oval-shaped path. Further, the invention relates, in the more preferred aspects, to flexographic printing means for the multicolor printing of a compact disc, and to means for the lateral and radial adjustment of the flexographic printing roll to print an image on a compact disc. The invention further comprises means for, and method of, determining the variations in height of compact disc tooling fixtures provided on a transport member for compact discs to be printed, as well as the differences in thickness of the compact discs being printed, and to adjust the height of the print roll for the changes in printed surface height.

(2). Background

U.S. Pat. No. 5,165,340 discloses a system for the multicolor printing of a compact disc. This system comprises, in its basic aspects, loading and unloading apparatus, an annular-shaped transport member for compact discs, means in combination with the loading and unloading apparatus supplying the compact discs to the loading apparatus in a vertically disposed stack of compact discs, means in combination with the off-loading apparatus for providing the off-loaded compact discs in a stack of compact discs, and silk-screen printing apparatus in operative combination with the annular-shaped transport member for the multicolor printing of the top surface of the compact discs. On the top surface of the transport member there are provided a plurality of spaced-apart compact disc fixtures, sometimes called tooling fixtures. These fixtures are each provided with a circular-shaped well for holding a compact disc while being transported.

In the silk-screen printing of the top surface of a compact disc, as disclosed in the aforementioned patent, the compact discs are each indexed, in turn, to one or more printing stations whereat a desired decoration is applied to the compact disc surface. Thus, an additional layer of decoration is applied to the compact disc surface at each of the printing stations. The registration of the successive layers of color applied is, in general limited to the ability of the transport member to stop at repeatable locations. Moreover, in order to apply a decoration to the surface of a compact disc by a silk-screen printer, the transport member must be stopped momentarily. This, of course, limits the number of compact discs that can be printed over any given period of time. The problem is magnified, the more layers of decoration that must be applied to the surface of a compact disc and the more tooling fixtures provided on the transport member.

It is common, as disclosed in U.S. Pat. No. 5,165,340, to provide vacuum to each of the tooling fixtures individually so that, once a compact disc is registered for printing in a precise location in the well of the compact disc fixture, the compact disc will stay in that precise location from the time it is loaded onto the transport member until it is off-loaded from the transport member. The vacuum, as disclosed in that patent, is supplied to each of the plurality of tooling fixtures provided on the transport member independently, as and when desired, from a fixed source of vacuum to a vacuum manifold, hence to each of the tooling fixtures.

Although the means for (method of) transferring vacuum independently to each of the compact disc tooling fixtures, as disclosed in U.S. Pat. No. 5,165,340, is quite satisfactory, at least for some applications, nevertheless it has some limitations. The vacuum manifold in that vacuum system is of somewhat complex structure and operation For one thing, the vacuum manifold is defined by an annular-shaped groove located between two surfaces, one of which moves and the other of which is stationary. The stationary surface provides a top to the annular-shaped groove. The annular-shaped groove moves with the moving surface, i.e., the annular-shaped transport member, and is in sliding contact with the stationary surface, i.e., the support member for the silk-screen printing heads. In the stationary member there is provided a vertically disposed opening the upper end of which is connected to a fixed or stationary vacuum source. The annular-shaped groove is provided in opposition to the opening at its lower end. Thus, the surface of the manifold in sliding contact with the stationary surface on the fixed support member must be maintained in tight sealing engagement with that surface to prevent loss of vacuum to the tooling fixtures.

Another limitation with the vacuum system and manifold disclosed in U.S. Pat. No. 5,165,340 is that it is of annular or circular shape. This, in and of itself, presents no particular problem to the printing of the compact discs. The problem results from the fact that, because the compact disc transport member and print head support member are of annular or circular shape, the only way in which to provide for additional printing stations and curing ovens in such a system is to increase the diameter of the transport member and print head support member. This, of course, necessitates a larger diameter vacuum manifold. Such a larger diameter apparatus necessitates larger drive mechanisms due to higher inertial loads and, moreover, results in a higher number of printing errors because of the larger radius components involved. These increases in size of the silk-screen printing machines components, moreover, require a considerable amount of additional floor space. Nevertheless, in some cases, it is impossible, or at least impractical, to increase the diameter of the transport member, etc., due to the lack of floor space that is available for expansion, or space that is of the right size and shape.

For the past several years, the printing of compact discs has been done by silk-screen printing processes and apparatus. Such a printing process is quite advantageous as a relatively thick layer of ink can be applied to the compact disc surface. Thus, it is possible to obtain good coverage and the result is a print image of good quality. The silk screen printing of compact discs is also advantageous because of the fact that it can compensate for the variations in thickness of the compact discs being printed due to the elasticity of the silk-screen Nevertheless, silk-screen printing processes have their limitations. This manner of printing does not provide adequately for the reproduction of images having a high degree of detail and shades of coloring, i.e., halftone printing. Further, the registration of colors in the silk-screen printing of compact discs is best when only a few colors, e.g. four colors, are to be printed. Nevertheless, when a larger number of different colors are to be printed on the surface of a compact disc, as is now being done, and halftones, the registration of the colors shades of color and being silk-screen printed, one-to-the-other, becomes more difficult.

More recently, the printing of the top surface of a compact disc with multiple colors has been accomplished by use of not only silk-screen printing apparatus but also by offset printers in line with silk-screen printers. Such a combination is disclosed in U.S. Pat. No. 5,456,169. With offset printing one can obtain a print image with a high degree of fidelity and in a large number of colors and color shades, i.e., halftones. The use of a combination of printers, as disclosed in that patent, is apparently because of the fact that the amount of ink that can be put down on a surface by an offset printer is somewhat limited. Thus, the desired opacity of the ink placed on a substrate by offset printing may be lacking. Accordingly, a silk screen printer is used to put down a first layer of ink, e.g., a white background layer, to provide the desired opacity so that the color of the surface to be printed is hidden. Then, the surface is printed by an offset printer.

The combination of printers, as disclosed in U.S. Pat. No. 5,456,169, is undesirable, however, for a number of reasons. First of all this combination of printers suffers from the same problem in using silk-screen printers alone, i.e., the transport member must be indexed to a silk-screen printing station, stopped, and then the compact disc is printed. Not only is the transport member in this combination indexed for the silk-screen printing of the compact discs, it is also indexed to an offset printing station, stopped, and then the compact disc is printed. Moreover, the use of offset printers for the printing of compact discs presents its own problems.

In the offset printing process disclosed in U.S. Pat. No. 5,456,169, each of four partial print images is transferred by a plate cylinder in usual manner to a generally continually rotating printing or blanket cylinder. The four partial images go together to form an overall print image. This overall print image is then transferred onto the compact disc surface. This presents a problem, however, in the registration of one color/partial image to the next as the colors are each first printed, in turn, onto a transfer blanket, wet ink upon wet ink, and then transferred from that blanket as a single image to the compact disc surface. The printing of wet ink upon wet ink disadvantageously results in bleeding from wet ink to wet ink and changes in color tones.

The transfer blanket or means on the blanket cylinder does not extend over the entire periphery of the cylinder and comprises a plurality of transfer means, each two of which is divided by a space. Thus, the blanket cylinder has two different radii, one for the surface of the transfer blanket means and another for the empty space between. Thus, there is only intermittent contact by the printing cylinder with the plane of the surface of the article to be printed. Therefore the printing cylinder can continuously rotate without need for the printing cylinder to be raised following the printing of a compact disc. This is believed of little advantage, however, as the transport member disclosed is an indexing one and printing only occurs when the compact disc is stationary.

As disclosed in U.S. Pat. No. 5,456,169, there is a need to take into consideration in the offset printing process not only the variations in thickness of the compact discs, but also the need to consider variations in thickness and configuration of the printing blanket or transfer means on the printing cylinder. Thus, prior to being offset printed the position, i.e., the level of the surface of the compact disc, is determined by a sensor, and the sensor's output sent to a computer and stored therein, later to be called out. A sensor device is also associated with the surface of the transfer blanket portions on the printing cylinder whereby the positions of those surfaces can be determined and an output signal sent to the computing arrangement and stored. These two components determine the height at which the offset printing arrangement, i.e., the printing cylinder mounted thereto, should be during the printing operation relative to the surface to be printed and whether the printing arrangement should be adjusted upwardly or downwardly from a previously determined base plane, to produce the best pressure effect of the transfer surface against the surface to be printed. Thus, signals are sent from the computer arrangement disclosed to an adjusting motor whereby the frame of the printing arrangement is caused to be raised or lowered relative to the surface of the compact disc to be printed. The adjusting motor operates to cause a slide member having two inclined surfaces in contact with two rollers associated with the frame to move in a back and forth direction depending upon the height adjustment to be made. Although, this method for the adjustment of the printing cylinder relative to the plane of the surface to be printed would appear to provide satisfactory results, the apparatus for accomplishing such seems overly complex.

U.S. Pat. No. 5,456,169 also discloses means upstream of the offset printing station for detecting whether there is a compact disc present on the holder therefor to be printed. That signal is sent to the computer, and later called out to provide a web of paper on which the image can be printed that should have been printed on the missing compact disc. The reason for this is so that the print plates will not print a second image upon the one still remaining on the transfer blanket.

Of further concern with the offset printing apparatus and process disclosed in the above-mentioned patent, is the fact that offset printing does not perform well in combination with an annular-shaped transport member, such as disclosed in U.S. Pat. No. 5,165,340, or other transport members that travel in a circular defined path of travel, as disclosed in U.S. Pat. No. 5,456,169. Such a printer performs best when it is located in a straight line path of travel, like in the printing of newspapers. Thus, the offset printer in the latter patent is located in relation to the circular-shaped transport apparatus so that the printing cylinder can be moved laterally during the printing operation, i.e., in a direction perpendicular to that taken by the doctor blade during the silk-screen printing operation Accordingly, there is believed a real need for a printing system for piece parts, e.g., compact discs, that does not involve an indexing transport member. Further, there is need for a printing system that is capable of printing a compact disc surface while the compact disc is in continuous motion whereby a larger number of compact discs can be printed over a given period of time. There is also a need for a printing system that is capable of printing the surface of a compact disc without need for first printing the compact disc by silk-screen printing means to provide a layer of ink that provides good opacity. Also there is need for a printing system capable of printing a multiplicity of colors and halftones on the surface of a compact disc with precise registration of the different colors and shades of color being printed. There is also a need for a method of, and means for, transferring vacuum from a fixed source of vacuum to a vacuum manifold moving in conjunction with transport apparatus independently to at least one of a plurality of tooling fixtures provided on the transport apparatus, when and as desired. Further, there is a need for a better method of, and apparatus for, adjusting for the variations in thickness in compact discs to be printed, in a printing run, and for adjusting to variations in the height of the compact disc tooling fixtures.

Flexographic printing, i.e., direct rotary printing, has heretofore long been used; however, that use has been primarily in the printing of web press or corrugated carton technology. In such an application, the substrate to be printed is passed between the impression plate, which is mounted on the impression roll, and the pinch roll. The gap between the impression roll and pinch roll, in such an application, is adjustable to account for the thickness of the substrate that is being passed between these two rolls. Moreover, the impression roll and pinch roll are geared together to assure that the substrate being printed passes between the two rolls at a constant speed. Flexographic printing has, until the recent past, been used to deposit print in low definition applications such as earlier named. Recently, however, due to quality control in inks and anilox rolls, as well as advances in the technology used to manufacture the print plates, higher definition printing has become possible.

In flexographic printing, a thicker layer of ink can be put down on a surface than in the case of offset printing. Thus, flexographic printing offers the advantage that a layer of ink or decoration put down on a substrate provides better opacity than does offset printing. Flexographic printing offers the advantage also of a direct rotary printing process and apparatus of somewhat simpler construction than found with offset printers. Further flexographic printing is a continuous process and printing is done on the fly so-to-speak.

Thus, it would be quite advantageous if flexographic printing technology could be adapted to the printing of piece parts, e.g., compact discs. To do so, however, requires a considerable number of changes to be made to the design of conventional flexographic printing apparatus. In the printing of compact discs, the pinch roll in the flexographic printing apparatus needs to be removed. And, the tooling fixture for the piece part needs to be substituted for, and take the place of the pinch roll. The nip in this case is between the printing or impression plate and the top surface of the compact disc tooling fixture. Accordingly, it is of utmost importance that the nip between the tooling fixture top surface (and piece part surface to be printed) and the impression plate or roll has a precise and repeatable height, as would be the nip between the pinch roll and impression roll in printing web stock. This is made somewhat difficult, however, due to the fact that the tooling fixtures do not, in and of themselves, have top surfaces that are all of the same height from the top planar surface of the transport member. This results from the lack of reproducibility in the tolerances of the tooling fixtures one from another. In the printing of compact discs, this can be a real problem where the transport member may have a large number of tooling fixtures. At present time, a transport member may have as many as thirty-nine (39) or more tooling fixtures. And, in the future, it is likely that even a much larger number of tooling fixtures will be provided on a transport member. Further, the problem is somewhat compounded because the thickness of the compact discs may themselves vary due to differences in the molds for molding the compact discs, and other processing irregularities.

Another problem presented by removing the pinch roll and replacing it with a compact disc fixture, in the case of the flexographic printing of the surface of a compact disc, results from the fact that the means for ensuring that the compact disc passes through the nip formed by the print roll and tooling fixture at a constant speed is removed. The two are not geared together as are the print roll and pinch roll in conventional flexographic printing. Thus, the means for preventing slippage and for maintaining the compact disc at a constant speed while passing through the printing station is not present. Moreover, the lack of such a means to maintain constant speed effects the registration between the image on the print roll and the location on the compact disc surface where the image is to be printed.

A still further problem in the application of flexographic printing technology to the printing of compact discs results from the fact that the tooling fixture may not always have a compact disc thereon to be printed. This can come about because of several reasons known to those skilled in the art, e.g., a compact disc is not sent by the sender to the loading apparatus, or the loading apparatus does not, for some reason, load a compact disc into a tooling fixture. Even though no compact disc is present in the tooling fixture, the anilox roll nevertheless conventionally transfers ink to the printing plate on the print roll and another layer of ink is transferred to the printing plate after the anilox roll next passes through the ink source.

There is a need therefore, in the application of flexographic printing technology to the printing of compact discs, for means for determining that the nip between the top surface of a compact disc tooling fixture and the printing roll has a precise and repeatable height, as would the nip between the pinch roll and impression roll in printing web stock. There is also a need for means to, determine, and to provide for, the differences in the heights of the compact disc tooling fixtures, and the compact discs themselves being printed in the flexographic printing of compact discs. Further, there is need for means in such a printing process to provide that a compact disc passes through the nip formed by the print roll and tooling fixture at a constant speed. And there is also a need to alert the printing roll in advance, that no compact disc is present in a tooling fixture to be printed.

SUMMARY OF THE INVENTION

The present invention has as a primary object the realization of a method of, and means for, printing the top surface of a small relatively flat, piece part by printing apparatus not having the problems and disadvantages now found in such a manner of printing.

Another object of the invention is to provide an improved system for, and method of, printing the top surface of a flat piece part.

Another object of the invention is to provide a system for, and method of, printing the top surface of a flat piece part utilizing direct rotary printing, i.e., flexographic printing, technology.

Another object of the invention is to provide a system for the multicolor printing of the top surface of a compact disc using either silk-screen or flexographic printers.

Another object of the invention is to provide a system for the multicolor printing of compact discs that can be adapted to the use of offset printers, letter flex printers, ink jet printing, and continuous motion reciprocating screen printers and rotary screen printers.

Another object of the invention is to provide a method of, and means for, direct rotary printing of compact discs whereby each color of ink is applied separately and a greater amount of ink is applied than can be applied with offset printing.

Another object of the invention is to provide apparatus for, and method of, the multicolor printing of compact discs where good opacity is obtained.

Another object of the invention is to provide means for the direct rotary printing of compact discs of relatively simple construction Another object of the invention is to provide means for the direct rotary printing of compact discs having relatively few working parts, compared to a means for the offset printing of a compact disc.

Another object of the invention is to provide means for, and method of, printing the surface of a compact disc with multiple colors each in precise registration one to another.

Another object of the invention is to provide means for, and method of, printing the surface of a compact disc with one or more layers of decoration while the compact disc is being continuously moved.

Another object of the invention is to provide means for, and method of, multicolor printing of compact discs without bleeding from one ink applied to another.

Another object of the invention is to provide means for, and method of, printing a compact disc that does not involve indexing of a compact disc to a printing station.

Another object of the invention is to provide means for, and a method of, printing compact discs whereby a larger number of compact discs can be printed over a given period of time than where the compact disc is stationary while being printed.

Another object of the invention is to provide a process for printing on individual flat piece parts, using direct rotary printing, to produce high-quality print images even when the height of the tooling fixtures and the thickness of the piece parts may vary.

A further object of the invention is to provide means for, and method of, sensing the variations in heights of the compact disc tooling fixtures and the thickness in the compact discs being printed.

A further object of the invention is to provide means for, and method of, sensing the variations in heights of the compact disc tooling fixtures and the thickness in the compact discs being printed and to provide means for using that information in the adjustment of the nip between the print roll and the top surface of the compact disc tooling fixture.

A still further object of the invention is to provide means for, and method of, determining the size of the nip formed between the print roll and the surface of the compact disc tooling fixture and for ensuring that such has a precise and repeatable height.

Another object of the invention is to provide flexographic printing apparatus for the printing of compact discs wherein means is provided to maintain travel of the compact discs at constant speed while passing through the nip formed by the print roll and the top surface of the compact disc tooling fixture.

Another object of the invention is to provide means for, and method of, adjusting the height between the impression roll of a flexographic printer and the top surface of each of a plurality of tooling fixtures located on a transport member for the printing of compact discs whereby such height is precise and repeatable.

Another object of the invention is to provide means for, and method of, adjusting the height between the impression roll of a flexographic printer and the surface of a plurality of tooling fixtures involving only a single height sensing system to sense the height of the tooling fixture and a single sensing system to sense the thickness of the compact disc.

Another object of the invention is to provide means for lateral and radial adjustment of a flexographic print roll relative to the location of a compact disc on a tooling fixture.

Another object of the invention is to provide means for, and method of, providing registration between the area of the surface on the print plate to be transferred and the area of the surface that is to be imprinted.

Another object of the invention is to provide means which functions not only to drive a flexographic print roll but also to provide for registration of the pattern on the print roll to be printed on a compact disc relative to the location of the compact disc on a tooling fixture.

Another object of the invention is to provide means for the loading of compact discs onto transport apparatus from a stack of compact discs and the off-loading of compact discs from the transport member and to provide them in a stack of compact discs.

Another object of the invention is to provide means for lifting a compact disc off a platen for loading onto a tooling fixture on a transport member, such means having detection means for determining the presence or absence of a compact disc to be printed.

Another object of the invention is to provide a method of, and apparatus for, moving the anilox roll of a flexographic printer into and out of engagement with a printing plate when there is no piece part in the tooling fixture provided on the transport apparatus to be printed.

Still another object of the invention is to provide transport apparatus or a conveyor for the transporting of a plurality of compact discs to be printed in a path of travel that is best suited for the use of direct, rotary printing apparatus.

A further object of the invention is to provide transport apparatus for the transport of compact discs to be printed which provides a continuous and closed path of travel.

A further object of the invention is to provide transport apparatus for the transportation of compact discs to be printed in a path of travel whereby performance of the direct rotary printer is optimized.

A further object of the invention is to provide a conveyor or transport apparatus that is of a shape that it provides one or more straight line paths of travel that allows for the best performance of direct rotary printing apparatus.

Another object of the invention is to provide transport apparatus for the transport of compact discs to printing stations that defines an oblong or oval-shaped path of travel.

Another object of the invention is to provide means for holding a piece part in a precise location once loaded onto the transport apparatus for later performance of work thereon.

Another object of the invention is to provide means for, and method of, transferring vacuum from a stationary vacuum source independently to each of a plurality of moving tooling fixtures provided on the transport apparatus for holding a piece part, e.g. a compact disc, in a precise location for printing.

A further object of the invention is to provide a vacuum manifold mounted to an endless conveyor or transport apparatus moving in a defined, continuous path of travel whereby vacuum can be transferred from a fixed or stationary source of vacuum independently to each of a plurality of spaced apart locations provided along the length or perimeter of the transport apparatus.

Still another object of the invention is to provide a vacuum manifold moving in combination with an endless conveyor or transport apparatus moving in a defined, continuous path of travel whereby vacuum can be transferred from a fixed or stationary source of vacuum independently to each of a plurality of tooling fixtures for compact discs or other flat objects.

A still further object of the invention is to provide a method for transferring vacuum from a fixed source of vacuum to a moving vacuum manifold mounted to a moving conveyor whereby the vacuum can be tapped and controlled at any particular location around the periphery of the conveyor, as and when desired A further object of the invention is to provide a vacuum manifold mounted to transport apparatus for the transportation of piece parts from one location to another wherein the transport apparatus is not limited to any particular shape or path of travel.

In accordance with the present invention, the foregoing and other objects are achieved by a process of, and apparatus for, the direct rotary printing of a piece part while the piece part is moving and wherein the variations in heights of the surface of a tooling fixture and the variations in thickness of the piece parts are taken into consideration to provide a repeatable nip between the printing plate and the top surface of the tooling fixture.

BRIEF DESCRIPTION OF THE DRAWINGS

For a better understanding of the present invention, reference should be made to the following detailed description of a preferred embodiment of the invention which is to be read in conjunction with the accompanying drawings, in which.

DETAILED DESCRIPTION OF THE INVENTION AND THE PREFERRED EMBODIMENTS THEREOF

Although the present invention will be described hereinafter with particular reference to the accompanying drawings, it is to be understood at the outset that it is contemplated that the present invention may be varied in specific detail from that illustrated and described herein while still achieving the desirable characteristics and features of the present invention. Accordingly, the description which follows is intended to be understood as a broad enabling disclosure directed to persons skilled in the applicable arts, and is not to be understood as being restrictive.

Figure 1:
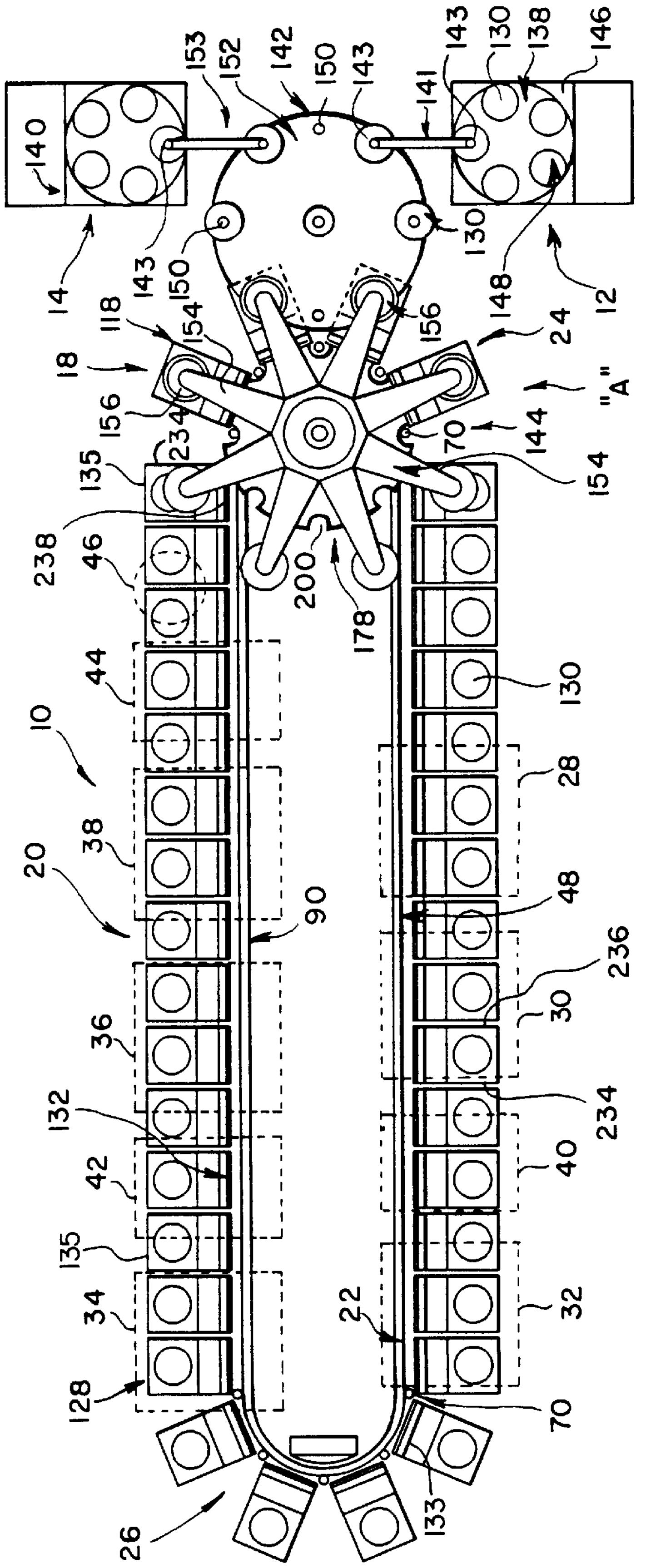
FIG. 1 is a schematic representation of a top plan view of a system for the multicolor printing of compact discs according to one aspect of the invention showing transport apparatus comprising a transport member or conveyor comprising a drive chain comprising a plurality of pivotal individual drive segments or links, support means for holding a tooling fixture for the holding of a compact disc being provided on each drive segment, sprocket drive means for driving the transport member shown at the right side of the figure, means for the sending of compact discs one-at-a-time from a stack of compact discs to a loading/unloading means via platen apparatus, means for loading the compact discs one-at-a-time in spaced-apart locations onto the transport member for the compact discs whereby the compact discs are, each in turn, transported to printing and other work stations in an oblong-shaped path of travel to an unloading station whereat the compact discs having been printed are one-at-a-time off-loaded by the loading/unloading means from the transport apparatus to platen apparatus, to receiving means for providing the off-loaded compact discs into a plurality of stacks of compact discs via the platen apparatus.

Turning now to FIG. 1 of the drawing, there is shown in that figure a system for the multicolor printing of a plurality of compact discs. The printing system comprises apparatus means 10 for the transportation of compact discs from a loading point 12 to an unloading point 14. This transportation apparatus comprises, in its most basic aspects, a segmented drive chain 16 (better seen in FIG. 8) for driving the transportation apparatus in the direction indicated by the arrow (FIG. 1), and a sprocket drive means 18, best shown in FIGS. 2 and 12 of the drawing.

As shown in the drawing, the transportation apparatus travels in a predetermined path of travel of oblong or oval shape defined by two straight runs referred to, in general by reference numerals 20,22, the ends of which are connected together by curved runs or paths of travel designated generally by reference numerals 24,26. Thus, there is provided a continuous path of travel.

The compact discs 130, in being conveyed from the loading point 12 to the unloading point 14, are passed through a number of different work stations, e.g., printer stations 28, 30,32, 34, 36, and 38, and ultraviolet cuing ovens 40,42, and 44, and inspection station 46. The number of printing stations and UV curing ovens as well as their location in the path of travel can, of course, vary from the number and location set forth above, this depending somewhat upon the number of different colors of ink to be applied to the surface of the compact disc. The length of the straight runs in the path of travel can be varied also, depending somewhat upon the number of printing stations to be provided and UV curing ovens. The radius of the curved paths of travel will depend largely upon the lateral distance between the parallel straight runs or paths of travel 20, 22. This lateral distance will be determined in large part by the printing stations, i.e., the length of the print roll and print roll shaft, and other components of the printing station.

The printing stations shown in FIG. 1 comprise direct rotary printers for the flexographic printing of the surface of a compact disc, to be described more in detail later on. Each printing station will apply a single color or decoration to the compact disc surface. Thus, for example, at the first printing stations the top surface of the compact disc can be printed with a white background, if desired. A clear lacquer can be applied to the decorations applied to the compact disc surface, at the sixth printing station, as a means of protection of the decorative printing. At the other printing stations, the compact disc can be printed with another of the colors, e.g., red, blue, yellow, and black, thus providing the compact disc surface with the desired decoration or information. A decoration comprising halftones can be printed on the compact disc surface. Importantly, as shown in FIG. 1, the flexographic printers are provided in a straight run of the oval defined path of travel of the transportation apparatus.

Although the printing stations shown in FIG. 1 comprise direct rotary printers, i.e., flexographic printers, this need not necessarily be the case. The printing system of the invention can, if desired, comprise a combination of flexographic and silk-screen printers such as disclosed in U.S. Pat. No. 5,165,340, earlier mentioned. Nevertheless, this is much less preferred. Where only direct rotary printers, i.e., flexographic printers, are provided in the printing system of this invention, the compact discs or other flat objects being printed can be printed, quite advantageously, while being continuously moved in the path of travel of the transport apparatus. Thus, more compact discs can be printed over the same period of time than when the compact discs are printed with a combination of flexographic and silk-screen printing apparatus. The indexing of the transport apparatus to a silk-screen printing station and printing the compact disc while stationary is much less productive than printing the compact discs on the run.

The printing system can, if desired, comprise only silk-screen printing stations. Those skilled in the art will appreciate that where only silk-screen print heads, as disclosed in the above-mentioned patent are used in the printing system of the invention that the path of travel can be circular, if desired, rather than of oval shape, as disclosed in FIG. 1. In this case, each compact disc will be indexed in turn to a printing station, printed while stopped at the print station, and then indexed to the next printing or work station in usual fashion.

Rather than silk-screen printers such as disclosed in the above patent, continuous motion, reciprocating silk-screen printers such as conventionally used in the silk-screen printing of bottles can also be used in the practice of the invention. In this case, the squeegee is held stationary over a silk-screen that reciprocates back-and-forth in the direction of travel of the transport member hereinafter disclosed. A continuous motion rotary screen printer such as used in the printing of wall paper can also be used in the practice of the invention.

Although the invention is hereinafter disclosed more fully in the use of a flexographic printer in the printing system, those skilled in the art will readily appreciate that the invention is not so limited. Various means for printing can be used in the practice of the invention, not just the direct rotary printer and silk-screen printers above-disclosed. For example, a letter flex print head can also be used, as can also an ink jet printer. These printers are somewhat less desirable than a flexographic printer, however, due to their particular operating characteristics, as will be readily appreciated by those skilled in the art. Although somewhat less desirable than a direct rotary printer, for the reasons earlier disclosed, an offset printer can also be used in the practice of the invention.

Nevertheless, whether the printing system comprises all print heads of one kind, preferably all flexographic print heads, or another as above disclosed, or a combination of, e.g., flexographic and silk-screen print heads, the print heads or print rolls are mounted so as to face outwardly across the transport apparatus and the compact disc being printed. This is quite advantageous as the foot print of the system can be kept to a much smaller size than where the print heads and rolls are mounted so as to face inwardly across the compact discs being printed. Of further advantage with such an arrangement is the fact that set up for printing in any particular run is made considerably easier. It will be appreciated that rotary printing takes place in the direction of travel of the transportation apparatus, i. e. laterally to the axis of the flexographic printing roll.

The compact discs, after being printed, and just prior to being off-loaded are each subjected to visual inspection for defects, e.g. lack of proper color registration, or overlapping of one color with another, by the inspection equipment 46. Visual inspection equipment suitable for this purpose is available commercially from Autoroll Machine Company LLC, the assignee of the instant patent application, under the trade designation "AUTOVISION." Nevertheless, this visual inspection equipment, in and of itself, forms no part of the present invention and is not believed to require any detailed description herein. Other such commercially available equipment can be used for the same purposes.

Figure 8:
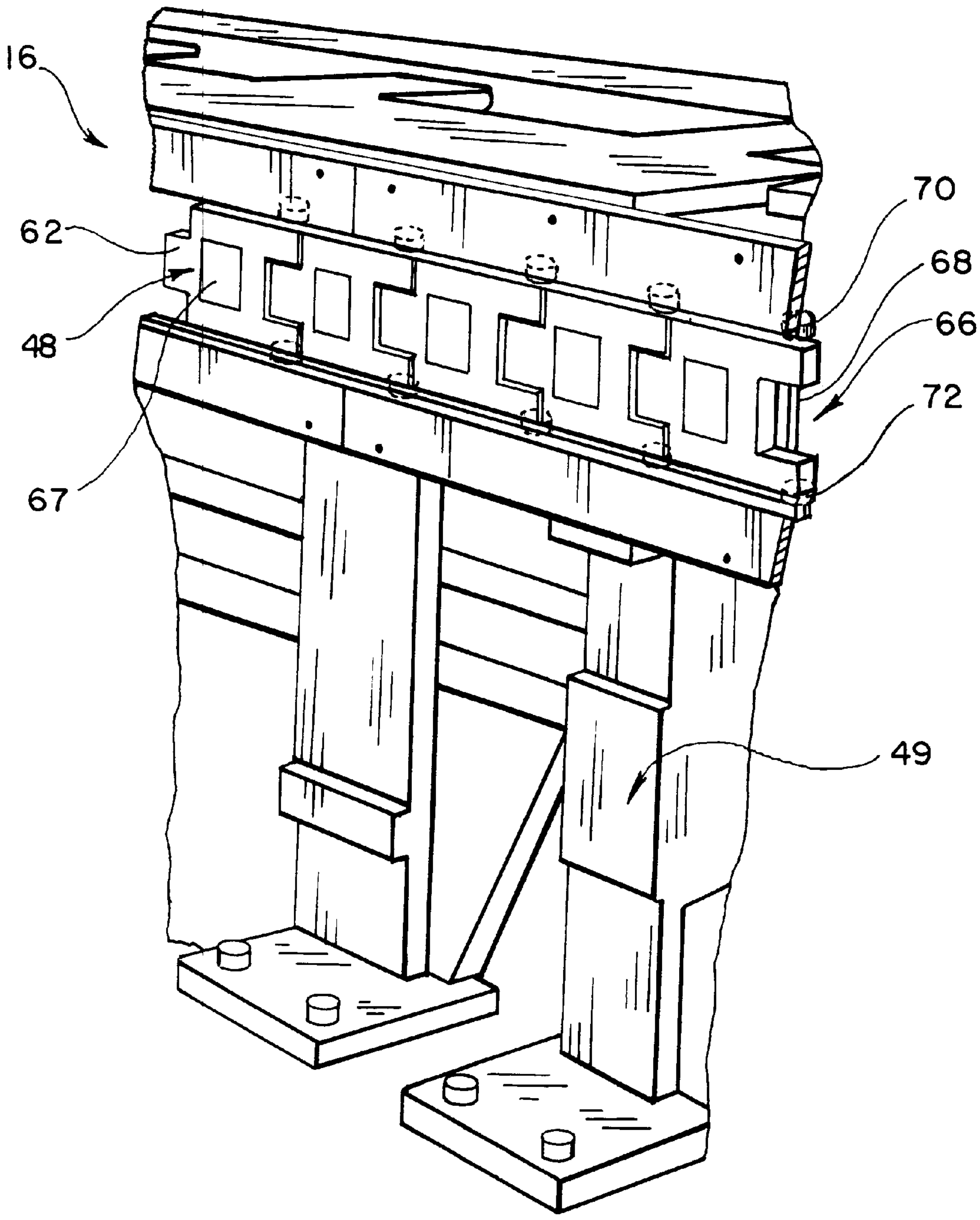
FIG. 8 is a perspective view showing only a portion of the segmented drive chain of the transport apparatus disclosed in FIG. 1, taken from the right end as seen in FIG. 1, showing the top and bottom rollers of a drive chain segment within the top and bottom guide rails and next adjacent segmented drive members being connected together, but not showing the support means for the compact discs, the printing stations or other work stations, the sending and receiving means, the means for loading/off-loading the compact discs each in turn into or off of a tooling fixture for the compact disc provided on the support means, and the vacuum system for holding the compact discs each in a precise location in the tooling fixture therefor so as to better show just the segmented drive member.

The segmented drive chain 16 comprises a plurality of individual segments or links 48 connected together in serial fashion, as best seen in FIG. 8. For sake of clarity in showing the individual links 48 of the segmented drive chain, the support means for the compact disc fixtures that are fixedly connected to each of the individual segments or links of the segmented drive chain are not shown in this figure of the drawing. The segmented drive chain 16 is supported by a plurality of vertically disposed support members identified in general by the reference numeral 49. These support members are fixedly mounted at their bottom ends to the floor, or a base member mounted to the floor, in conventional manner.

Figure 9:
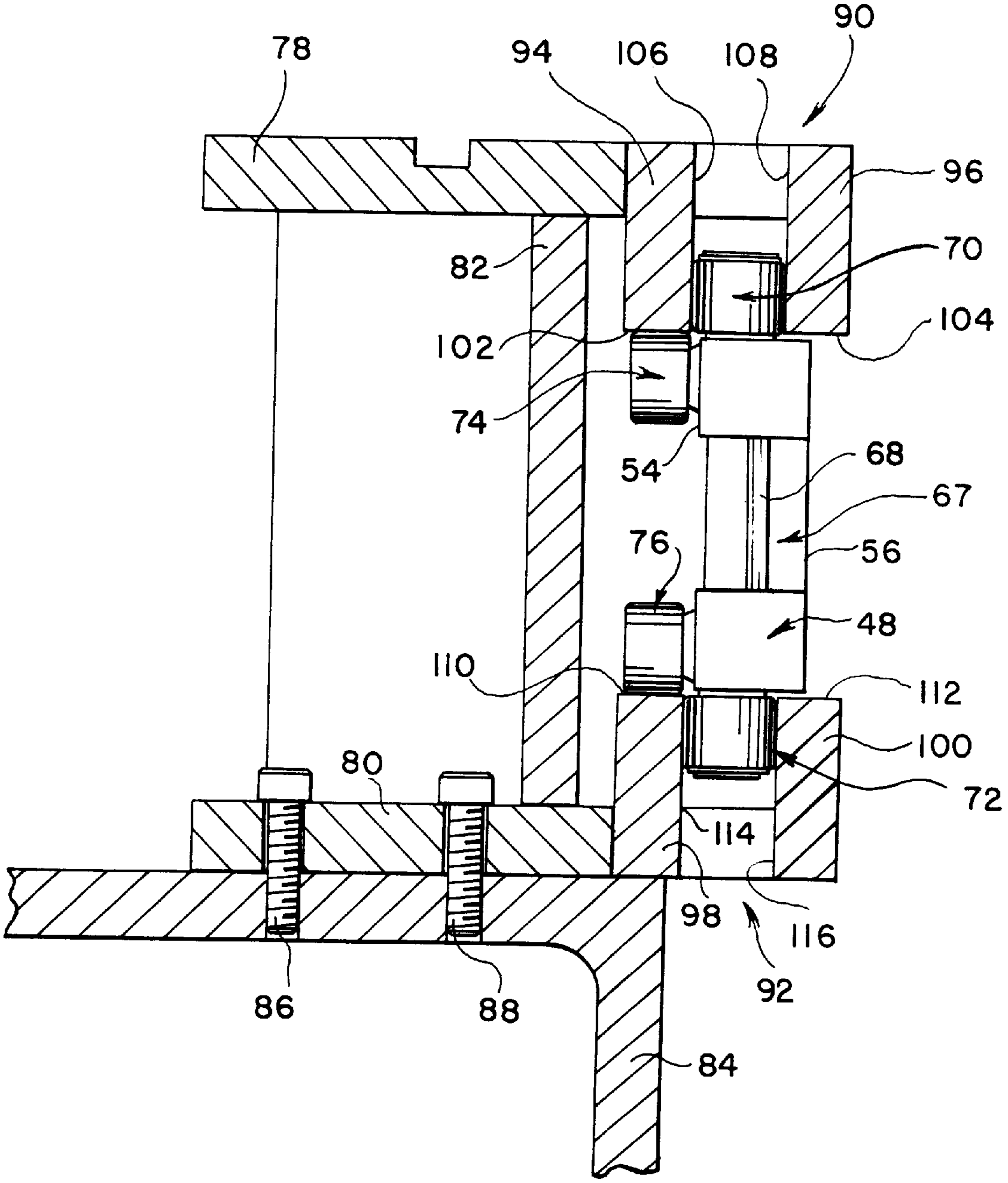
FIG. 9 is a schematic end view showing in cross-section a portion of the body member for supporting the segmented drive chain shown in FIG. 8, the side rails fixedly secured thereto, and the front end of one of the individual drive segments or links of the segmented drive chain for the transport apparatus, and showing the top and bottom rollers provided on a drive chain segment located between the inner surfaces of the opposed guide rail members, and the top and bottom inner rollers in rolling engagement with the opposed top and bottom surfaces of the inner guide rail members, but not showing the support means for a compact disc fixture being connected to the outer surface of the drive chain segment or the vacuum manifold and valving of the invention being connected to the compact disc fixture.
Figure 10:
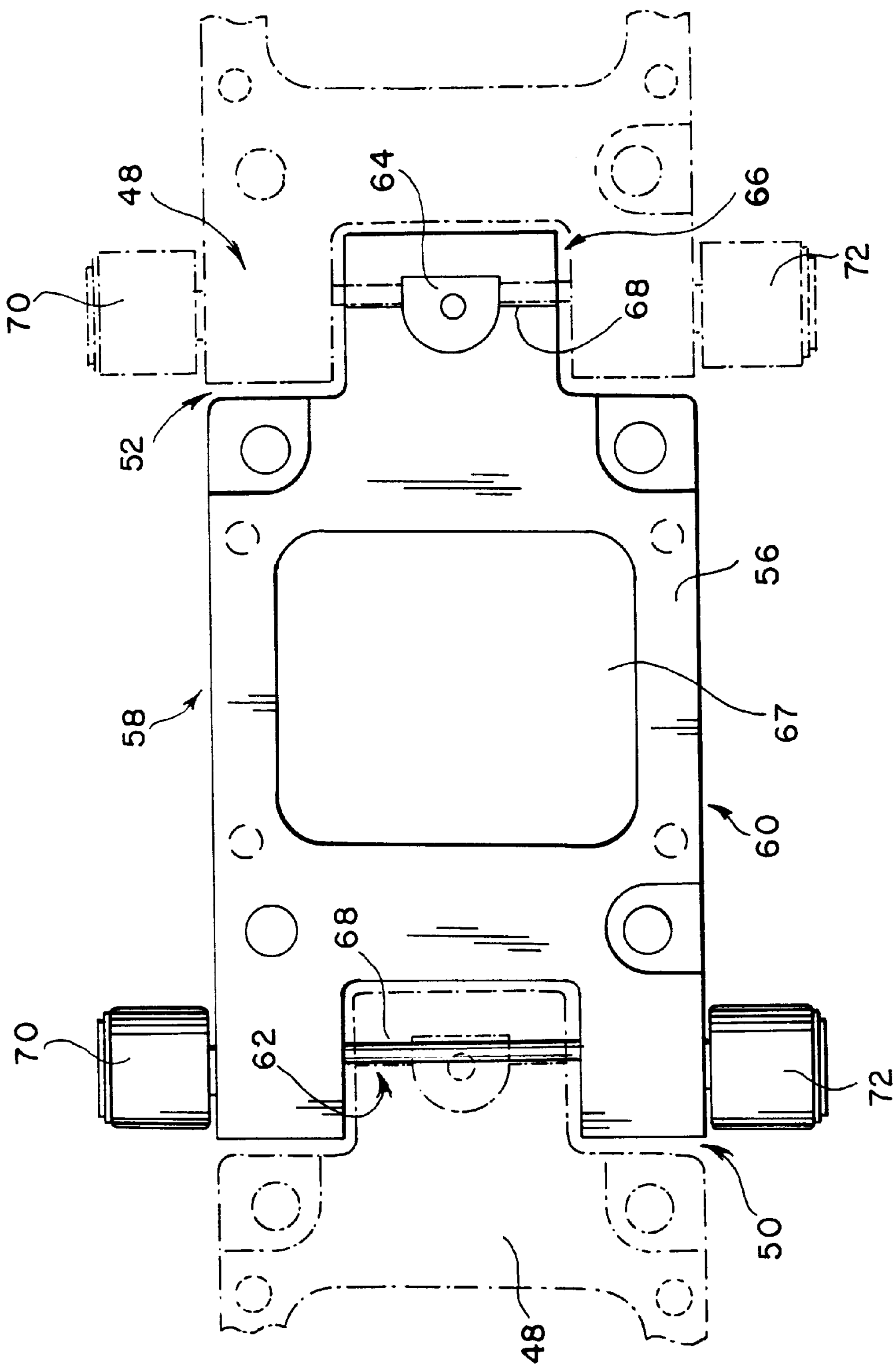
FIG. 10 is a side view of a drive chain segment of the segmented drive chain shown in FIG. 9 (but not showing the top and bottom guide rails) showing the front and back ends thereof and the top and bottom rollers at the front end of the drive chain segment which are engaged by the cut-outs or teeth of the sprocket drive members for driving the segmented drive chain for the transport apparatus and the vacuum manifold mounted thereto (not shown in this figure) in the oblong defined path shown in FIG. 1, showing the opening in the drive chain segment for location of the means connecting the vacuum manifold to the tooling fixture, but not showing the means connecting the vacuum manifold to the tooling fixture, and showing how two next adjacent drive chain links are connected together.

The individual segments 48 of the segmented drive chain, as best shown in FIGS. 9,10, are each defined by a front end 50 and a back end 52, and by inner and outer surfaces 54, 56. The front and back ends 50, 52 of each of the individual segments are, in turn, defined by top ends 58 and bottom ends 60, these ends of the individual segments all being in the same vertically disposed plane and the individual segments being connected together in serial fashion as will be appreciated from FIGS. 8, 10 of the drawing. The top and bottom ends of the individual segments or links 48 are also each provided in the same horizontally disposed planes, these planes being in parallel disposition to one another and to the floor on which the drive chain is mounted.

The back ends 52 of the individual segments 48 are each provided with a tongue 62 having a connecting member 64 for connection of the drive chain segment or link to the next adjacent segment behind it at the front end 50 in the opening 66. This is accomplished by a vertically disposed elongated shaft member 68 defined by an upper end and a bottom end (FIG. 8) passing through the connecting member 64. To the ends of the vertically disposed shaft member 68, which is fixedly secured relative to the top and bottom ends 58, 60 of the link, are rotatably mounted a top roller 70 and a bottom roller 72.

On the inner surface 54 (FIG. 9) of each of the individual segments 48, at both the front end 50 and the back end 52, there are mounted top and bottom rollers, only the top and bottom rollers 74,76 at the front end of the drive chain segment 48 being shown in the drawing. The top and bottom rollers 74,76 are each mounted for rotation in conventional fashion to the inner surface 54 of the drive chain segment by horizontally disposed shaft members (not shown in the drawing).

Thus, rollers 74, 76 rotate in horizontally disposed planes parallel to one another and in the same vertical plane. The top and bottom rollers 70, 72 rotate in the same vertically disposed plane and in horizontal planes parallel to one another. The reason for these top and bottom rollers or bearing members 70,72, and rollers or bearing members 74, 76 will soon be made clear.

There is shown in FIG. 9 of the drawing, in cross section, a fixed U-shaped body member of the segmented drive chain 16 comprising horizontally disposed, spaced apart top and bottom members 78, 80 in parallel disposition to one another. These two members are fixedly connected together by a vertically disposed body member 82. The bottom member 80 is connected to another body member 84 of the segmented drive chain in conventional fashion by means of threaded fasteners 86,88. The member 84 can be a member fixedly secured to a support member 49 (FIG. 8), or member 84 can be mounted to a member that is secured to such a support member.

At the outer ends of the elongated top and bottom members 78, 80 there are fixedly attached, e.g. by threaded fasteners (not shown), elongated top and bottom guide rails 90, 92. These guide rails define the parallel straight line paths 20,22 of the segmented drive chain for the transport apparatus for the compact discs. The guide rails 90, 92 each terminate at one end at the sprocket drive means 18 (FIG. 1) for the segmented drive chain. At the opposite end of the segmented drive chain, i.e., the end opposite the sprocket drive means end, the straight line runs 20, 22 are connected together merely by a single top and bottom curved portion. These curved portions are pushed outwardly so as to maintain tension on the drive chain. The straight line runs 20,22 comprising the guide rails are equal in length and parallel to one another, the ends of each terminating in the same vertical plane.

The guide rails 90, 92 (FIG. 9) each comprises a pair of vertically disposed, inner and outer, guide rail members designated 94, 96 and 98, 100, respectively. The guide rail members 94, 96 in the top guide rail 90 each comprises a horizontally disposed, planar bottom surface, these being in the same horizontal plane and designated by reference numerals 102, 104. Further, these guide rail members each comprises an inner planar surface, noted by reference numerals 106, 108, respectively, these inner surfaces being in opposition and parallel to one another in vertically disposed planes, as shown in the drawing. The bottom vertically disposed, spaced apart, guide rail members 98, 100 are provided with top planar surfaces 110, 112 and inner, planar surfaces 114, 116. The inner planar surfaces of the guide rail members of guide rail 90 are in the same spaced-apart, parallel, vertical planes as are the inner planar surfaces of the guide rail members of the guide rail 92. The bottom horizontally disposed surfaces of the guide rail members in the top guide rail 90 are in the same horizontal plane, and the top horizontally disposed surfaces 110, 112 of the bottom guide rail members 98, 100 are in a horizontal plane parallel to that plane in which the bottom surfaces 102,104 of the top guide rail members are provided. Although the surfaces 104 and 112 are shown in the drawing to be planar, this need not be the case. These surfaces do not provide a bearing surface and can be of any shape desired.

As can be seen from FIG. 9, the top and bottom rollers 70, 72 are located in the respective spaces provided between the opposed top guide rail members 94,96 and the bottom guide rail members 98, 100. These spaces are only slightly greater than the diameter of the rolls 70,72. With a load applied to the drive chain segment, i.e., when the support means 118 (FIG. 3) for the compact disc tooling fixtures 128 is mounted thereto, these rollers are in rolling contact with the inner surfaces 108,114 of the guide rail members 96, 98. The space between the opposed guide rails must be somewhat larger than the roll diameters; otherwise, the rolls will try to roll on the respective opposed inner surfaces, the result being that the rolls merely skid along, rather than roll.

The top and bottom rollers 74,76 provided on the inner surface of the drive chain segment (like rollers not shown being provided at the back end of each drive chain segment) are in contact with the opposed bottom and top surfaces 102, 110 of the inner guide rail members 94, 98 and roll on these parallel, horizontally disposed surfaces. Thus, the drive chain segments 48 of the segmented drive chain 16 are each maintained in the same vertical and horizontal disposition in their course of movement in the defined continuous oblong-shaped path of travel In other words, the outer surface 56 of all the drive chain segments are provided in the same vertical plane and the bottom end 60 of all the drive chain segments are provided in the same horizontal plane.

The segmented drive chain 16 for the transport apparatus and sprocket drive means 18, in and of themselves, form no part of the invention. The drive chain used in the practice of the invention is sometimes referred to in the art as a "precision link conveyor." Such a drive chain or conveyor is commercially available from Swanson-Erie Corp., Erie, Pa. under the trade designation"PL Series" conveyors. Nevertheless, other precision indexing drive or continuous motion chains can also be used in the practice of the invention.

Figure 3:
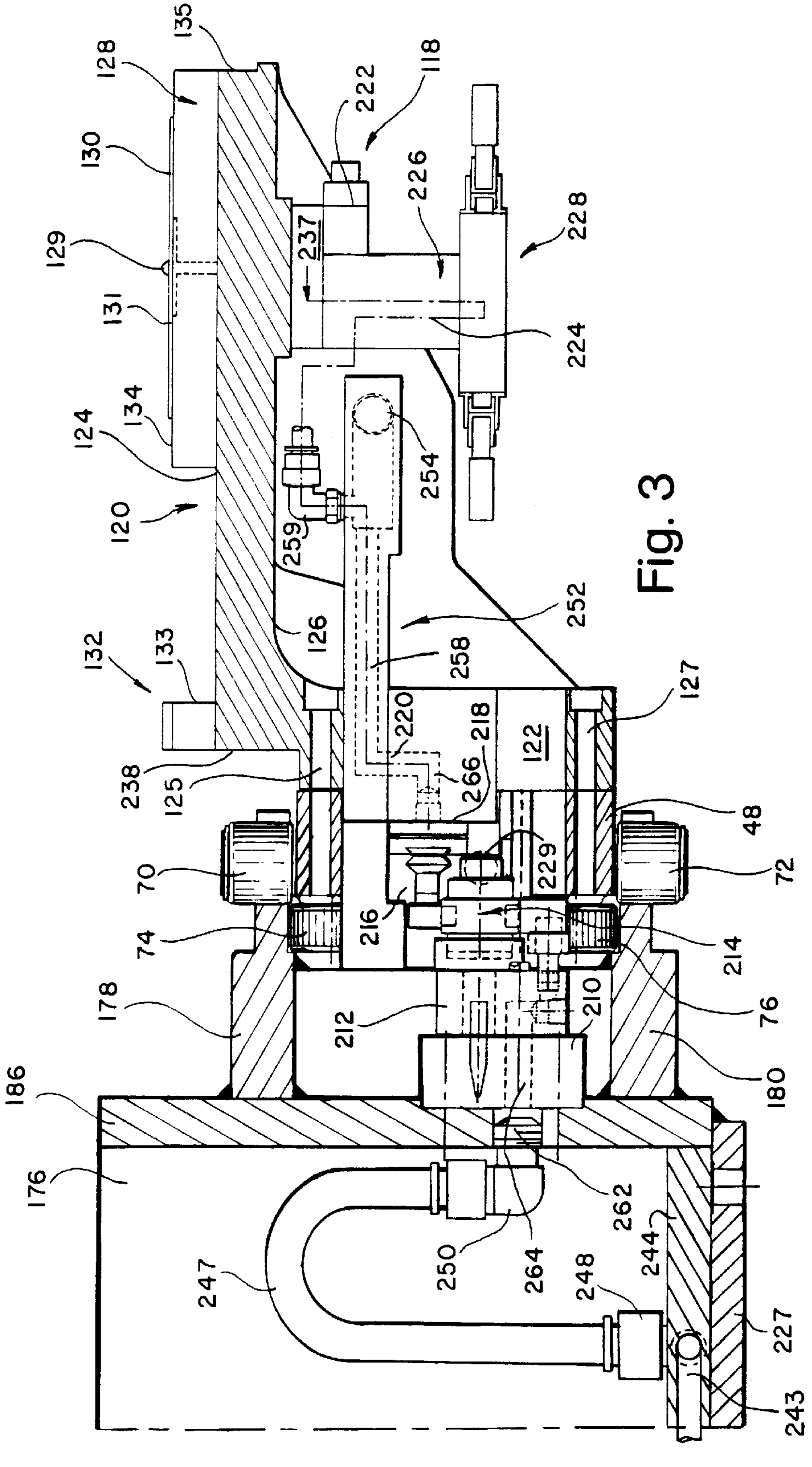
FIG. 3 is a schematic view in partial cross section showing a portion of the sprocket hub and the sprocket drive members for driving the segmented drive chain, a link being driven by the sprocket drive members, the rollers on the drive link being engaged by the sprocket drive members, the support means fixedly connected to that link for supporting a compact disc, a rack segment provided on the support member for meshing with a gear provided on the flexographic print roll for driving the print roll and for registration of the decoration on the print plate with the compact disc surface to be printed, a tooling fixture provided on the support means for holding a compact disc, and a portion of the vacuum manifold and the sprocket, check, and conveyor valves connecting the tooling fixture to the rotary coupling located within the sprocket hub (See FIG. 2) but not showing the rotary coupling.
Figure 4:
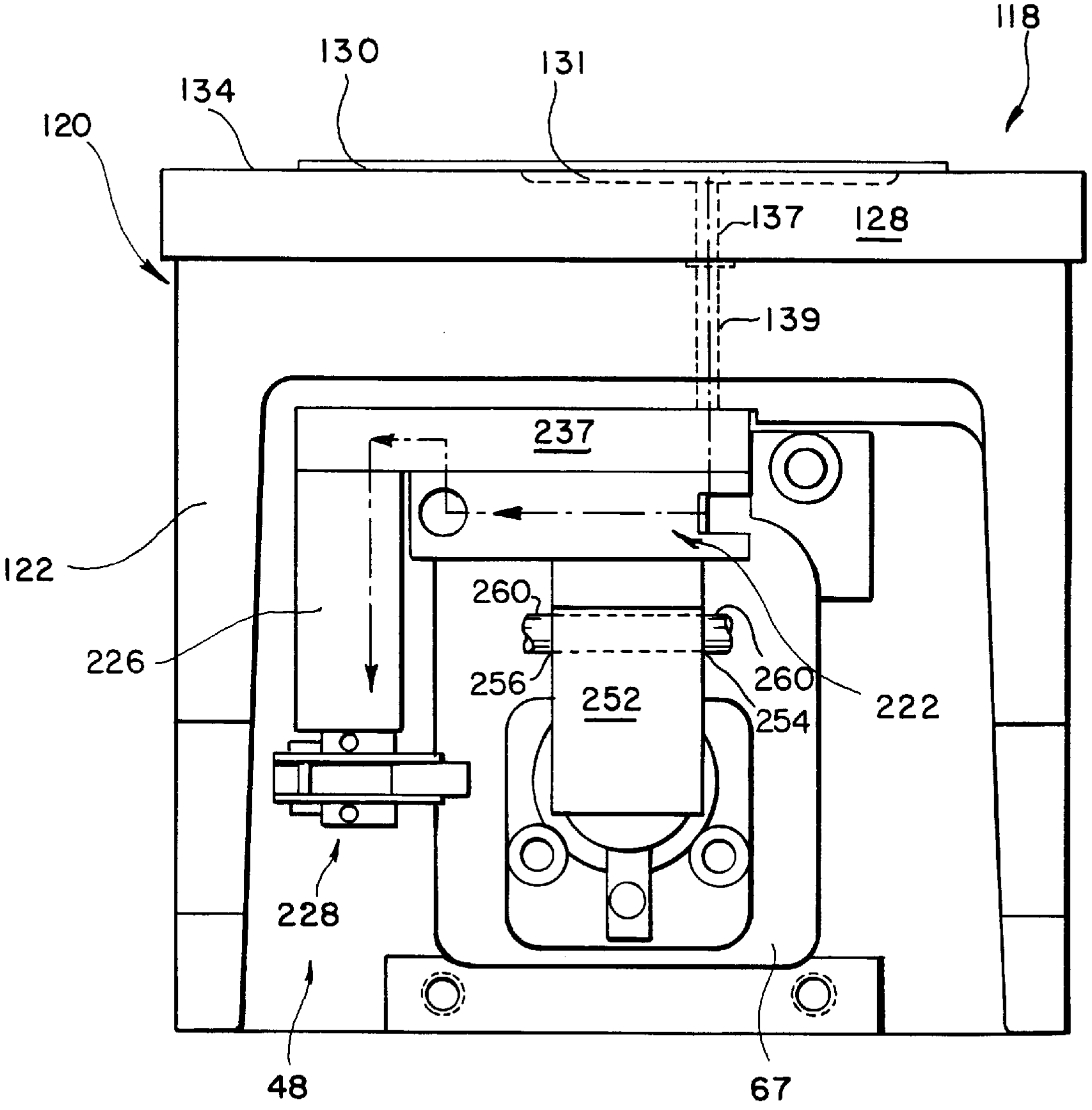
FIG. 4 is a side view looking at a support member or carrier for a compact disc tooling fixture mounted to a drive chain link, as shown in FIG. 3, and showing the transfer of vacuum from the tooling fixture through the filter and the tooling fixture valve, and better showing the opening in the drive chain link and the mounting of the vacuum manifold member.

To the outer vertically disposed surface 56 of each of the drive chain segments 48 there is fixedly secured a support means for a compact disc tooling fixture referred to, in general, by reference numeral 118 (FIGS. 3,4). The support means 118 comprises a horizontally disposed portion or bracket member 120 and a vertically disposed bracket member 122 (FIG. 3). The horizontally disposed member 120 is defined by a top planar, horizontally disposed, surface 124 and a bottom surface 126. On the top planar surface 124 there is provided a compact disc support member or tooling fixture 128 for a compact disc 130.

The vertically disposed member 122 of the support means is connected to the outer surface 56 of the drive chain segment 48 by conventional threaded members indicated by reference numerals 125, 127; however, other fastening means known to those skilled in the art can be used instead, if desired. The vertically disposed member 122 can be either detachably connected or fixedly connected to the drive chain segment 48, as desired. These two members, i.e., bracket members 120, 122, rather than being integral as shown in FIG. 3, can each be separately provided and then connected together by various known means, e.g., welding, or even by threaded fasteners, if desired.

The bottom surface 126 of the horizontally disposed bracket member 120 can be of various configurations, e.g., as shown in FIG. 3, or planar or ribbed, if desired. This is of no consequence to the practice of the invention disclosed. On the top planar surface 124 of the horizontally disposed member of the support means 118 there is, most importantly, provided an elongated gear rack segment 132, the purpose for which will be later made clear. Such a gear rack segment is provided on each of the support means 118. Gear rack segment 132 is defined by an outer planar surface 133 and an inner planar surface parallel to the outer surface. The gear rack segment is fixedly secured to the support means 118, the length of the gear rack segment being provided lengthwise of the support means and the inner planar surface of the gear rack segment being vertically in line with the vertically disposed inner edge of the support means, as shown in the drawing. The outer planar surface 133 of the gear rack segment is in parallel disposition to the outer linear vertically disposed edge 135 of the support means.

The compact disc tooling fixtures 128, each provided on a support means 118, can be of various configurations, this depending somewhat upon the manner of printing, e.g., whether the printing stations comprise silk-screen print heads or direct rotary printing rolls such as used in flexographic printing. In the case of silk-screen printing, the compact disc fixture can be either the configuration disclosed in U.S. Pat. No. 5,165,340, or that disclosed by Chris P. Rapp in U.S. Pat. No. 5,609,102. The complete disclosures of this patent and patent application are hereby incorporated by reference.

In the compact disc tooling fixture disclosed in U.S. Pat. No. 5,165,340, there is provided a circular-shaped well which extends inwardly from the top planar surface of the tooling fixture. The compact disc is loaded into this well, registered in a precise location for printing and held in that location by vacuum. The compact disc fixture disclosed by Rapp has a base member having a top planar surface on which is provided a detachable mask having a circular-shaped opening therein. This mask, in combination with the top planar surface of the base member of the tooling fixture, provides a well for holding a compact disc.

Those skilled in the art will readily appreciate that a well is desired in silk-screen printing so that a transitional surface is provided in the same horizontal plane as the top surface of the compact disc. This prevents wearing a hole in the silk-screen from repeated contact with the sharp edge of a compact disc when the squeegee translates the screen forcing ink onto the compact disc surface. Where the surface of the compact disc is to be direct rotary printed, as later more fully disclosed, no well is actually required in the tooling fixture. In this case, no transitional surface is needed because the print plate itself never overlaps any of the surfaces of the compact disc. The top surface 134 of the compact disc fixture 128 in this case can be flat or planar (FIGS. 3, 13), and parallel to the top planar surface 124 of the support means.

The tooling fixture for a compact disc such as disclosed in the Rapp patent application can function in two ways, i.e., providing a tooling fixture with a well or one with merely a top planar surface. Thus, such a compact disc tooling fixture will be found quite advantageous in the practice of the present invention, as the Rapp compact disc tooling fixture can be used both in silk-screen printing and in direct rotary printing, e.g., flexographic printing as disclosed more fully herein, or in a printing system comprising both methods of printing. If a top planar surface is desired, the top member or mask in the Rapp compact disc tooling fixture can be dispensed with, as the purpose for such a member, i.e., to provide a well for the compact disc fixture, is no longer necessary.

Figure 20:
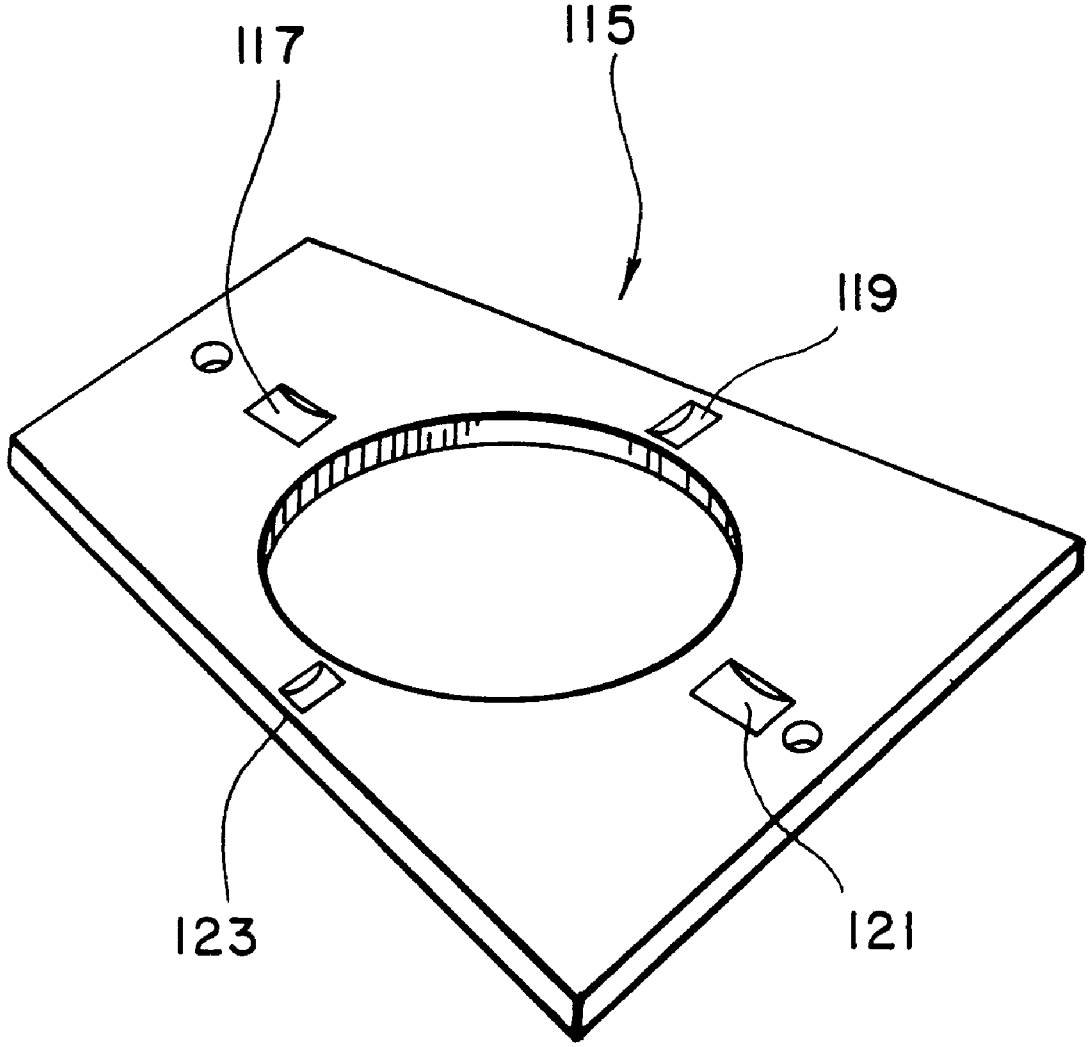
FIG. 20 is a perspective view showing a mask that is provided on a planar base member to provide a well for a compact disc and the indentations provided in the top surface of the mask so that registration marks on flexographic printing plate will not print on the tooling fixture.

Nevertheless, in the more preferred practice of this invention, the mask for the tooling fixture disclosed in U.S. Pat. No. 5,609,102 is advantageously used for some of the same reasons set forth in that patent application but, quite importantly, with some modification as hereinafter made clear. As will be better appreciated later on, the printing plate for the flexographic printer is provided with registration marks at 3,6,9, and 12 o'clock for lining up the print plate in wrapping it around the print roll sleeve. These registration marks protrude outwardly from the base of the printing plate, the same as does the image or decoration to be printed on the compact disc. Thus, in the printing of the decoration on the printing plate on the surface of the compact disc, the registration marks are also disadvantageously printed on the surface of the tooling fixture. This results, eventually, in a sufficient thickness of ink that it presents a problem in the proper printing of the surface of the compact disc, and affects the quality of the printed image. The same problem results, of course, when the tooling fixture has a well. The registration marks are printed on the transitional surface of the tooling fixture as the flexographic print plate does not, as earlier disclosed, overlap the compact disc. This problem is solved, however, by providing the mask 115, (FIG. 20) as disclosed in the Rapp patent application, with indentations 117, 119, 121, and 123, at 12, 3, 6, and 9 o'clock. These indentations must be of a size and shape, and in corresponding locations, so as to accommodate the outwardly protruding registration marks. On the print plate Importantly, the indentations must be sufficiently deep enough so that no printing of the registration marks on the surface of the tooling fixture occurs.

In some cases, though somewhat less preferred, the mask for the tooling fixture can be provided with openings extending through the thickness of the mask at 3, 6, 9, and 12 o'clock, instead of indentations. This will even better ensure that the registration marks do not print as they will not contact a surface on which to be printed. In still another embodiment, though less preferred than. either of the above, due, in part at least, to the cost of manufacture, the tooling fixture used can be one having a top planar surface or one having a well and transitional surface as earlier disclosed but with dead openings or bores being provided at 3, 6, 9, and 12 o'clock. If a tooling fixture such as disclosed in U.S. Pat. No. 5,165,340 is used, such a tooling fixture should also, in the more preferred aspect of the invention, be provided with indentations or openings like those just previously disclosed for the mask so that no printing of the registration marks will be made on the transitional surface. Those skilled in the art will readily appreciate that the Rapp mask need not be of the shape shown in FIG. 20. It can be rectangular or square, as desired, the same as the compact disc fixture.

As seen in the drawing (FIG. 3) the compact disc fixture 128 is provided with a tubular-shaped registration pin 129 that extends vertically upwardly from, and is perpendicular to, the top planar surface 134 of the tooling fixture. The registration pin 129 is fixedly secured to the tooling fixture. This pin can be tapered and rounded, at its top end, if desired, so as to provide more easy entry into the centerhole of the compact disc, as hereinafter described. Importantly, the length of this registration pin (greatly exaggerated in the drawing for sake of showing) is such that it only extends to the top surface of the compact disc after the compact disc is loaded onto the tooling fixture. This is so that the registration pin will not interfere with the subsequent printing of the compact disc. The registration pin is located on the top surface 134 of the tooling fixture in such a location as to provide the compact disc in the desired location on the tooling fixture for printing. Further, the registration pins on all the tooling fixtures in a straight line run of the transport apparatus define a line that is parallel to the line that is defined by the edges of the rack segments. The registration pin in the more preferred aspects of the invention is of tubular shape, the reasons for which will be later disclosed; nevertheless, in some cases a solid pin may be found satisfactory.

The tooling fixture 128, as shown in FIG. 4, is provided with an annular-shaped groove 131 that surrounds the registration pin 129 and extends inwardly from the top planar surface 134. An opening is provided at the base of the groove which communicates with the elongated openings 137,139, provided in the tooling fixture and the horizontally disposed bracket member 120, respectively. The bottom end of the elongated opening 139 communicates with the filter 222 and the tooling fixture valve 228 and, and the mounting blocks for each through a series of passageways and seals, later to be more fully disclosed Although a tooling fixture with a fixed registration pin extending vertically upwardly from the tooling fixture and having an elongated opening therein, as disclosed above is most preferred, for the reasons later to be made more clear, those skilled in the art will readily appreciate that other registration means can also be used, at least in some cases. For example, the registration means disclosed in U.S. Pat. No. 5,429,045 where the registration pin is raised from below the tooling fixture may be found satisfactory with appropriate modification of the tooling fixture. The disclosure of U.S. Pat. No. 5,429,045 is fully incorporated herein by reference. Or, the registration of the compact disc can be provided, though much less preferred, by a registration pin moving downwardly from above the tooling fixture, following loading of the compact disc on the tooling fixture. The providing of such registration means, rather than the one specifically disclosed herein is believed well within the skill of those in the art.

Figure 2:
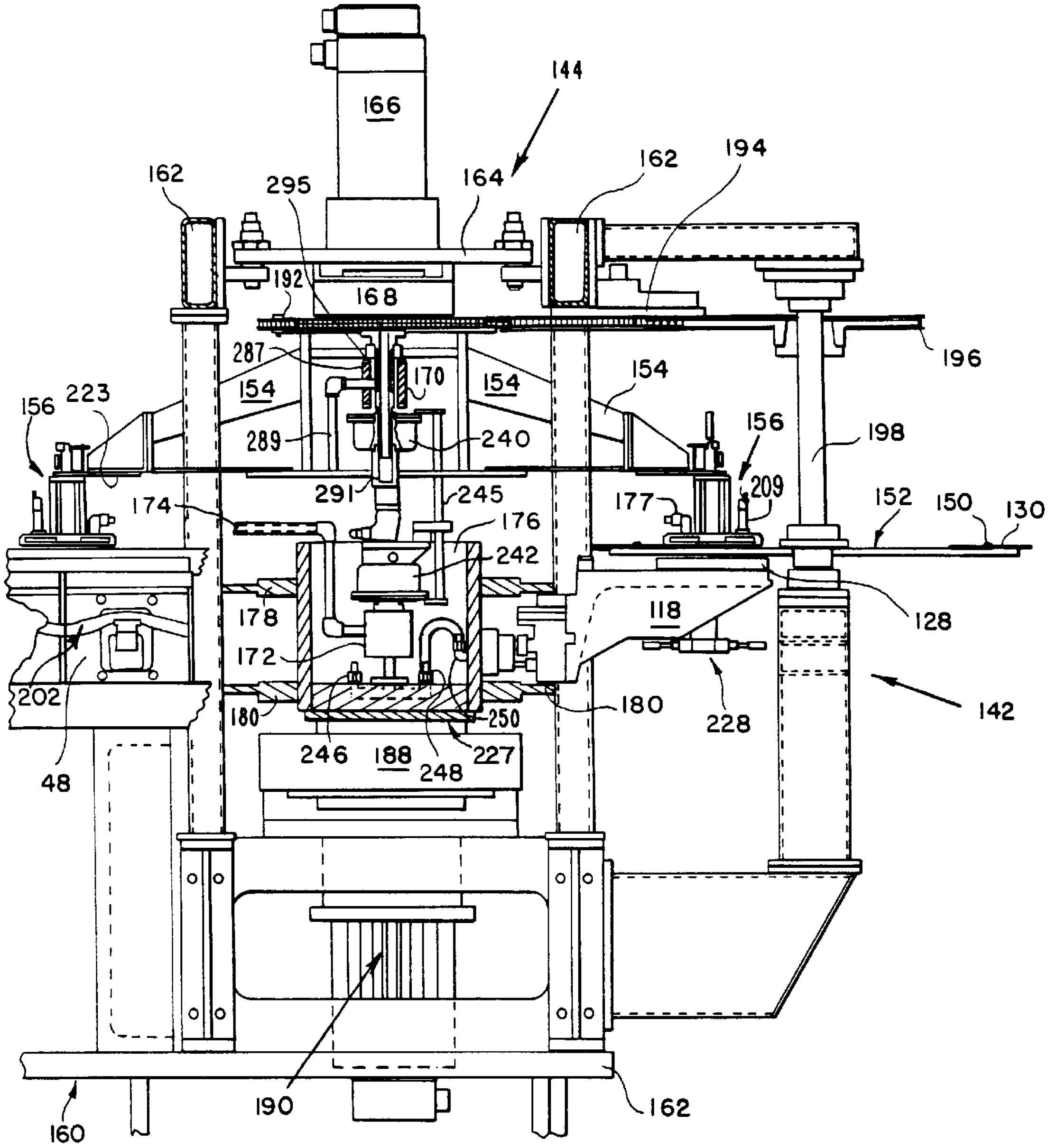
FIG. 2 is a schematic view in partial cross-section of the right end of the apparatus shown in FIG. 1, showing platen apparatus for transferring a compact disc from the sending apparatus to pick-and-place loading/unloading apparatus, and from the loading/unloading apparatus to receiving apparatus, pick-and-place apparatus for loading compact discs one-at-a-time onto a disc fixture located on a transport member and for off-unloading compact discs one-at-a-time from a tooling fixture to the platen apparatus, the vacuum system for providing vacuum to the tooling fixtures from a stationary source, the valving and rotary coupling for providing/releasing vacuum to each tooling fixture, the rotary coupling for providing air to each of the compact disc pick-up means or lifters on the loading/off-loading apparatus, means for driving the load/off-load apparatus and the platen apparatus; and the sprocket drive means for driving the segmented drive chain of the transport apparatus, but not showing the sending/receiving apparatus shown in FIG. 1.

Referring now again to FIG. 1, and to FIG. 2, the means for loading the compact discs 130 one-at-a-time onto a tooling fixture 128, and for off-loading the compact discs, after being printed, one-at-a-time from a tooling fixture 128 will now be more fully disclosed. The loading and off-loading means of the invention, in its most preferred form, comprises, in combination, sending apparatus and receiving apparatus denoted generally by reference numerals 138 and 140, respectively, platen apparatus 142, and a pick and place device or loading/off-loading apparatus 144. Each of these apparatuses and their respective functions will be made clear hereinafter.

The sending apparatus 138 comprises an indexing table on the top, horizontally disposed, surface 146 of which are provided five vertically disposed stacks 148 of compact discs 130. Such an indexing table is disclosed in U.S. Pat. No. 5,165,340, earlier mentioned. Nevertheless, other sending or indexing apparatus performing the same function can be used, if desired. The main thing is that, in the most preferred aspect of the invention, at least one stack of compact discs is provided. The sending apparatus, unlike the sending apparatus specifically disclosed in the aforementioned patent, further comprises a sending arm 141 which is basically an elongated arm pivoted at its midpoint (not shown). In operation, the sending arm rotates back and forth (180 degrees) about its midpoint. This rotational movement is caused by a conventional rotary actuator mounted to a frame member (not shown in the drawing) of the apparatus and to the sending arm 141 at its midpoint.

The sending arm 141 is provided at each end with a compact disc pickup or holding member identified, in general, by reference numeral 143. These pickup members each comprises an air operated piston (not shown in the drawing) mounted to the underside of the sending arm, with the free end of the piston extending vertically downwardly. On the end of each of the pistons there is provided a suction cup member (not shown in the drawings). These suction cup members (an array of three suction cups) are mounted to the end of the piston so that the cup face of each suction cup is horizontally disposed, facing downwardly, and are all in the same horizontally disposed plane. The suction cup members are each connected independently to a conventional two-way valve which, in turn, is connected to a source of vacuum, neither of which is shown in the drawing.

In operation, the pistons at each end of the sending arm 141 are fired simultaneously and the suction cup members are caused to be moved vertically downwardly. The one suction cup member is located directly above a stack of compact discs, the sending apparatus 138 having been indexed to that location, as shown in FIG. 1. At the same time, the suction cup member is supplied with vacuum and the topmost compact disc 130 is picked up from the stack of discs. The piston is operated in usual manner to reverse its direction and the suction cup member is then raised vertically upwardly. The sending arm then is rotated 180 degrees and the pistons are again fired. Thus, the suction cup member, with the already picked up compact disc thereon, is caused to again move vertically downwardly. The vacuum to that suction cup member is released and the compact disc just picked up is placed onto one of the vertically upwardly extending locating pins 150 (FIGS. 1, 2) provided on the top surface 152 of the platen apparatus 142.

At the same time that a compact disc is being picked up from the stack of compact discs (FIG. 1), the compact disc pickup member 143 at the other end of the elongated arm 141 operates to deposit a compact disc earlier picked up onto a platen pin 150 that has been indexed into the location shown in FIG. 1. Those skilled in the art will readily appreciate that when suction is being transferred to that suction cup member to pick up the topmost compact disc from the stack, vacuum to the suction cup member at the other end of the sending arm is being released to allow the compact disc to be deposited on the platen pin. If desired, the suction cup member can be connected to a source of compressed air, and a jet of air can be supplied to the suction cup member holding the compact disc to be deposited on the platen pin at the same time the vacuum is released. This will aid release of the compact disc from the suction cup member in the event of any residual vacuum in that member.

The receiving arm 153 associated with the receiving apparatus 140 is of like construction and operation as the sending arm 141 associated with the sending apparatus 138. Its operation is the reverse of the sending arm. A compact disc is off-loaded from the platen apparatus and is placed on the receiving apparatus 140 to provide a stack of compact discs. Thus, the pistons on the underside of the receiving arm at both ends are fired and the suction cup members are caused to move downwardly. The one compact disc pickup member 143 is supplied with vacuum and the compact disc is picked up from the platen apparatus 142. The vacuum on the suction cup member at the other end is broken at the same time. This allows the compact disc to be released from the suction cup member and to be deposited in the stack of compact discs on the receiving apparatus.

The firing of the pistons on the sending and receiving arms is synchronized so that the suction cup members on each move vertically upwardly and downwardly at the same time. The rotational movements of these arms are also in sync with one another. These actions are, of course, coordinated with the indexing of the platen apparatus, later to be described. When the last compact disc 130 is picked up from the stack of compact discs on the sending apparatus, a new stack of compact discs is indexed into location. A similar action takes place with the receiving apparatus, but in reverse. Thus, when the last compact disc is placed on the stack of compact discs (a stack comprises a predetermined number of compact discs) the stack of compact discs is indexed and at the same time a new spindle for providing a new stack of compact discs is indexed into the position shown in the drawing. These operations are all coordinated by a computer controller according to well known techniques.

The platen apparatus 142 comprises a circular-shaped, horizontally disposed, planar body member 152 mounted for rotation about a centerpoint (FIGS. 1, 2). On the top horizontally disposed planar surface of the body member, and extending perpendicular thereto, are eight locating or positioning pins, as earlier disclosed, denoted by reference numeral 150. Critically, these eight locating pins are located outwardly from the centerpoint of the circular-shaped platen member 152 in radial fashion and are equally spaced-apart from one another around its periphery, as shown. Also of critical importance, the positioning pins I 50 are equidistant from the centerpoint of the platen apparatus so as to be located on the same circle.

Although the platen apparatus 142 used in the practice of the invention comprises a flat circular-shaped horizontally disposed member having locating pins on the top surface thereof, as earlier disclosed, this apparatus can be of a different construction, if desired. For example, the platen apparatus can comprise eight arms extending outwardly from a centerpoint. In such apparatus, at the end of each arm there can be provided a circular-shaped disc on the top planar surface of which is provided an upwardly extending location pin, as earlier disclosed. The main thing is that the location pins each be radially the same distance from the centerpoint (center of rotation) and that such be spaced equally from one another about a circle defined by the radial location of the location or positioning pins.

Figure 6:
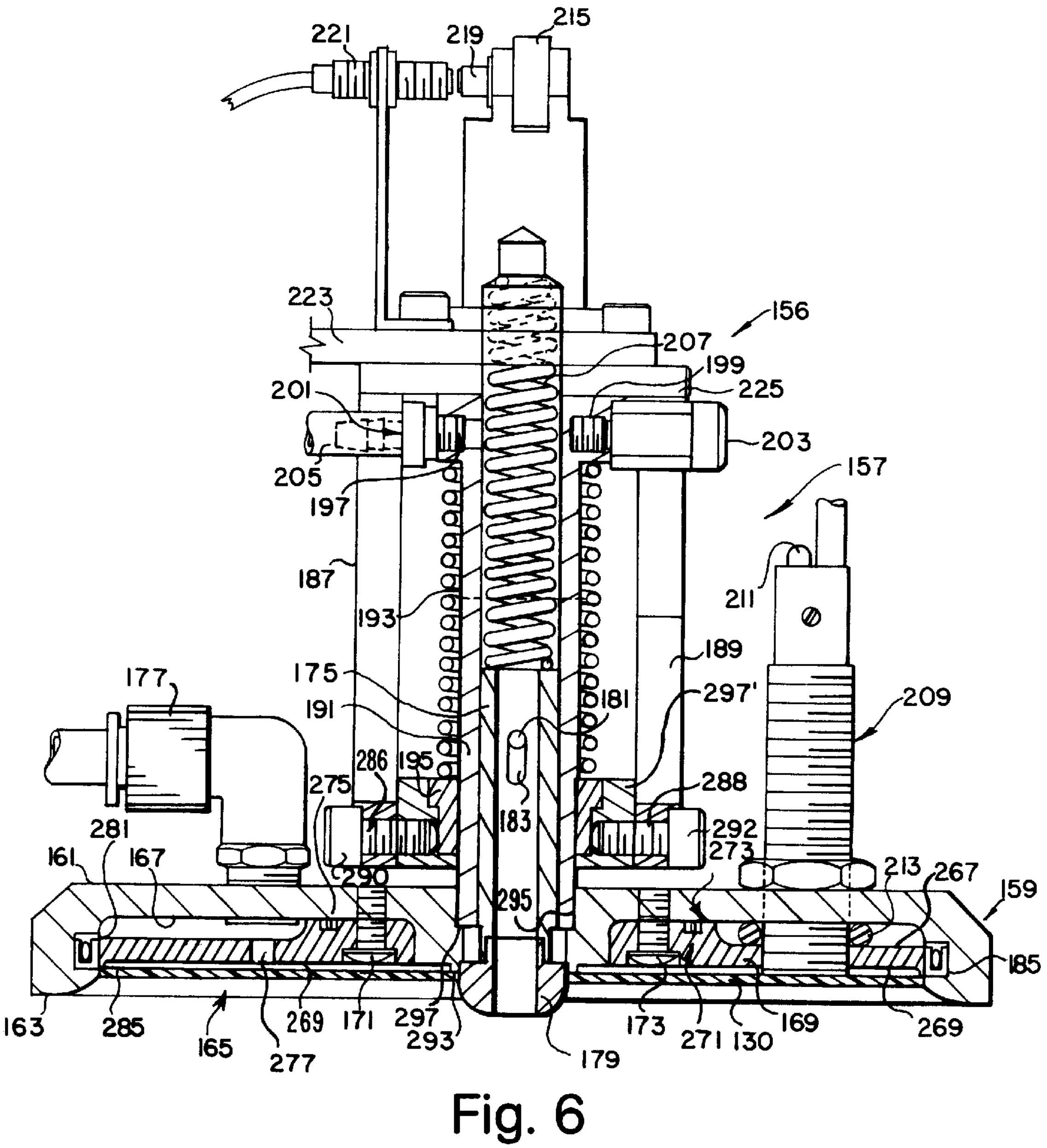
FIG. 6 is an enlarged view in cross-section better showing the compact disc lifter provided at the end of an arm on the load/unloading means shown in FIGS. 1, 2 for lifting a compact disc off the platen apparatus and loading it onto the transport apparatus and for lifting a compact disc off the transport apparatus and loading it onto the platen apparatus.

The load/off-load or pick-and-place apparatus 144 (FIG. 1) is mounted for rotation clockwise and comprises 8 arms 154 each extending radially outwardly from a centerpoint as shown in the drawing. The arms 154 are spaced apart from one another at equal angles around the centerpoint, as shown in FIG. 1, and are each the same radial distance from the centerpoint. The length of these arms 154 depends upon the distance from the center of the sprocket hub, later to be more fully described, that a compact disc is held by the tooling fixture. At the outer end of each arm 154 on the pick-and-place apparatus, there is provided a compact disc lifter 156 (FIGS. 1, 2, 6). More about this later.

The platen apparatus 142 rotates in clockwise manner, the indexing thereof being determined by the load/off-load apparatus 144, as later more fully disclosed. The load/off-load apparatus indexes with every other tooling fixture on the transport apparatus that passes it. The platen apparatus and load/off-load apparatus index at the same time. The load/off-load apparatus and sender and receiver work on demand. Whenever, a platen pin stops in front of the sender, it places a compact disc on the pin and whenever/a platen pin stops in front of the receiver and a compact disc is on it, the receiver arm removes it.

Those skilled in the art will readily appreciate the geometry of the apparatus by reference to FIG. 1. When both the platen apparatus and the load/off-load apparatus index ⅛th of a revolution (in this case because of the fact that both apparatus have eight (8) stations, i.e., eight arms and eight location pins, as earlier disclosed) two of the platen stations line up directly with two of the load/unload stations. Also, at the same time, two of the load/unload stations are directly above two tooling fixtures on the transport apparatus as it passes around the sprocket drive means, one tooling fixture being loaded with a compact disc and a compact disc being off-loaded from the other.

Although the pick-and-place apparatus shown in FIG. 1 comprises eight arms, the number of arms on the pick-and-place apparatus can be more than eight, or fewer, as desired. The main requirement is that there be two cutouts on the sprocket members, as later described, for each of the arms provided on the pick-and-place apparatus, and that each arm, in the operation of the apparatus, be located between these cutouts. The platen apparatus need not have the same number of locating pins as there are arms on the load/off-load apparatus. The important consideration is that two positioning pins on the platen apparatus line up with two arms on the pick-and-place apparatus. Also, the pins on the platen apparatus need be equally spaced from the center of rotation, and from each other, as before disclosed. Two arms on the load/off-load apparatus need also line up with two tooling fixtures.

Each compact disc lifter 156 (FIG. 6) comprises a vertically disposed, elongated, circular-shaped body member 157, having a top closure 225 in which is provided a centrally disposed, circular-shaped opening, as shown. The top closure 225 is fixedly attached to member 223 which, in turn, is attached to the end of the arm 154 of the pick-and-place apparatus. The member 223 is provided with a circular-shaped opening in concentric relationship to the opening in top closure 225. The reason for these openings will soon be made clear.

To the bottom end of body member 157 there is attached a horizontally disposed member 159. Member 159 is of circular-shape (FIG. 1) and is defined by a top planar surface 161 and a bottom planar surface 163. In the bottom planar surface 163 there is provided a circular-shaped cavity 165 having a closed bottom surface 167. Importantly, the perimeter of the circular-shaped cavity at the open end curves outwardly, as shown in the drawing, the purpose for which will soon be disclosed. A radius of curvature of about 0.22 inches will be found quite satisfactory. Nevertheless, this curvature can vary somewhat depending upon the size of the cavity, the depth thereof, the teeth on the deflector plate, and the flow of air, as disclosed hereinafter.

Located in the cavity 165 is an annular-shaped, flat, deflector plate or member 169 having an outer diameter, and this is a critical feature of this aspect of the invention, only slightly less that of the circular-shaped cavity. The deflector plate is provided with planar top and bottom surfaces 267 and 269 from the top surface of which extends upwardly an annular-shaped protrusion 271 having a top planar surface 273. This top planar surface 273 is engaged with the bottom surface 167 of the cavity 165. In the top planar surface of the protrusion 271 there is provided an annular-shaped groove in which is located a conventional sealing member 275. This is to ensure that air does not escape from the cavity 165 except as intended. Provided in the deflector plate member are four openings each denoted by reference numeral 277 (FIG. 7) and each having a diameter of only about 0.029 inches, only one of which is shown in FIG. 6 of the drawing for sake of clarity. The four openings (see FIG. 7) in the practice of the invention are located at 3, 6, 9. and 12 o'clock. Nevertheless, the size of these openings and their location can be varied somewhat provided the same function performed in this invention by them is attained. The purpose for these openings will soon be made clear.

The peripheral edge 281 of the deflector plate member 169 is provided with a uniform saw-toothed configuration (FIG. 7) comprising a plurality of saw teeth 279. Although the configuration can vary somewhat, a deflector plate member having thirty saw teeth per inch, each saw tooth having a width at the base of about 0.031 inches will be found quite satisfactory for the practice of the invention. The sides of the saw teeth are equal in length, tapering outwardly from an apex at equal angles. Thus, each saw tooth is in the shape of an isosceles triangle having an altitude of about 0.010 inches. Accordingly, there are provided a large number of small openings around the peripheral edge of the deflector plate member, the reason for which will soon be disclosed.

Figure 19:
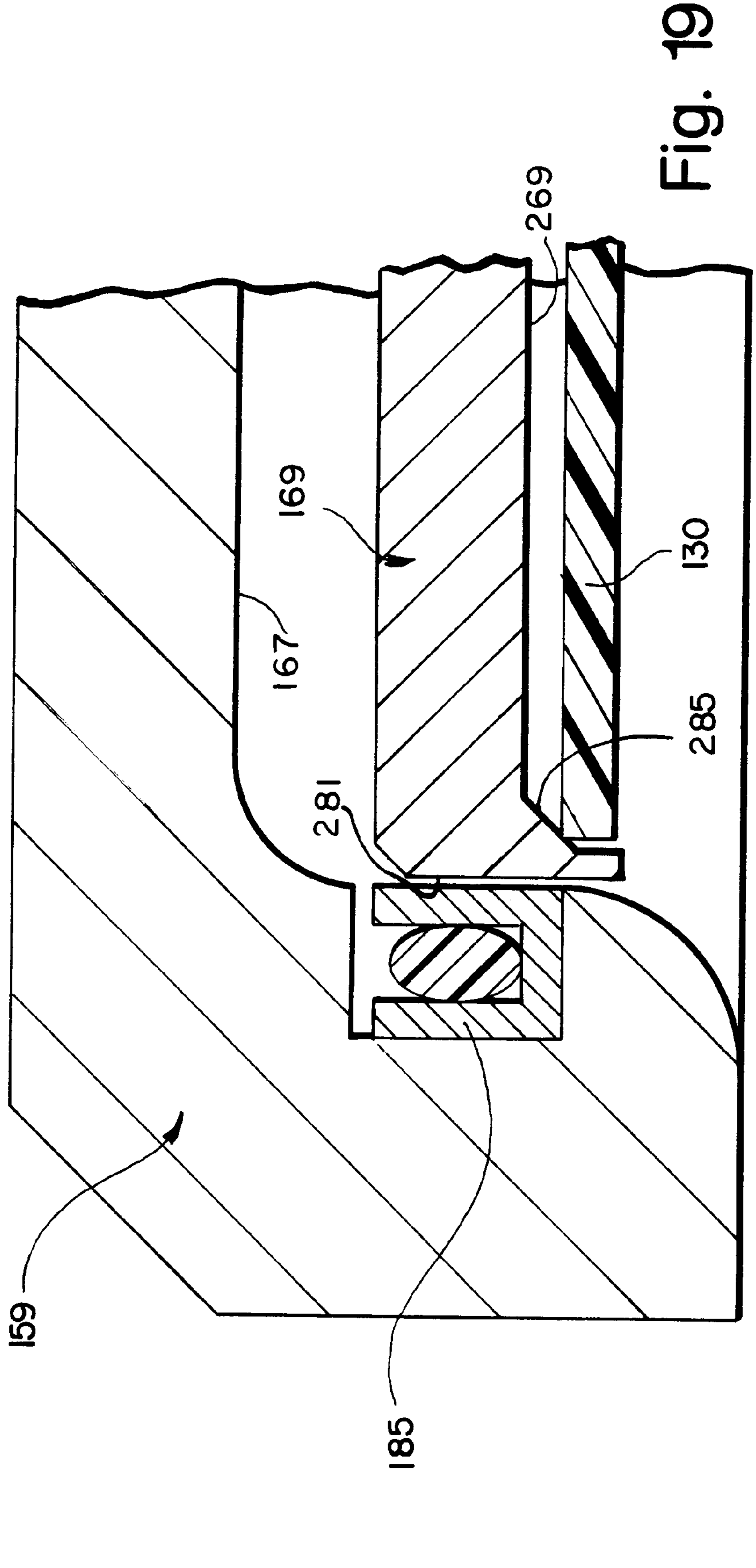
FIG. 19 is an enlarged partial view showing the sealing member in sealing engagement with the vertical edge of the bottom member of the compact disc lifter and the curvature of the bottom peripheral edge of that member whereby the compressed air introduced into the bottom member is caused to flow radially outwardly, resulting in a vacuum being created below the deflector plate of the compact disc lifter, and showing the beveled periphery to be contacted by the compact disc periphery.

The deflector plate member 169 is secured to the horizontally disposed body member 159 by means of conventional threaded fasteners 171, 173. The outer peripheral edge 281 of the deflector plate member is vertically disposed, as best seen in FIG. 19 of the drawing. The bottom planar surface 269 of the deflector plate 169 is defined by a peripheral edge from which extends downwardly at an angle of forty five degrees the beveled surface 285. This beveled surface is an important feature of the compact disc lifter 156. The beveled surface 285, as best seen in FIG. 19, is contacted by the peripheral edge of the compact disc 130 on being picked up by the compact disc lifter 156 from the platen apparatus.

The vertically disposed body member 157 is provided with opposed vertically disposed elongated slots 187, 189 the purpose for which will soon be made clear. The tubular-shaped elongated body member 157 encloses an inner tubular-shaped, elongated body member 191. The bottom end of body member 191 is press fitted into a circular-shaped, centrally disposed opening in the body member 159 defined by a vertically disposed peripheral edge 295 and abuts the shoulder 297 in the opening. The bottom of this opening is surrounded by an annular-shaped member having a horizontally disposed flat bottom edge 293. Thus, as will be readily appreciated from FIG. 6, the compact disc 130 is supported at the peripheral edge by the beveled surface 285 of the deflector plate member and at the centerhole thereof by the annular-shaped bottom edge 293 of the body member 159. This prevents the top surface of the compact disc from contacting the bottom surface of the deflector plate member, thereby avoiding possible marring or damage to the top surface of the compact disc. More importantly, however, there is provided a space between the top surface of the compact disc and the bottom surface of the deflector member, the purpose for which will soon be disclosed.

The body member 191 is surrounded by an elongated conventional coiled spring 193 the ends of which are engaged by the top surface of a bushing 195 and the bottom surface 197 of an annular-shaped flange 199 extending horizontally outwardly from the body member 191 at the top end, and perpendicular thereto. On one side of the flange there is provided a threaded opening for the threaded fitting 201. On the opposite side of the flange and in direct opposition to the threaded fitting is provided a threaded opening for the bushing 203. The bushing 203, as will be later more fully appreciated, rides up and down in the slot 189 thereby keeping the body member 191 from rotating during its up and down movement.

Connected to the threaded fitting 201 is one end of a tubular-shaped conduit 205, the other end of which is connected to a source of compressed air, not shown, via a bank of valves located on the load/off-load apparatus (not shown), the purpose for which will be later described. An elbow shaped connector 177 is mounted to the top of body member 159 whereby compressed air can be also provided to the cavity 165, a second such fitting (not shown) being provided in the body member 159 180 degrees from the elbow shaped connector 177.

The bushing 19 is located in the annular-shaped member 297 having opposed, outwardly extending flanges in which are provided the opposed threaded openings 286,288. Located in these threaded openings are threaded members 290,292 the ends of which bear against the bushing 195 on being tightened, in the nature of a set screw. Thus, as will be appreciated by those skilled in the art, the annular-shaped body member 191 is connected to the body member 159 and the body member 159 is connected to the deflector plate 269 and these members operate as a single unit. It will also be seen that the threaded members 290, 292 ride up and down in the slots 187,189 of the body member 157. Importantly, as will be appreciated by reference to FIG. 6, the body member 159 is not connected to the body member 157.

Extending down the vertically disposed tubular-shaped body member 191 is an elongated pin 175 having a tubular-shaped opening therein that extends the length of the pin. The pin 175 terminates in a rounded end or nose 179 which, importantly as later made clear, has a centrally disposed elongated opening concentric to the opening provided in the body of the pin 175. As shown in the drawing, the inside diameter of the bottom end of the pin is somewhat greater than that of the rest of the pin. The nose 179 has a top annular-shaped portion that is nearly the same outside diameter as the inside diameter of the annular-shaped pin at the bottom. The top annular-shaped portion of the nose terminates in a horizontally disposed planar surface that surrounds the top portion. This planar surface is abutted by the bottom annular-shaped end of the elongated pin, as shown in the drawing. This top planar surface is further defined by a circular-shaped edge that is located within the bottom end of the inner body member 191. Nose 179 is only lightly pressed into the end of the pin 175, the above-described design features allowing it to break away from the end of the pin in the event the nose 179 comes into contact with other moving parts thus preventing damage to the compact disc lifter, the platen apparatus, or the tooling fixtures. The nose 179 is defined further by a tapering rounded surface that terminates in a horizontally disposed bottom end. The nose 179 is most preferably of plastic, the reason for which will soon be clear.

Located in the tubular-shaped body member 191 is a coiled spring 207, the bottom end of which engages the top annular-shaped end of the pin 175. The top end of coiled spring 207 terminates in the dead bore located in the top end of the body member 191. Those skilled in the art will appreciate that the body member 191 extends upwardly through the openings earlier disclosed provided in the bracket members 223 and 225.

In the horizontally disposed body member 159 there is provided a threaded opening through which extends a conventional sensing member 209, the body of which is provided with an external thread pattern, as shown in the drawing. Out the top end of the sensing member there extends wiring for connecting the sensor to a source of electricity and to a conventional PC programmable controller (not shown in the drawing), A conventional light emitting diode (LED) 211 is provided at the top end of the sensing member for alerting an operator as to whether or not a compact disc 130 has been picked up by the compact disc lifter 156 and is located within the cavity 165. At the bottom end of the sensing member 209, there is provided a conventional circular-shaped seal 213, the purpose for which is to provide a seal for the sensing member so that the compressed air cannot escape from the cavity of the compact disc lifter. The sensing member 209 used in the practice of the invention is a conventional capacitive proximity switch which senses the presence or absence of a compact disc 130 in the cavity of the compact disc lifter, and relays this information via a computer and the programmable controller earlier mentioned to the flexographic printers, later to be more fully described, as and when needed. Nevertheless, other sensing means can be used provided they serve the same purpose. More about the compact disc lifter later.

The pick-and-place apparatus, i.e., the load/off-load apparatus, 144 is supported on a framework 160 (FIG. 2) comprising horizontally and vertically disposed parallel braces or support members denoted, in general by reference numerals 162. A horizontally disposed support member 164 is mounted to the horizontally disposed frame members 162 of the framework 160 at the top, as shown in FIG. 2. On the top side of support member 164, there is mounted an upper servo or indexing motor 166 which is provided in operative combination with the upper speed reducer or indexing means 168 located below, and mounted to, support member 164.

Connected to the upper speed reducer 168 by a drive shaft (not shown for sake of clarity but which connects the top servo motor 166 and the speed reducer 168 together) is a pneumatic rotary coupling 170. The pneumatic rotary coupling is mounted centrally in the load/off-load apparatus body member and is supported according to usual techniques by an elongated vertically disposed tubular-shaped shaft 287. At the bottom end of the shaft there is provided a conventional slip ring 291. The top end of the shaft 287 is supported in a bushing which is supported by a horizontally disposed member mounted to the body member of the load/off-load apparatus. The bushing at the top of shaft 287 is mounted to the sprocket drive means 192 for the platen apparatus, soon to be described.

The tubular-shaped shaft 287 provides means whereby the control and power wires (not shown) can be passed, entering at the bottom via the slip ring 291 and being passed out the top end of the shaft 287. The control and power wires are connected to a conventional profibus input/output modular communications device (not shown), according to usual techniques. The output of the profibus device is connected to two banks of valves (the profibus and valve banks not being shown in the drawing), mounted to the framework of the apparatus, and to the sensors on each of the compact valve lifters. These banks of valves are available commercially from SMC Pneumatics of Indianapolis, Ind. under the trade designation VQ214ON-5LO-C6. Each valve is a conventional electrically controlled four-way valve. Nevertheless, those skilled in the art will readily appreciate that a four-way valve need not necessarily be used. In some cases, a two-way valve will be found quite satisfactory. The operation of the valves, and at the appropriate time, is controlled by the profibus via the programmable computer control apparatus earlier disclosed. Such a device is commercially available from Siemens Energy & Automatic Inc. of Nuremburg, Germany; however, a profibus is available from other companies as is well known. The choice of any particular profibus for the purposes of the invention is well within the skill of those in the art. A profibus is advantageously used in the practice of the invention as the number of power and control lines needed can be greatly reduced. Thus, in this case, only four wires are necessary, two power wires and two control wires for all the numerous valves on the load/off-load apparatus.

Rotary coupling 170 is connected via inlet pipe 289 to a source of compressed air (not shown in the drawings). The rotary coupling 170 supplies compressed air in conventional manner to the fittings 177 (and to a second like fitting not shown provided on the body member 159, as earlier disclosed) and 201 provided on each of the compact disc valve lifters 156 via the banks of valves earlier disclosed. Thus, three valves are provided in the banks of valves for each of the compact disc lifters. The reason for supplying air to fitting 201 to be sent down the opening 179 in the elongated pin 175 will soon be made clear. Two valves are provided for providing air to the cavity 165 in the body member 159 to better ensure that a sufficient supply of air is supplied to the cavity to perform the intended function hereinafter described.

Although in the practice of the invention it has been found more practical to provide and control the flow of compressed air to the compact disc lifters, and such is preferred, via a profibus modular device, other means and methods may also be used. For example, three valves can be provided on each of the arms 156, rather than in a bank, if desired. In this case, the operation of the valves can be controlled by profibus control means earlier disclosed, or another, according to conventional techniques. Nevertheless, this practice is less preferred due to the valves not being located in one location and the need for more power and control wires.

In picking up a compact disc from the platen apparatus, the compact disc lifter 156 is located directly over and just above a compact disc 130 located on a location pin 150 of the platen apparatus. Compressed air is supplied to the cavity or recess 165 (FIG. 6) provided in the bottom of the body member 159 via fitting 177 and the fitting, not shown, located in a position 180 degrees thereto. This flow of air is deflected outwardly by the circular-shaped flat plate or deflector plate member 169 toward its peripheral saw toothed edge 281. The saw toothed edge of the deflector plate 169, as earlier disclosed, is provided with a plurality of saw teeth 279, the apex of each having a vertically disposed linear edge (FIG. 7) that, in combination, define the peripheral edge of the deflector plate which abuts against the annular-shaped sealing member 185. Thus, there are provided a multiplicity of small passageways 136 (FIG. 7) between next adjacent saw teeth through which the deflected compressed air passes out of cavity 165 at a high rate of flow. This flow of air, and this is a critical feature of this aspect of the invention, follows the curved profile provided at the bottom of body member 159, as it is released to the atmosphere. This high rate of flow of air creates a vacuum on the inside of the cavity below the deflector plate member. The air from below the deflector plate member 159 is drawn up into the cavity 165, at the same time causing the compact disc 130 to be lifted off the platen pin and to be drawn into the cavity 165. As a result, the peripheral edge of the compact disc contacts the beveled surface 285 and the central portion of the compact disc contacts the flat bottom annular shaped surface 293. Thus, a space is left between the top surface of the compact disc and the bottom surface 269 of the deflector plate member.

The annular-shaped sealing member 185 used in the practice of the invention is a conventional TEFLON seal commercially available from Ball Seal of Santa Ana, Calif. under the trade designation Ball seal #415-HB-248 with the internal spring removed. Nevertheless, other annular-shaped sealing members may also be used. The main requirement is that such provide a good seal with the edge of the deflector plate member so as to provide the multiplicity of openings between the saw teeth as above-described. The sealing member must, however, have sufficient rigidity that these openings are not filled in, even in part. Otherwise, the air flow may not be adequate to produce the desired venturi effect.

The body member 191, at the same time, is caused to be moved downwardly by the roller 215 fixedly mounted on the horizontally disposed shaft 219 following a cam (not shown) according to conventional techniques. As a result, the body member 159 and deflector plate member 169 are also caused to move downwardly, as these three members are connected together and operate as a unit. The downward movement of body member 191 causes the coiled spring 193 to be compressed, providing an upward force for return of the body member 191 to its home position after deposit of the compact disc onto a tooling fixture. When body member 191 is caused to move downwardly, and then upwardly, the fitting 201 and bushing 203 move up and down in the opposed elongated slots 187, 189 provided in the outer tubular-shaped body member 157. The purpose of bushing 203, as earlier disclosed, is merely to prevent the body member 191 from rotating during this up and down movement. It will be appreciated that the flanges on the member surrounding the bushing 195 also ride up-and-down in these slots.

Figure 18:
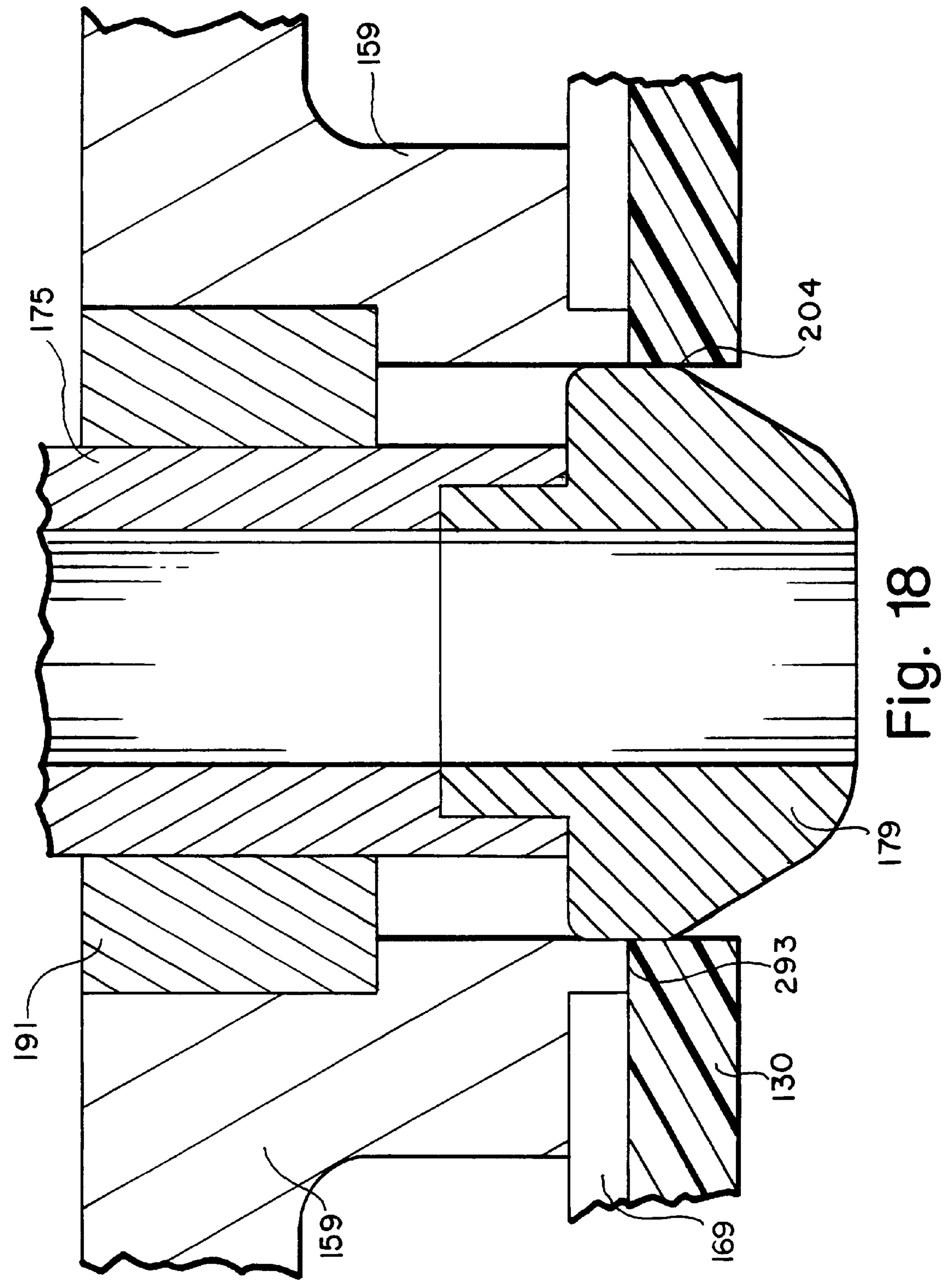
FIG. 18 is a view in partial cross-section showing the bottom end of the inner tubular-shaped body member of the compact disc lifter shown in FIG. 6 engaging with the top of the compact disc around the centerhole and the nose of the elongated pin of the inner body member intruding into the centerhole of the compact disc.

This downward movement of body member 191 also causes the plastic nose 179 of the elongated pin 175 to intrude into the center hole 204 of the compact disc (FIGS. 6, 18). Thus, the elongated pin, due this resistance, is caused to move upwardly within the body member 191 at the same time compressing the coiled spring 207, and providing a spring-loaded system for protection of the compact disc lifter. The upper movement of the elongated pin 175 is limited by the pin 181 that extends outwardly from the inner wall of the body member 191 and that rides up and down in the vertically disposed elongated slot 183. The nose 179 of the elongated pin being of plastic causes no damage to the centerhole of the compact disc. As will be better appreciated later on, the nose 179 acts not only as a guide to centrally locate the compact disc in the compact disc lifter during pickup, but also to properly locate the compact disc during the process of placing the compact disc on a tooling fixture. During the placement process, the nose is placed onto the tubular-shaped registration pin, collapsing and compressing the coiled spring 207 as the compact disc lifter is forced downwardly by the roller 215.

Figure 7:
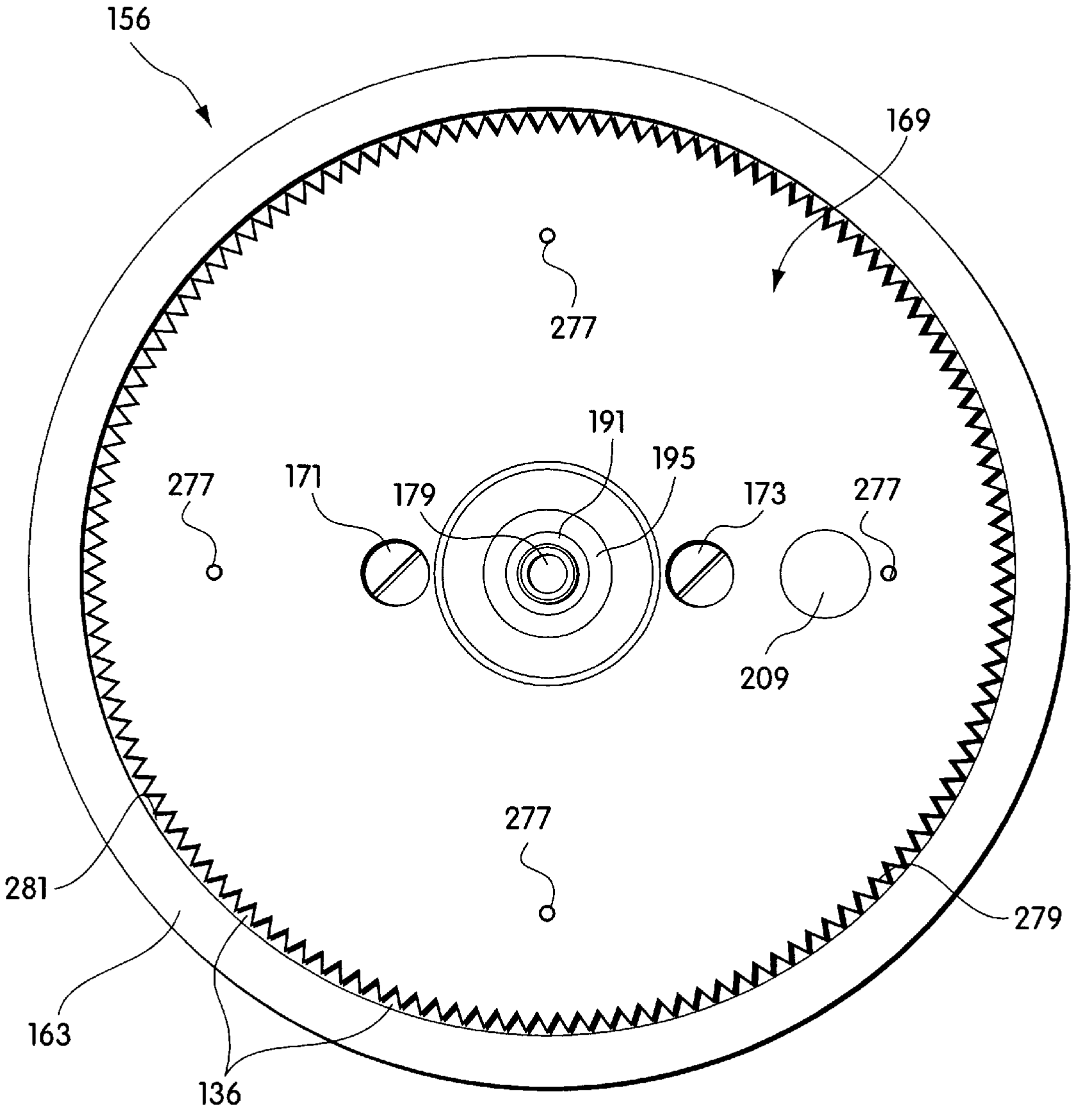
FIG. 7 is a bottom plan view of the compact disc lifter shown in FIG. 6 with the compact disc removed so as to better show the saw-toothed periphery of the deflector plate of the compact disc lifter.

Some of the compressed air introduced into the body member 159 is discharged or bled through the four openings in the deflector plate member referred to by reference numeral 277 (FIG. 7). The size of these openings can vary somewhat; however, openings having a diameter of about 0.029 inches will be found satisfactory. The main thing is that such openings be large enough in diameter to provide a cushion of air between the bottom surface of the deflector plate member 169 and the top surface of the compact disc for the compact disc being lifted. The cushion of air helps to cushion the compact disc when being picked up possibly avoiding chipping or cracking the compact disc. This cushion of air in the compact disc lifter above the top surface of the compact disc 130 is also advantageous when vacuum is released to deposit the compact disc onto the registration pin of the tooling fixture, later to be described. It ensures that no vacuum is between the bottom surface of the deflector plate member and the top surface of the compact disc and helps to speed up the deposit of the compact disc onto the tooling fixture. The presence or absence of a compact disc in the cavity of the compact disc lifter is sensed by the proximity switch 209. Thus, a signal is sent to the control apparatus, to be later called out to notify the printer as to whether or not a compact disc is present in the approaching tooling fixture to be printed.

Although, in the practice of the invention, the periphery of the deflector plate member 169 has been provided with a saw tooth configuration, this need not necessarily be the case. The same result desired can be accomplished by providing an annular-shaped opening between the outer peripheral edge 281 of the deflector plate member 169 and the inner peripheral edge of the annular-shaped seal 185. This is somewhat less preferred, however, as it is most difficult and expensive to maintain the tolerances on the edge of the deflector plate necessary to provide an annular-shaped opening of uniform dimensions. Nevertheless, whether the edge of the deflector plate member is saw toothed or not, the main thing is that a sufficiently rapid flow of air be created so that, on being expelled to the atmosphere, a venturi effect is created resulting in a vacuum for causing the compact disc to be raised up as before described.

In order to verify that the elongated body member 191 has returned to its home position, following the deposit of a compact disc onto a tooling fixture or the deposit of a compact disc onto a platen pin after being off-loaded, there is provided on the compact disc lifter, a sensor 221. The sensor used in the practice of the invention is a conventional inductive proximity sensor. Nevertheless, other sensors can also be used provided they perform the same function. Thus, in the event the sensor 221 senses that the body member 191 has not returned to its home position, the system will shut down. This is an important feature of the invention to prevent damage. If the system is allowed to operate while a compact disc lifter remains in the down position, the compact disc lifter will eventually collide with the platen apparatus or the transport apparatus, or both, possibly resulting in considerable damage to either the platen apparatus, the pick-and-place apparatus, or the tooling fixture support means, or all of them.

Figure 12:
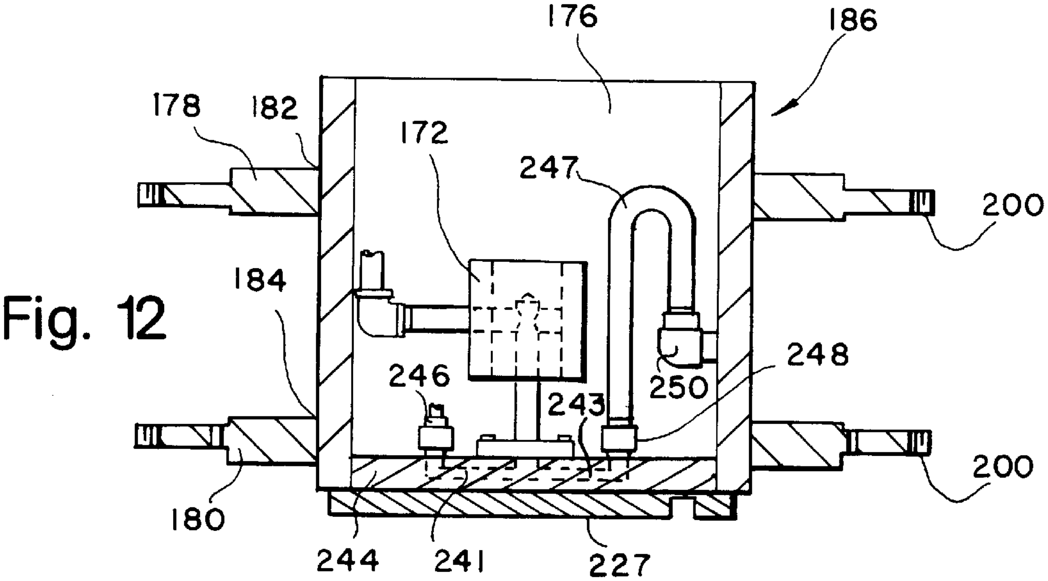
FIG. 12 is a side view in cross-section of the sprocket drive means shown in FIG. 10, showing the double sprocket drive members of the sprocket drive means being superposed one above the other, these members being connected to the sprocket hub and showing the rotary coupling as shown in FIG. 2 inside the sprocket hub connected to the fixed vacuum source but not showing the fixed vacuum source, the manifold provided in the bottom of the sprocket hub connected to the rotary coupling and the connection between the vacuum manifold and the sprocket valve but not showing the sprocket valve nor the means for connecting that valve to the tooling fixture.

Below the rotary coupling 170 (FIG. 2) there is provided another pneumatic rotary coupling 172 which serves to connect the stationary vacuum source 174 to each of the tooling fixtures 128, according to another aspect of the invention. The stationary vacuum source can be located anywhere relative to the transport apparatus, e. g., mounted to the framework for the transport apparatus, or in a location distinct therefrom, if desired. As shown in FIG. 2, the rotary coupling 172 is located within the cavity 176 of the elongated, annular-shaped shaft member or sprocket hub 186 of the sprocket drive means 18. The sprocket drive means further comprises the sprocket drive members 178, 180, sprocket drive member 178 being superposed above sprocket drive member 180, as best seen in FIG. 12 of the drawing. The sprocket drive members are each of the same diameter and concentric to one another, and lie in horizontal planes in parallel disposition to one another.

The sprocket drive members 178, 180 are each provided with centrally disposed circular-shaped openings 182,184, respectively, to each of which is fixedly secured the elongated annular-shaped sprocket hub 186. This can be accomplished by various means known to the art, e.g., by welding. The important consideration is that the sprocket drive members be provided in horizontal planes parallel to one another. The elongated, annular-shaped hub 186 is open at its top end, as shown in FIGS. 2 and 12.

Figure 11:
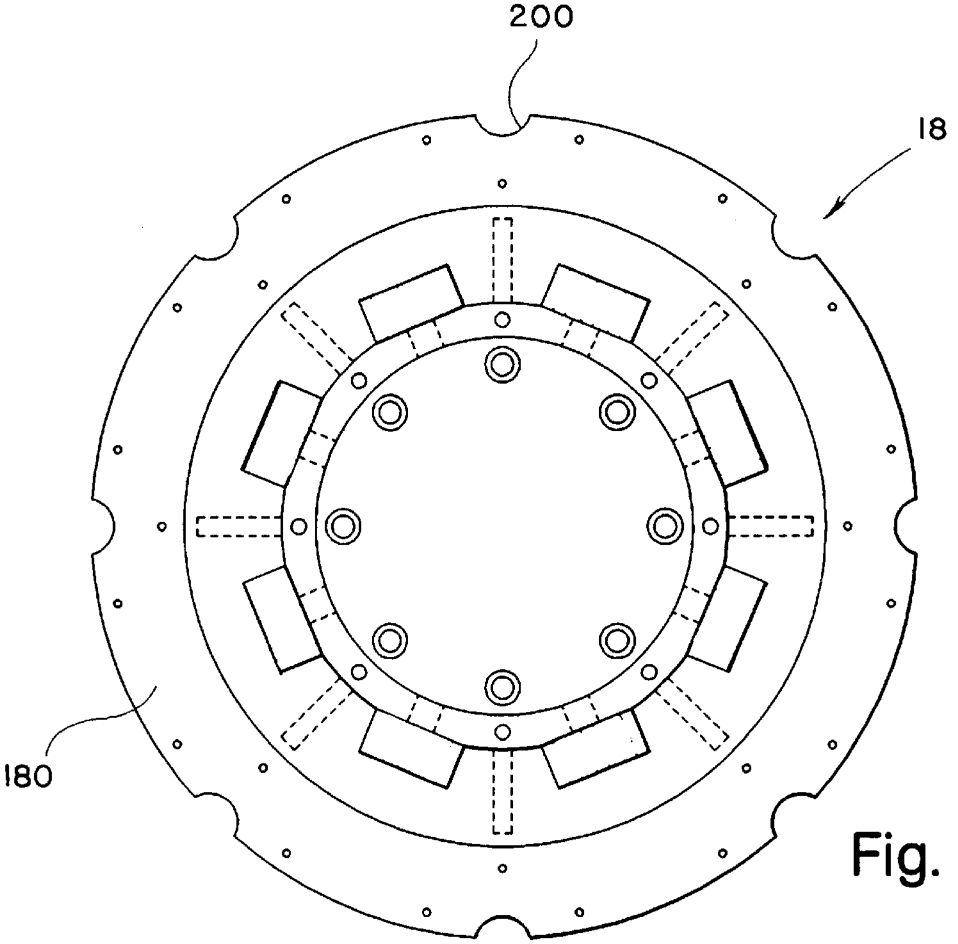
FIG. 11 is a top view of the sprocket drive means for the segmented drive chain showing the cutouts provided in the perimeter of the sprocket drive members, these cutouts being engaged with the top and bottom rollers provided on the front and back ends of a drive chain segment.

Turning now to FIGS. 1, 11 of the drawing, it will be seen that a plurality of cutouts 200 are provided in the peripheral edges of the sprocket drive members 178,180. These cutouts are each in the shape of a semi-circle and are each of the same radius in each of the sprocket drive members. The cut-outs provided in the top sprocket drive member 178 are in alignment with those provided in the bottom sprocket drive member 180. The radius of the cut-outs 200, importantly, is only slightly larger than the radius of top and bottom rollers 70 and 72 provided on the drive chain segments or links 48 (FIGS. 9, 10).

The segmented drive chain 16, as will be more readily appreciated by reference to FIG. 1, wraps around the sprocket drive members 178, 180, in its course of travel. In doing so, the top and bottom rollers 70, 72 of next adjacent drive chain segments 48 are engaged by next adjacent cutouts 200 of the top and bottom sprocket drive members. Thus, when the sprocket hub 186 is rotated by servo motor 190 (FIG. 2), the sprocket drive members are caused to rotate, and this, in turn, causes the segmented drive chain 16 for the transport apparatus to be driven. Those skilled in the art will readily appreciate that adjacent drive chain segments 48 are connected to one another so that a vertically disposed pivot line is created (FIGS. 1, 11). Otherwise, it would be impossible for the drive chain to wrap around the sprocket drive members. It will be appreciated also that FIG. 1 shows an exaggerated view, for sake of clarity, of the segmented drive chain, hence transport apparatus, wrapping around the sprocket drive means. There is, of course, no separation of one drive chain segment 48 from another; however, the support members themselves are separated at their outer ends, as shown. Those skilled in the art will also appreciate that, importantly, in wrapping around the sprocket drive members, a chord of the circle being circumscribed is defined by each drive chain segment. The purpose for this will soon be disclosed.

Although eight cutouts 200 are shown to be provided on the sprocket drive members 178, 180 (FIG. 10), this need not necessarily be the case. The number of cutouts will depend somewhat upon, among other things, the diameter of the sprocket drive members, the lateral distance between the two straight runs of the transport member, the length of a drive chain segment, and the angular distance between adjacent cutouts on the sprocket drive members. Those skilled in the art will be able to select sprocket drive members having the desired number of cutouts therein for optimum operation in any given situation. In general however, the more cutouts provided on the sprocket drive members, the smoother the operation of the drive chain will be, and the closer to constant speed that can be maintained along the straight line runs 20,22.

Whatever the number of cutouts provided in the sprocket drive members, however, they should be spaced equally around the periphery of the sprocket drive members. As best appreciated by reference to FIG. 1, the rollers 70, 72 are engaged by the cutouts 200 of the top and bottom sprocket drive members. The rollers 70, 72 of the next adjacent link behind are then engaged by the next cutouts counterclockwise. The cutouts 200, in any event, must be so located that the top and bottom rollers 70, 72 of a drive chain segment will be engaged by the cutouts of the top and bottom sprocket drive members. It will be appreciated by reference to FIG. 1 that the sprocket drive members 178, 180 are in engagement with four drive chain segments at any one time, this resulting from the fact that the members are provided with eight cut-outs and there are two parallel runs.

On completing the movement around the curved path 24, i.e., the sprocket end of the segmented drive chain, the top and bottom rollers 70, 72 of successive drive chain segments are engaged in the top and bottom guide rails 90,92 provided in the straight side run 22. Thus, the interconnected drive chain segments 48 are caused to move in a straight line direction until the leading drive chain segment reaches the curved path 26 provided at the end of the transport apparatus opposite the sprocket end. At that point, the top and bottom rollers in each drive chain segment, in turn, are engaged by the curved portion connecting together the ends of the inner guide rails provided in the straight line runs 20,22. Thus, the top and bottom rollers engage and roll on this curved surface causing the drive chain to make a 180 degree change in direction, the same as at the sprocket drive means end of the segmented drive chain. The top and bottom rollers 70, 72 of a drive chain segment 48 then engage the linear guide rails in the straight line run 20, as earlier disclosed, and the drive chain, hence the transport apparatus, continues to move in a straight line direction until again reaching the sprocket drive means end of the segmented drive chain. At that point, the compact discs may either be off-loaded or continued in the curved path of travel around the sprocket end for application of further decoration to the compact disc by one or more of the printers. While traveling in the straight line runs, the top roller of a drive chain segment, due to the load of the support means, rotates on the inner surface of rail member 96 and the bottom roller rolls on the inner surface of rail member 98 (See FIG. 9).

By reference to FIG. 1, it will be appreciated that the lateral edges 234, 236 of the support members 118 are parallel to one another and in perpendicular disposition to the side rails defining the straight runs 20, 22. The outer edge 135 and inner edge 238 of the support members are parallel to one another and to the side rails in the straight runs. The lateral edges 234, 236 of next adjacent support members are spaced apart from one another so as to provide a small but uniform gap of about 0.020 inches between them to allow for machining tolerances. It is important that the lateral edges of the support members do not come into contact with one another so as to possibly cause binding of the rollers in their tracks and cause misaligned of print, as later more fully disclosed. The location of the compact disc fixtures on each of the support members is such that the intersection of the centerpoint of a compact disc fixture with the midpoint line between the lateral edges of the support member is located on a circle concentric to the circle circumscribed by the sprocket drive members, when the transport apparatus is moving around the sprocket end of the apparatus. Thus, in traversing the curved path 24 defined by the sprocket drive members, those skilled in the art will appreciate that the drive chain links pivot at each end thereof whereby the inner edges 238 of the support members each being mounted to a drive chain link critically defines a chord of the circle circumscribed by the sprocket drive members.

At the bottom end of the annular-shaped hub 186 there is provided a closure 227. To this bottom closure (FIG. 2) there is operatively connected in usual fashion, e.g., threaded fasteners, a lower speed reducer 188, this speed reducer being operatively connected in turn to the servo motor 190. The servo motor 190, as will be readily appreciated, provides rotary movement of the annular-shaped sprocket hub 186, hence the sprocket drive members 178, 180. Thus, the segmented drive chain 16 for the transport apparatus is driven at the desired speed, as soon will be better disclosed.

Connected to the bottom of the top rotary coupling 170 and to the top of the bottom rotary coupling are conventional top and bottom electronic location devices or encoders 240, 242, respectively. The top and bottom encoders are connected to one another via conventional electronic circuitry located in the elongated housing member 245 and to the programmable computer controller (not shown). Each of the encoders should have, in the more preferred aspect of the invention, the capacity of dividing each revolution thereof into 360, 000 distinct electronic pulses. This allows an accuracy at the radius of the compact disc lifter relative to the centerpoint of the compact disc on the platen of less than 0.001 inch. Nevertheless, it will be appreciated by those skilled in the art that the selection of the encoder depends upon the accuracy desired. The greater the number of electronic pulses, the greater the accuracy, e.g., if an encoder is selected that is capable of dividing each revolution into a greater number of electronic pulses, the accuracy can be even less than 0.001 inch. Nevertheless, this degree of accuracy is believed suitable for the intended purpose. By connecting the outside of the encoders 240, 242 together, hence to the framework of the apparatus, and the inside of the encoders to the center of the sprocket hub and the load/off-load apparatus, respectively, via rotary couplings 170, 172, as shown in FIG. 2, the computer control means can tell the servo motors 166, 190 exactly where to be at any point in time to match the speed of the segmented drive chain, and when to be sitting still.

At the bottom of the sprocket hub 186 there is provided a horizontally disposed manifold member 244 best seen in FIG. 12, this manifold member being connected to the stationary vacuum source 174 by means of the rotary coupling 172 located centrally in the cavity 176 of the sprocket hub. The manifold member used in the practice of the invention comprises a circular-shaped member defined by planar top and bottom surfaces. The diameter of the manifold member is such as to allow it to be included within the bottom end of the annular-shaped sprocket hub. As will be better appreciated by reference to FIG. 12, a tubular-shaped shaft member extends vertically upwardly from the center of the manifold member and communicates with an opening provided centrally in the manifold member. This opening extends downwardly into the manifold member terminating at and communicating with eight (8) elongated openings, two of which are shown in FIG. 12) extending radially outwardly from the center of the manifold member. These openings, denoted by reference numerals 241, 243, each terminate at an opening extending vertically upwardly from the manifold member and each communicates with a conventional pneumatic fitting, only pneumatic fittings 246, 248 being shown in the drawing for sake of clarity.

Figure 5:
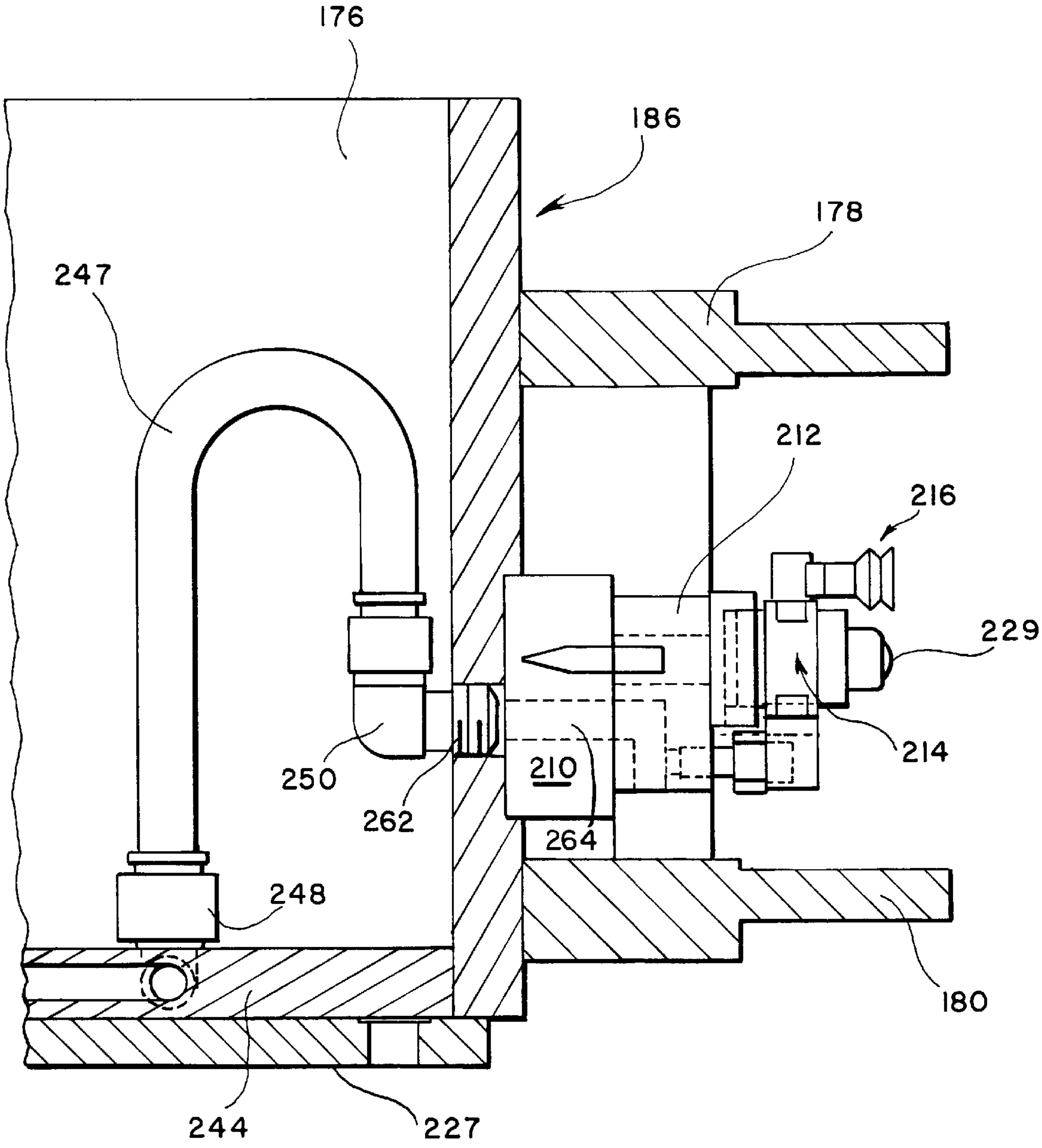
FIG. 5 is a view in cross-section showing a portion of the sprocket hub, and sprocket drive members, the sprocket valve mounted to the sprocket hub and mounting block therefor, the means for activating the sprocket valve, and the suction cup provided on the discharge side of the sprocket valve for mating with the check valve mounted to the support member for the tooling fixture, as shown in FIG. 3.

Mounted to the inside circumferential wall of the sprocket hub 186 are a plurality of L-shaped pneumatic fittings denoted by reference numeral 250, only one of which is shown in FIG. 2. Eight such fittings are, of course, provided, each being mounted to the sprocket hub wall and being connected by means of a tubular-shaped conduit 247 (FIG. 5) to one of the fittings on the manifold member 244 such as denoted by reference numerals 246,248. The vacuum manifold member 244, as will be readily appreciated by those skilled in the art, serves to distribute the vacuum from the stationary vacuum source 174 via rotary coupling 172 to each of the sprocket valves 214 (best seen in FIG. 3), later to be more fully disclosed. Although the vacuum manifold 244 will be found quite satisfactory in the practice of the invention, manifold members of other construction can also be used. If desired, the rotary coupling 172 can be directly connected to the fittings provided in the wall of the sprocket hub.

The indexing motors, speed reducers, and encoders used in the practice of the present invention are all commercially available. Indexing motors 166 and 190 are available under the trade designations Electrocraft F-4050-Q-HOOAA and Electrocraft S-6100-Q-HOOAA from Minarik Electric Co. of Littleton, Mass. The speed reducers 168 and 188 are available from Dojen of Salem, N.H. under the trade designations Dojen MO5 105:1 and Dojen MO-54:1, respectively. The encoders are available from Heidenhain of Salem, N.H. under the trade designation Heidenhain Ron 2750009-18000. These particular apparatus means are not critical to the practice of the invention. Others can also be used. It is believed that one skilled in the art will readily be able to select any such a device that best suits the needs of this invention. The main requirement in the case of the upper servo motor or indexer and reducer is that very little backlash is produced. This feature is necessary for accurate positioning of the compact disc lifters on the load/off-load apparatus for loading a compact disc onto a tooling fixture and for off-loading of a compact disc from the tooling fixture. The servo motors and reducers must, of course, be sized to handle the torque and loads placed upon them by the system.

The rotary couplings 170, 172 used in the practice of the invention are custom designed due to the sizes needed; nevertheless, they are like such couplings commonly used and available commercially in smaller sizes. Rotary coupling 170 is designed so that it surrounds the shaft 287 and an elongated annular-shaped member 295 which surrounds the shaft 287. Thus, the power and control wiring are passed upwardly through the slip ring 291 from the bottom of the shaft 287 and out the top end of the shaft to be connected to the various devices. Air is introduced into the annular-shaped elongated member 295 surrounding the shaft 287 via inlet conduit 289 connected to the source of compressed air. Air exits from the member 295 via an outlet fitting (not shown) for connection to the banks of valves earlier disclosed. Appropriate seals are provided so that the compressed air does not the escape except through the exit fitting, as desired.

Figure 15:
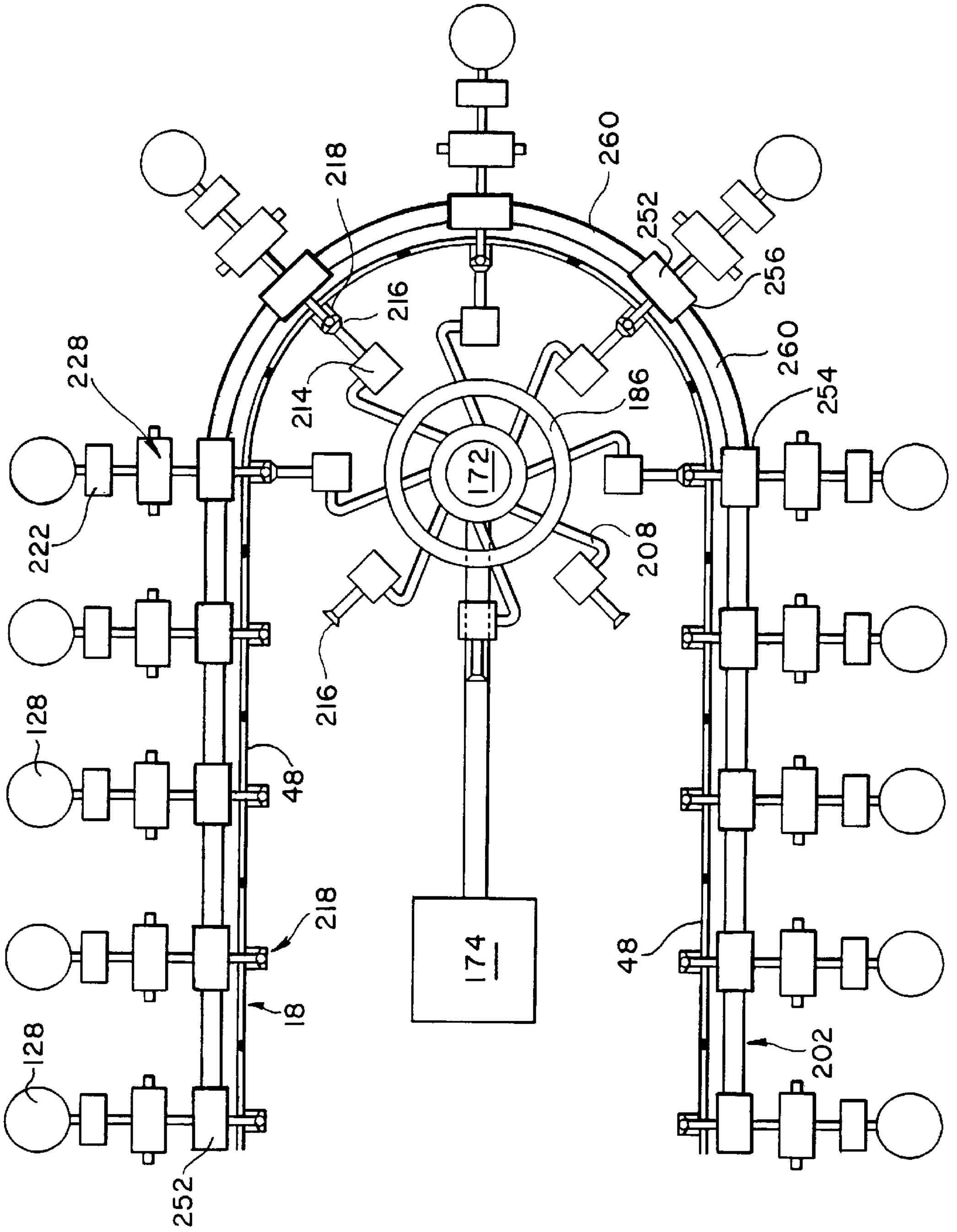
FIG. 15 is a simple schematic partial top view at the sprocket drive end of the transport apparatus shown in FIG. 1, but not showing the loading/off-loading system, the platen apparatus, or sending/receiving apparatus, printing and other work stations, but showing the traveling vacuum manifold of the invention mounted to the segmented drive chain of the transport apparatus (but not showing the means for mounting the vacuum manifold to the transport apparatus), the stationary vacuum source, the rotary coupling connected thereto, the sprocket valves, the suction cups at the ends of the sprocket valves, the check valves, the conveyor valves, filter, and tooling fixture (compact disc) whereby vacuum is transferred from the moving vacuum manifold independently to each of the compact disc fixtures but not showing the supporting means for the tooling fixtures.

Referring now again to FIG. 3 of the drawing, there is shown in that figure a vacuum manifold member 252 fixedly connected to the underside of the support means 118. Nevertheless, if desired, the vacuum manifold member can be mounted to the drive chain link, or even to both the support means and drive chain link. Next adjacent vacuum manifold members 252 are interconnected together via the opening 67 (FIG. 4) in the individual drive chain segments 48 by means of short lengths of flexible plastic tubing 260, as best seen in FIG. 15, hereinafter further described. Thus, there is provided a continuous and moving vacuum manifold 202 that supplies vacuum to each of the compact disc tooling fixtures 128 and that travels with and in the same path of travel as does the transport apparatus.

Figure 16:
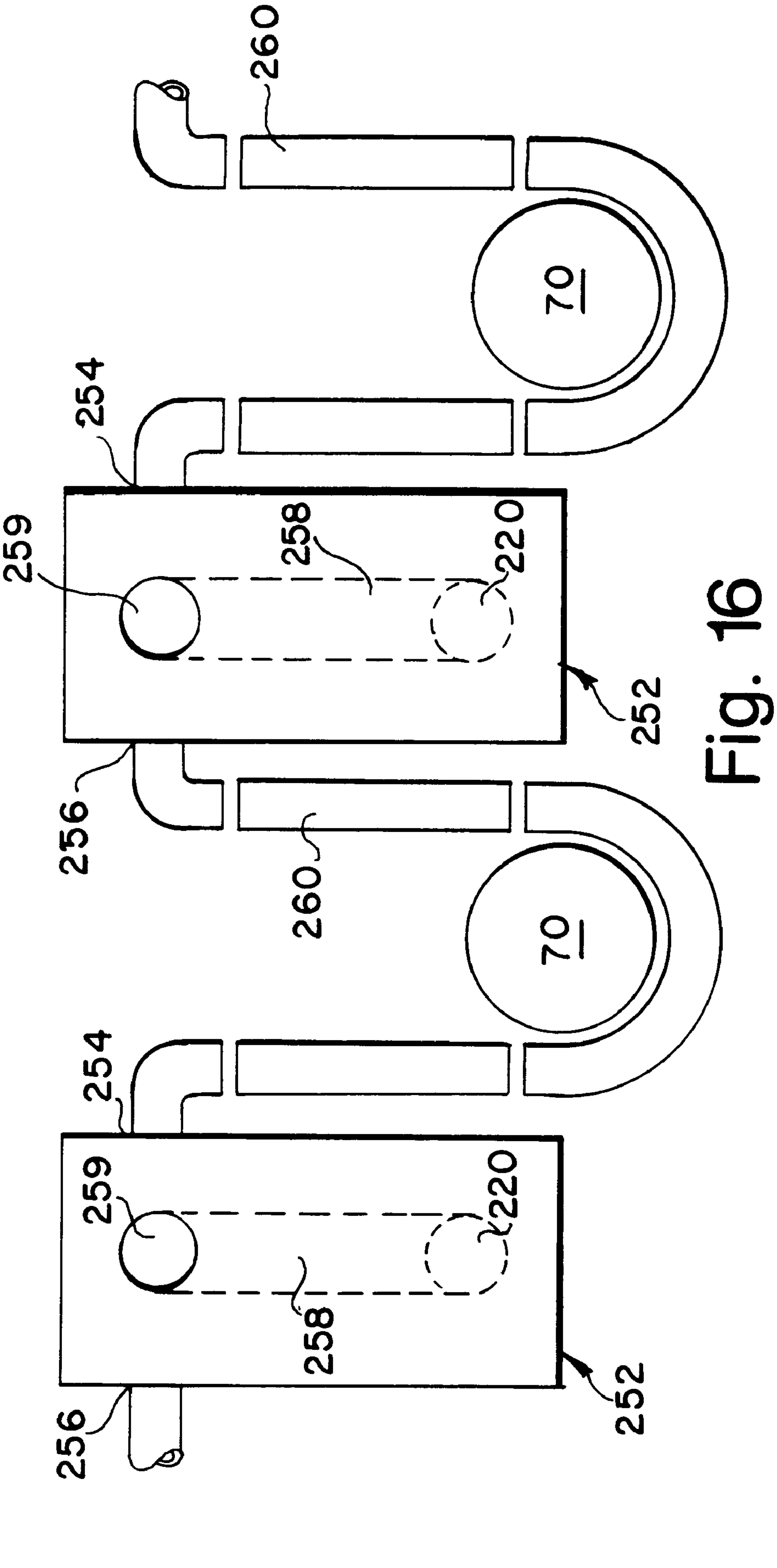
FIG. 16 is a partial schematic view of the vacuum manifold of the invention showing next adjacent vacuum manifold members being connected to one another by short lengths of plastic tubing, the ends of the plastic tubing being connected to the vacuum manifold members in front of the drive chain pitch line and then wrapping through the hole in the drive chain link behind the pitch line.

The manifold members 252 are each provided with an inlet opening 254 and an outlet opening 256, both being located at one end of the manifold member, as will seen by reference to FIGS. 3,16, only opening 254 being shown in FIG. 3. These openings, as shown, are in direct opposition to one another; however, this need not be the case. Nevertheless, having the openings so located provides ease in machining, as well as ease in connecting one vacuum manifold member to another. Openings 254,256 are in communication with an elongated passageway 258 provided in the manifold member which extends lengthwise thereof, as shown in the drawing. The passageway 258 via a conventional fitting 259 connected thereto provides communication of the fixed vacuum source with the tooling fixture valve 228, as later more fully disclosed. The manifold member 252 is further provided with opening 220, providing communication with the check valve 218.

The vacuum manifold members 252 are, importantly, interconnected one to another by means of uniformly short lengths of flexible tubing 260, one end of the tubing being connected to the outlet opening 256 on a manifold member and the other end of the tubing being connected to the inlet opening 254 of the next adjacent manifold member (see FIGS. 15, 16). This can be accomplished by various means known to those skilled in the art. Although not shown in the drawings, the tubing ends are connected to the manifold members in front of the pitch line of the segmented drive chain and wrap around the rollers 70, 72 of a drive chain segment behind the pitch line of the segmented drive chain. That being the case, the lengths of tubing average out on the pitch line. Thus, and this is critically important to the practice of this feature of the invention, the short lengths of flexible tubing remain the same length whether traveling in a straight line or around a curved end. This is important so that the lengths of tubing are not stretched in going around one of the curved ends whereby the opening of the tubing might be partially closed and the vacuum affected. Various known plastic tubing may be found suitable for this purpose, the main requirement being that the vacuum manifold members 252 be connected together so as to provide a fluid tight passageway and that the tubing not collapse under the vacuum used. A conventional polyurethane tubing (0.5" ID) will be found suitable for this purpose. Those skilled in the art will appreciate, of course, that the connecting lengths of tubing must be sufficiently flexible so as bend along with the pivoting drive chain links in transition from the straight line path of travel to being curved, and then back to a straight line path of travel.

In the wall of the sprocket hub 186 there are provided a plurality of circular-shaped openings 262 (FIG. 5), only one of which is shown in the drawing. To each opening there is mounted an L-shaped pneumatic fixture 250 as earlier disclosed. Mounted to the outside peripheral surface of the sprocket hub 186, and in direct opposition to an opening 262, there is provided a sprocket valve base member 210. These base members each provides a means for supporting a sprocket valve holder 212 which, in turn, supports a sprocket valve 214. In each base member 210, there is provided an opening 264 in direct opposition to an opening 262 which provides for communication between the stationary vacuum source and the inlet side of each sprocket valve 214. The outlet sides of the sprocket valves 214 each communicates with a sealing member 216. A conventional flexible rubber suction cup has been found quite satisfactory for this purpose; however, other means can be used provided they serve the same purpose. Thus, it will be appreciated by those skilled in the art that the sprocket valves 214, as are the sealing members 216, are each mounted to the sprocket hub 186 and rotate with it. It will also be appreciated that eight (8) sprocket valves are mounted to the sprocket hub, one in association with each of the arms provided on the load/off-load apparatus.

The check valve 218 is mounted so as to be located in the opening 67 (see FIG. 10) of the drive chain segments 48, the purpose for which will soon be disclosed. The check valves, one each for a sprocket valve, each communicate on one side with sealing member (suction cup) 216 during operation of the system. The check valve 218 has a conventional male pipe fitting 266 on the other side that provides a passageway for communication with the opening 220 provided in the vacuum manifold member 252. This provides communication of the check valve with the elongated passageway 258 in the vacuum manifold member, as earlier disclosed, and with the tooling fixture valve 228 on the support manifold member of the transport apparatus.

The vacuum member 252 is provided with a conventional vacuum fitting 259, as earlier disclosed, that communicates with the elongated passageway 258. To this fitting there is connected one end of a length of conduit, the other end being connected to a fitting (neither of which is shown in the drawing) provided on the valve holder or support post 226 for the tooling fixture valve 228. This valve support post 226 is provided with a passageway 224 which communicates with the last mentioned fitting. The tooling fixture valve support post 226 is connected to a mounting block 237 attached to the underside of the support means 118 for the tooling fixture for mounting a conventional filter 222. Thus, vacuum can be transferred from the fixed vacuum source to the tooling fixture via the vacuum manifold and manifold member, the tooling fixture valve, and the filter. More about this later.

The sprocket valves 214 can be any 3-way valve, e.g., a Humphrey 3-way manually operated valve (V12SB-3-

10-22VA 1) available from Humphrey Products of Kalamazoo, Mich. was used in the practice of the invention; however, other 3-way valves can also be used. These valves used are activated with ball end activation. Nevertheless, electronically activated sprocket valves can also be used, if desired. The tooling fixture valve 228 can be any three-way valve provided, like the sprocket valve, it is capable of transferring vacuum. A three way valve that will be found suitable for the purposes of the invention is commercially available from Kay Pneumatics under the trade designation Part #KSPA 1435. This is a conventional mechanically cam operated valve that can be switched from pulling vacuum on the compact disc to hold it in place while it is being transported to breaking of vacuum on the compact disc so that it can be off-loaded from the tooling fixture. A filter will be found most advantageous when provided in combination with the tooling fixture valve as such will prevent particulate material such as dust particles from collecting in any of the valves in the system possibly causing the valves to bind or leak. The filter used in the practice of the invention is available from SMC Corporation of Tokyo, Japan under the trade designation NZFA 100-T01 ZS. Nevertheless, any filter can be used provided it performs the same purpose. The check valves used in the practice of the invention are available from PIAB of Akersberga, Sweden under the trade designation Part No. 31.16.004). Other check valves can be used in the practice of the invention, however, provided they perform the same function as those used above-mentioned. Those skilled in the art can readily select valves that will accomplish the intended purposes set forth herein.

Referring now to FIGS. 3, 4, the transfer of vacuum from the vacuum manifold member 252 to the tooling fixture 128 will now be more particularly disclosed. Following the arrows as seen in FIG. 4, the flow of air is downwardly from the annular-shaped groove 131 in the tooling fixture 128 to the filter 222 via the elongated openings 137,139 provided in the tooling fixture and support means 118 for the compact disc, respectively. The bottom of the elongated opening 139 communicates with a downwardly extending elongated opening provided in the mounting block 237 for the filter. This opening, in turn, communicates with the entry end of the filter 222, the discharge end of the filter being in communication with the top end of an elongated opening 224 extending vertically downwardly and provided in the support post for the tooling fixture valve. This opening in the support post directs the flow of air down to the tooling fixture valve 228 and then vertically up again in the support post 226 (FIG. 3) to the fixture therein that provides communication with the vacuum manifold member 252.

The transfer of vacuum from the fixed vacuum source 174 independently to each of the tooling fixtures 128 and to the compact disc located therein will be readily appreciated by those skilled in the art by reference to the simplified schematic view shown in FIG. 15. Vacuum, as shown in FIG. 15, is delivered to the system from the fixed or stationary vacuum source 174, i.e., a conventional vacuum pump, to the rotary coupling 172. The rotary coupling is located in the cavity 176 (FIG. 2) provided in the annular-shaped sprocket hub 186. The vacuum is then transferred from the rotary coupling 172 (shown in FIG. 15) outwardly (via the manifold 244) as by way of the individual passageways or tubular-shaped spoke members or conduits referred to, in general by reference numeral 208, to supply each of the sprocket valves 214 with a constant source of vacuum.

The tooling fixtures 128 (FIG. 15) each communicates with a tooling fixture valve 228 via a filter 222. The tooling fixture valves each communicate with a manifold member 252, these being interconnected by flexible lengths of plastic tubing 260. Although the lengths of tubing 260 passing around the curved path shown in FIG. 15 appear to be somewhat longer than those on the straight run, this should not be the case. The lengths of tubing connecting the discharge end of one vacuum manifold member to the entry end of the next adjacent vacuum member should be of equal length. The check valves 218, as will be appreciated from the foregoing, are mounted to, and communicate with, the moving vacuum manifold member 252. The vacuum manifold members and check valves, in the practice of the invention, are preferably located within the open space 67 in each of the drive chain segments 48. This provides a compact design and conserves space. Nevertheless, the mounting of these members is not so restricted. Those skilled in the art will readily appreciate that such members can be mounted above or below the opening 67, though such is less desired.

In the preferred practice of the invention, however, the vacuum manifold member 252 and check valve 218 are mounted to the support member 118 for a compact disc fixture (not shown in this figure) so that the check valve is located in the center widthwise of the opening 67 in an individual segment 48. In the direction of height, the check valve desirably is located in the opening so as to come into direct contact with the suction cup 216, as shown in FIG. 15. Nevertheless, the important consideration is that the check valve be so mounted as to come into direct engagement with the suction cup so that suction will not be lost. In the direction of depth, the check valves need to be located so as to have the contact point of the suction cup 216 and check valve 218 on the pitch line of the segmented drive chair. This is necessary to minimize any lateral motion between the check valve and suction cup on being engaged and disengaged with one another.

Figure 17:
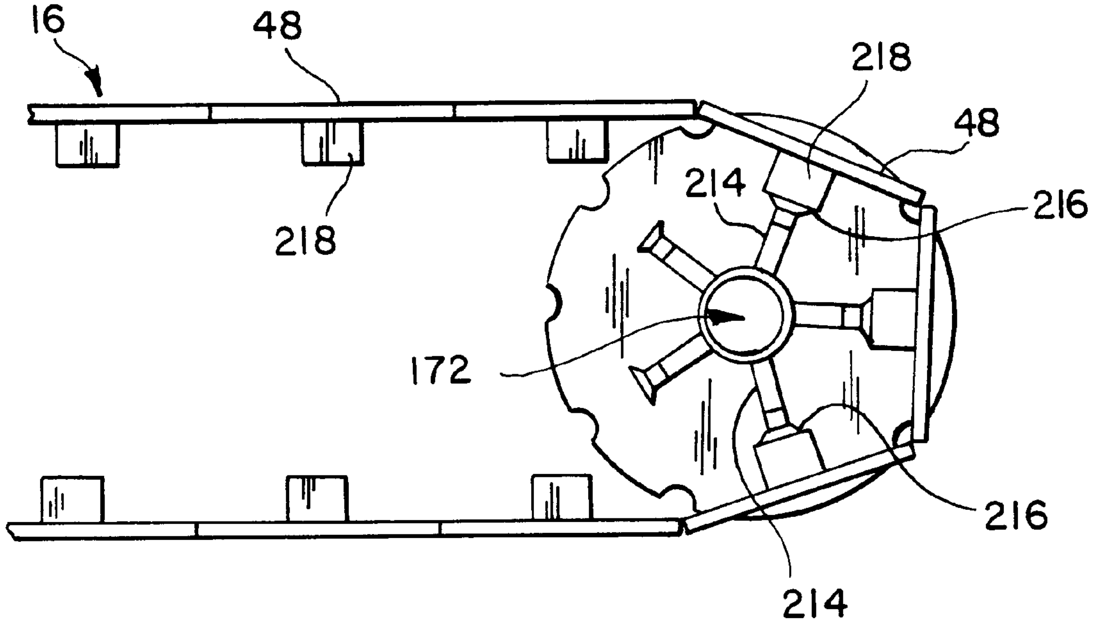
FIG. 17 is a simple schematic view in part at the sprocket drive means end of the transport apparatus not showing the vacuum manifold but showing three individual segments or links of the segmented drive chain (the rollers not being shown) being engaged by the cutouts in the sprocket drive members (only the bottom one being shown for sake of clarity), a check valve being engaged with a suction cup on a sprocket valve and one means for activation of the sprocket valves shown in FIGS. 2 and 3 for supplying vacuum to the vacuum manifold.

The linear spacing on the moving vacuum manifold between check valves must be such as to correspond with the radial distance of the sealing members provided on the sprocket hub 186. This is so that the ball activated sprocket valves 214 can be activated to transfer vacuum to the moving vacuum manifold. This activation will be best appreciated by reference to the simplified schematic view presented in FIG. 17. Thus, as the segmented drive chain 16 is passed around the sprocket hub 186 (not shown in FIG. 17 for sake of clarity), the drive chain segment 48 is presented as a chord of the circle defined by the circular-shaped sprocket drive members, only the bottom one of which is shown in FIG. 17. The check valve 218 provided on this chord mates with the suction cup 216, the bottom portion of which (FIG. 3), at the same time, depresses the ball 229 of the sprocket valve 214 in opposition to it. This opens the sprocket valve allowing vacuum to be transferred to the manifold member 252, hence to the compact disc tooling fixture via the tooling fixture valve 228.

As will be seen from FIG. 17, in this particular case, three sprocket valves are activated at one time. Nevertheless, the number of sprocket valves activated at any one time depends upon a number of factors, including the diameter of the sprocket drive members, the size of the individual drive chain segments, etc. In general, however, to minimize the effect of any leaks throughout the system and to reduce the time required to pump down the system to the desired vacuum at startup, the greater should be the flow between the vacuum source and the moving vacuum manifold. Thus, it is desirable to have a plurality of sprocket valves open at any one time. Those skilled in the art will appreciate, however, that the number of individual links that can be engaged with a sprocket valve at any one time depends somewhat upon where the drive chain is in its rotational cycle.

The number of sprocket valves provided around the periphery of the tubular-shaped sprocket hub 186 can vary from the eight shown in FIG. 15 of the drawing. This will depend, of course, upon the diameter of the tubular-shaped sprocket hub 186 provided and this, in turn, will depend upon the size of the individual drive chain segments or links used in the segmented drive chain, as well as the number of teeth or cut-outs 200 desired on the sprocket drive members 178, 180. The greater the number of teeth provided on the sprocket members, in general, will be the smoother the operation. The main thing, however, is that where a plurality of sprocket valves are provided as is contemplated by the preferred practice of the invention, the sprocket valves will be evenly spaced around the circumference of the sprocket hub. Nevertheless, in some cases at least, though less desired for the reasons previously stated, since the purpose of the sprocket valves is merely to replenish the vacuum in the moving vacuum manifold faster than it is being depleted, the system can be operated with only one sprocket valve.

The fixed vacuum source 174 used in the practice of the invention is a vacuum pump capable of pulling 28 inches Hg. Such a vacuum pump is available commercially from Ateliers Busch under the trade designation #SV 1010 B OOO H2XX Nevertheless, other vacuum means can also be used, depending somewhat upon the size of the vacuum manifold and the number of tooling fixtures to which vacuum is to be supplied, as well as the vacuum that must be provided. One skilled in the art can readily select that vacuum means that provides optimum performance in the practice of the invention.

Although the moving vacuum manifold, in the most preferred practice of the invention, comprises manifold members 252 fixedly attached to a support member for the compact discs and interconnected one to another by uniformly short lengths of flexible tubing, as earlier disclosed, this need not necessarily be the case. The vacuum manifold can, at least in some applications, comprise a plurality of sections of flexible conduit of equal length, each two next adjacent sections being interconnected together by a three-member fitting. In this case, two members of the fitting will interconnect the adjacent ends of two tubular sections together. The third member on the fitting will provide communication with an elongated passageway to which is connected the check valve and tooling fixture valve.

The plurality of sections of conduit of this less preferred vacuum manifold can be of various materials provided the material is flexible enough to be curved to the extent desired for mounting to the segmented drive chain and for traversing the curved paths provided at each end of the segmented drive chain, and a fluid-tight passageway is provided. The wall of the tubing must be strong enough, of course, so as not to collapse under the vacuum used. The length and number of such sections of tubing will depend upon the length and number of individual drive segments in the segment drive chain. Such an arrangement, however, is much less preferred as the sections of tubing each being of equal predetermined length have been found to undergo some stretching as the drive chain is passed around the curved paths of travel at each end of the;transport member, as more particularly disclosed herein. This can cause the tubing to collapse where the radius of curvature is relatively small such as found in an oval-shaped path of travel; however, this will not be the case where the transport member is of circular shape and a greater radius of curvature is provided.

Figure 13:
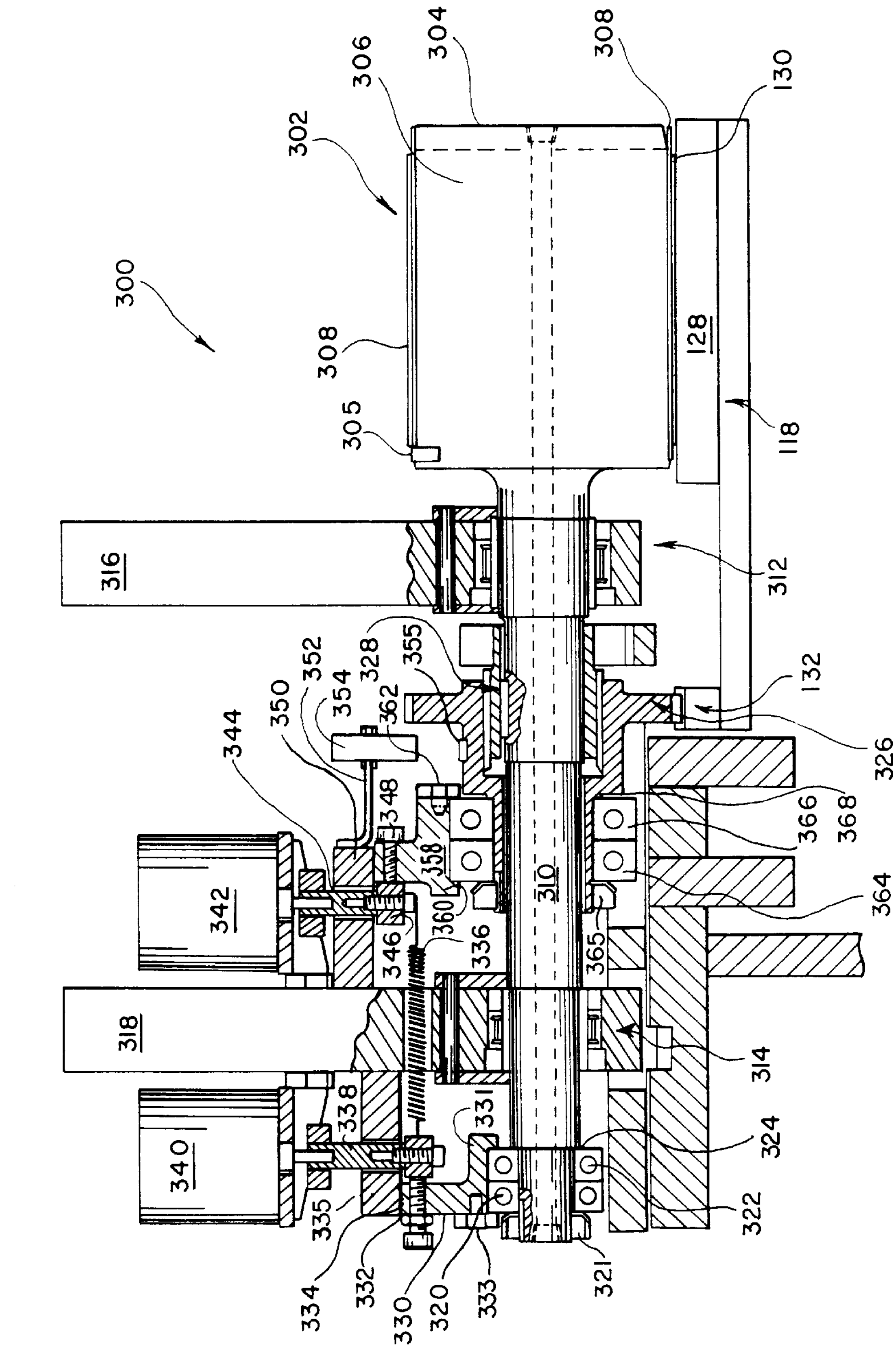
FIG. 13 is a schematic view in partial cross-section taken at a flexographic printing station showing the print roll plate in rolling contact with the top surface of a compact disc located on a tooling fixture provided on the support means for the tooling fixture, the rack segment located on the support means, the print roll gear member located on the axis of the print roll which meshes with the rack segment provided on the support means for driving the print roll, and the radial and lateral adjustment means for adjusting the print roll for precision printing of the compact disc.
Figure 14:
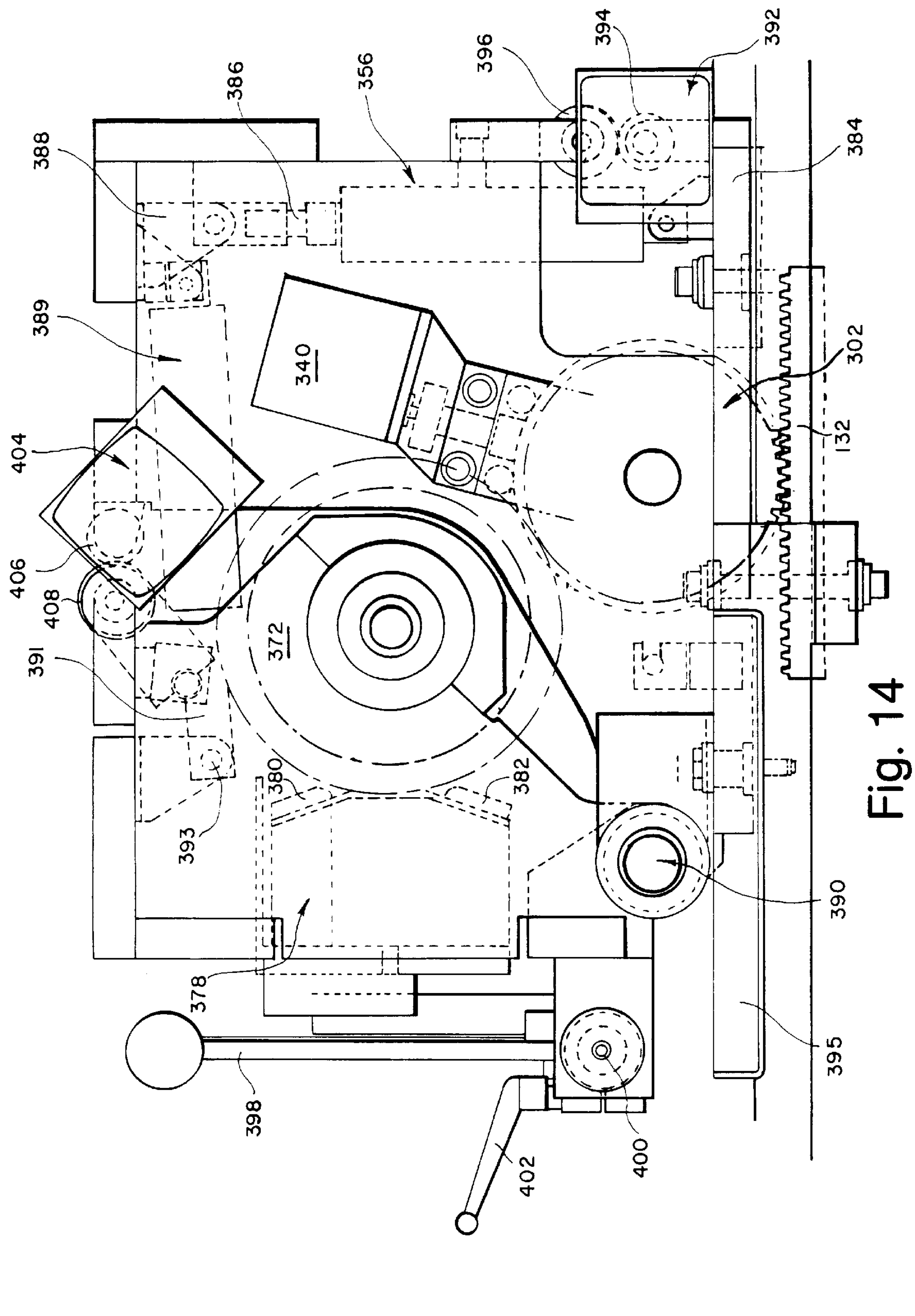
FIG. 14 is a partial side view of the printing station shown in FIG. 13, taken from the left side in FIG. 11, showing the meshing of the print roll gear and a rack segment, the anilox roll gear in meshing engagement with the print roll gear, the anilox roll frame, the lateral adjust motor for the print roll, the doctor blade chamber, the doctor blade chamber adjust lever, the doctor blade clamp, the print head lift cylinder, and the no part/no print apparatus.

Turning now to FIGS. 13,14 of the drawing, there is shown therein a flexographic printing station 300 according to the invention. The flexographic printing stations in the printing system shown in FIG. 1 are all of like construction as the one shown in FIGS. 13, 14, accordingly, only the printing station 300 will be fully described herein. Those skilled in the art will appreciate, however, that at each printing station a different color of ink or decoration is to be applied to the compact disc or other piece part.

The printing station 300 comprises a conventional flexographic print roll 302 comprising a circular-shaped body member 304 on the peripheral surface of which is provided an annular-shaped mounting sleeve 306 for a print plate 308, to be later more fully disclosed. The print roll 302 used in the practice of the invention is 4.524 inches and has the usual opposed guide pins 305 (only one of which is shown in the drawing) on its circumference for registration of the mounting sleeve on the print roll. The printing plate 308 is mounted to and secured on the sleeve by means of a conventional double-faced pressure-sensitive adhesive tape (not shown), this tape having been applied to the front side of the sleeve earlier, i.e., at the time the print plate is being prepared for printing. The printing plate is mounted in usual manner to the sleeve, as will later be more fully disclosed. As is usual the outer layer of the pressure-sensitive adhesive is provided with a release layer, which is removed at the appropriate time for mounting the print plate 308 to the sleeve 306.

Various commercially available double-face pressure-sensitive adhesive tapes can be used for this purpose; the main requirement is that sufficient adhesion be provided that the print plate be held to the sleeve without any slippage during printing. A double-face pressure-sensitive adhesive tape that will be found quite satisfactory for this purpose is available from the 3M Company under the trade designation Print Plate Mounting Tape #1040.

In the practice of the invention, the print plate used had a thickness of 0.045 inches in thickness. The outer radius of the combination, i.e. print roll (radius=2.262"), sleeve (thickness=0.040"), tape (thickness=0.040") and print plate (thickness=0.045") is 2.387 inches. Thus, the diameter of these components in operative combination with one another is 4.774 inches and the circumference is 15.00 inches. This, of course, is also the pitch diameter of the print roll gear 326, later to be more fully disclosed.

Although the dimensions set forth above for the print roll, etc. will be found quite suitable in the practice of the invention, those skilled in the art will readily appreciate, however, that such can be varied, if desired. Nevertheless, this will require substantial changes in the design and operation of the printing apparatus and transport member. A change in the diameter of the print roll necessarily requires a change in the diameter of the print roll gear and the pitch of the transport member for the compact discs. Those skilled in the art will understand that the configuration for the printing system is, in general, determined by the transport apparatus to be used.

In the practice of the invention, a pitch of 7½ inches was selected for the transport apparatus to hold a compact disc having a diameter of 4¾ inches (the space on either side being required in case of silk-screen printing). It was also decided, as a matter of design, that only every other compact disc is to be printed. With every other compact disc in a tooling fixture being printed this allows, quite advantageously, as will be readily recognized by those skilled in the art, for fewer UV curing stations. Thus, only one-half the number of curing stations are required as when printing every compact disc in succession. Another advantage is that such allows for better configuration of the load/unload apparatus. The printing of every third compact disc would require print speeds too high for the transport apparatus and cause vibration concerns, affecting the printing as well as the overall operation of the transport member. Thus, based upon these considerations, the repeat of the print roll (the circumference), as above disclosed, need also be 15 inches. In any event, whatever the distance between the nests or next adjacent tooling fixtures for the compact discs (center-to-center), the circumference of the printing plate's outer surface need be equal to the repeat of what is being printed on. The print roll must, of course, be mounted so that it is parallel to the top surface of the piece part being printed, e.g., a compact disc. The print roll must, run concentric to the transport apparatus pitch so that the contact line between the print plate and compact disc is uniform and at a tangent.

As shown in FIG. 13, the print roll 302 comprises an elongated, horizontally disposed, shaft member 310 which is supported for rotation in annular-shaped print roll bearings 312, 314, according to usual techniques. These print roll bearings are mounted to print head frame members 316, 318, respectively, the frame members for the printing rolls being importantly not connected to the frame members for the transport apparatus, the reason for which will soon be appreciated. The end of the print roll shaft member 310 is located in a pair of lateral adjust bearings 320, 322, the purpose for which will soon be disclosed. These lateral adjust bearings are of annular-shape with the outer peripheral surface of the inner lateral adjust bearing 322 being in a butting engagement with the circular-shaped shoulder 324 provided adjacent the end of the shaft member 310, as shown in the drawing. At the end of the shaft 310 there is provided a fastening means 321 that bears against the outer surface of the lateral adjust bearing 320, the purpose for which is to provide the lateral adjust bearing 324 against the shoulder 324. Although the shaft member 310 and the print roll 302 are integral, those skilled in the art will appreciate that such need not necessarily be the case. The shaft and print roll can be provided as separate units and then mounted together according to usual techniques.

Print roll gear 326, is mounted to the print roll shaft member 310 in conventional fashion, to prevent slippage on rotation of the shaft member, this is accomplised by gear spline hub 328. Importantly, as will be appreciated by those skilled in the art, the print roll gear must have the same pitch diameter as the print roll, as earlier disclosed. The print roll gear and print roll being connected together as shown is quite advantageous, as any adjustment in the height of the print roll gear results in a height adjustment being made also in the print roll.

The print roll gear 326 used in the practice of the invention is provided with teeth according to conventional technique that mesh with the teeth provided on the rack segment 132 located on each of the support means 118 (the top member of which only being shown schematically in FIG. 13 of the drawing) for each of the compact disc fixtures 128. The provision of the rack gear segments each in combination with a print roll gear during the course of travel of the transport apparatus is of critical importance. Thus, on linear movement of a gear rack segment 132, the print roll 302 at each printing station is caused to rotate and to imprint the decoration or information provided on the print plate onto the top surface of the compact disc 130. The gear rack segments not only provide for rotation of the print rolls but, quite advantageously, keep the support means, hence the compact disc tooling fixtures, in registration with the printing plates In the preferred practice of the invention, the print roll gear 326 and the rack segment 132 are each provided with helical teeth as this provides better contact between the print roll gear and rack segment than does a spur gear. With helical teeth, quite advantageously, two teeth on the print roll gear and rack segment are in contact with one another across the width of the print roll gear during operation. This makes for smoother operation. The size of the teeth and the spacing thereof for the print roll gear and rack segments used in the practice of the invention can be varied somewhat; however, 14 diametral pitch will be found quite suitable. There need be sufficient backlash provided between the teeth of the print roll gear and the teeth of the rack segment so as not to get binding between the two. Binding will result in chatter and show up as an undesirable pattern, i.e., distortion, on the compact disc being printed. The rolling contact between the print roll gear and rack segment need be smooth running within the involute range of the gear within a height adjustment range of from 0.0 to about 0.012 inches so as to allow some adjustment of the distance in height between the print roll and the surface of the compact disc being printed. These distance or height change adjustments may become necessary due to differing compact disc thicknesses, tooling fixture heights, print plate thickness, and the desired impression to be made by the print plate 308 on the compact disc 130 to be printed.

Located above the lateral adjust bearings 320,322 is an adjustment means for coarse lateral adjustment of the print roll shaft, hence the printing plate 308, comprising a vertically disposed bracket member 330 in which there is provided a horizontally disposed threaded opening through which extends a threaded lateral adjustment member 332. The bracket member 330 is provided with a downwardly extending leg 331 and a threaded member 333 threaded into a threaded dead bore in the bracket member 330. Thus, there is provided a U-shaped bracket, as shown in FIG. 13. This U-shaped bracket provides that the outer surfaces of the top portions of the lateral adjust bearings 320, 322 are bracketed. Any lateral movement of these bearing members, since bearing member 322 abuts the shoulder 324, causes lateral movement of the print roll shaft. The threaded member 333 is tightened to preload the bearings 320,322 to get rid of any bearing backlash. Afterwards, the lateral adjustment member 332 is turned to make the necessary course adjustment.

At the outer end of the lateral adjustment member 332 there is provided a lateral adjustment cam 334. This cam is a conventional linear cam that provides, in combination with the lateral adjustment member 332, a predetermined lengthwise adjustment of the print roll shaft 310, relative to the tooling fixture 128. For example, a 10 degree rotation of the lateral adjustment member 332 can provide a linear change of 0.001 inches laterally in the location of the print roll drive shaft 310, hence print roll print plate 308, relative to the surface of the compact disc being printed. This lateral movement is, of course, in a direction perpendicular to the travel of the transport apparatus. Thus, during setup of a run for printing, a coarse lateral adjustment can be made at any particular printing station to bring the colors being printed more into the desired registration parameters in a direction between the outer and inner ends of the support means. See FIG. 13.

Connected to the lateral adjustment member 332 is one end of lateral adjustment spring 336, the other end of which is connected to the radial adjustment bracket member 358.

The lateral adjustment spring has two purposes. The first is to pull the bracket member 330 in a direction to the right, i.e., toward the print roll whereby to keep the print roll shaft and lateral adjustment member 332 tight against the cam 334 so that any movement of the cam either to adjust the shaft in or out in the bearing members 312, 314 will be mimicked by the shaft. The second purpose is to pull the bracket member 358 to the left, to provide that the threaded radial adjustment member 348 is tight against the cam 346. Importantly, as will later be more fully appreciated, the bearing members 312 and 314 are needle bearings. This allows both lateral and rotational movement of the shaft 310. The print roll gear 326 being mounted with gear spline 328 allows lateral movement of the print roll shaft within the needle bearings.

The lateral adjustment cam 334 is connected to the bottom end of the downwardly extending drive shaft 338 of the lateral adjust motor 340. Shaft 338, as will be appreciated by reference to FIG. 13, passes through an opening provided in the horizontally disposed frame member 335 supporting the lateral adjust motor. This latter frame member is separate and distinct from the bracket member 330 housing the course lateral adjustment member 332. This allows the bracket member 330 to slide on the bottom of frame member 335. Thus, a coarse lateral adjustment can be made on setup, as earlier disclosed, with a finer lateral adjustment being made during printing of the compact discs. The lateral adjustment motor 340 is operated on demand by the operator when such an adjustment is deemed necessary to provide better color registrations This is accomplished through visual observation by the operator of the printed compact discs from time-to-time, and the operator then entering into the computer the desired lateral adjustment. The computer then sends a signal via the computer controller to the lateral adjustment motor. The motor causes the drive shaft 338 to rotate, this action causing rotation of the cam 334 against the lateral adjustment threaded member 332.

There are also means, as shown in FIG. 13, for providing coarse and fine radial adjustment of the print roll 302. The fine radial adjustment means comprises a radial adjustment motor 342 having a downwardly extending, elongated shaft member 344. This shaft member extends through an opening in the horizontally disposed frame member 350 supporting the radial adjustment motor. At the bottom end of shaft member 344 there is provided a radial adjustment cam 346 of conventional linear type. The radial adjustment cam 346, provides an adjustment of 0.015 inches over 300 degrees. Cams 334 and 346, as shown in the drawing, are fixedly mounted to the bottom ends of the drive shaft members 338 and 344, respectively, by means of conventional threaded fasteners located centrally in the cams and that extend upwardly into threaded bores provided in the respective drive shaft ends. Nevertheless, these cams can be connected to the bottoms of the drive shafts by any means desired. The important consideration is that the cams be fixed to the shafts so as be rotated only on rotation of the shafts to which they are attached. The adjustments made by the cams 334 and 336 will be found quite suitable in the practice of the invention Nevertheless, those skilled in the art will readily appreciate that the invention is not so limited. Other cams that provide other adjustment parameters may also be found satisfactory in some cases.

Connected to the frame member 350 is one end of an elongated arm 352. At the other end of the arm 352, there is provided a home sensor 354, the purpose for which is to sense a groove or indexing mark 355 provided on the print roll gear 326. Thus, when the print head is lifted, as later more fully disclosed, disengaging the print roll gear 326 from the gear rack segment 132 provided on the tooling fixture support means, e.g., during setup for a new printing run, and then re-engaged, the home sensor assures that the print roll gear 326 is in the right location rotationally before the print roll is lowered back into engagement with the rack gear segment so that the teeth of the print rear gear will properly engage with the teeth in the gear rack segment 132. The home sensor 354 used in the practice of the invention is a conventional inductive proximity sensor and is on all the time except when the sensor is directly above the groove 355. Nevertheless, other sensors known to those skilled in the art can be used to perform the same function, if desired.

The means for coarse radial adjustment of the print roll 302, hence the printing plate 308, comprises the bracket member 358 at the bottom of which is provided a downwardly extending integral leg 360. This leg, in combination with the threaded member 362 (like the threaded member 333 for the coarse lateral adjustment) provides a U-shaped bracket member as shown in the drawing. This U-shaped bracket member engages the outer surfaces of the annular-shaped radial adjust bearings 364, 366 at the outer peripheral edges. The bottom of the outer peripheral edge of radial adjust bearing 366 abuts against the circular-shaped shoulder 368, provided on the print roll gear 326. The threaded member 362 can be turned so as to take up any backlash in the radial adjust bearings 364, 366. A butting against the outer surface of the radial adjust bearing 364 is a fastening means 365, the purpose for which is to maintain the radial adjust bearings against the shoulder 368.

In making a coarse radial adjustment for providing better registration of the printed images according to the specifications set, the threaded adjustment screw member 348, the end of which contacts the cam 346, is turned in the appropriate direction. By this action, the bracket member 358 is caused to slide inwardly or outwardly along the horizontally disposed frame member 350 supporting the radial adjustment motor 342. This movement causes lateral movement of the print roll gear 326 on the spline 328, the spline being fixedly secured to the shaft of the print roll. The needle bearing members 312 and 314 turn this lateral movement into rotational movement of the print roll gear. The print roll gear being engaged with the gear rack segment then causes the gear rack segment to move. This movement thus adjusts the print roll in a direction along the path of travel of the transport member relative to the tooling fixture. Thus, those in the art will readily appreciate that the gear spline and needle bearings are a necessary combination in being able to make both lateral and radial adjustments to the printed images.

In operation, a fine radial adjustment of the print roll 302 is accomplished by rotation of the cam 346, this cam being in engagement with the end of the threaded member 348, by means of which coarse radial adjustment was made on setup. When cam 346 is rotated, this action places tension on the adjustment spring 336, while at the same time causing the radial adjust bracket member 358, and radial adjust bearings 364, 366 to be moved together as a unit either against the circular-shaped shoulder 368 and toward the frame member 316 or toward the frame member 318. This movement laterally, as will be appreciated by those skilled in the art, is made possible because of the spline 328 being provided between the print roll gear and the print roll shaft.

When the print roll gear 326 is moved laterally relative to the shaft 310 it advances or retards, i.e., it rotates the print roll 302 in a clockwise or counterclockwise direction. Thus, the relative position of the teeth in the print roll gear to the teeth in the rack segment 132 is changed, taking advantage of the angle of the helical teeth pattern cut into the print roll gear and rack segment. The helical teeth of the gear rack segment 132 on the support means for the compact disc tooling fixture act much like a ramp. By sliding the print roll gear in one direction, the teeth of the print roll gear rides on that ramp to lift the print roll. Sliding the print roll gear in the opposite direction causes the print roll to be lowered. Whether the print roll gear slides in one direction or the other on the gear rack segment, those skilled in the art will appreciate that the tangent point of the print roll gear is being slid on the rack segment. For example; referring to FIG. 13, if the print roll gear 326 is caused to move to the left, the print roll gear will rotate and the top of the print roll gear will move to the left because the axial center of the print roll gear is held constant by the fixed frame members 316, 318.

The fine radial adjustment is made much like the before disclosed lateral adjustment. The operator visually observes a printed compact disc and determines the registration of the colors one-to-another in a radial direction, i.e., in the direction of travel of the transport apparatus. Based upon this observation, the operator will enter into the computer the radial adjustment that need be made , e.g., of the color being printed by the first printing station relative to the fourth printing station, as these colors overlap. Thus, the operator may decide that a radial adjustment of 0.003 inches should be made. This adjustment is then entered into the computer and the computer controller then sends a signal to the radial adjustment motor to operate to make this adjustment. A printed compact disc may then again be visually observed to see if the desired results have been obtained. If not, then another radial adjustment is entered into the computer by the operator and the radial adjustment motor makes the adjustment. This is continued until the desired fine radial adjustment results. The making of lateral adjustments may be done at the same time and based upon the same visually observed printed compact disc.

Thus, as above-disclosed, a coarse lateral or radial adjustment of the print roll, hence print plate, can be made while setting up the print head for a printing run. During operation, and after setup, finer lateral and radial adjustments can be made to the print head to change the location of the images being printed on the surface of the compact disc at the different printing stations. The lateral adjustments are made to adjust the registration of the image being printed on the compact disc in a side-to-side relationship, relative to the outer edge of the compact disc tooling fixture. Radial adjustment are made to make a change in the registration of the decoration being printed in the direction of travel of the transport member. These fine adjustments are made by operation of the lateral or radial adjustment motors, these motors rotating the respective cams, the cam surfaces being in contact with the respective threaded adjustment screw members initially used in making the coarse adjustments.

Turning now to FIG. 14, there is disclosed in that figure another view of the printing station 300 shown in FIG. 13, this view being taken looking at the printing station from the left side in FIG. 13 and somewhat to the rear of the print roll. As shown in FIG. 14, there is provided a conventional anilox roll 372 having a radial gear (not shown) that meshes with the print roll gear 326 provided on the print roll 302 (neither the anilox roll nor the radial gear thereof being shown in FIG. 13). Those skilled in the art will readily appreciate that anilox roll 372 is provided on its peripheral surface with a multiplicity of small closely spaced, craters or ink pockets (not shown in the drawing as such forms no part of the invention, in and of itself). The size and spacing of these craters can be varied somewhat depending upon the fineness of the image desired and the darker the image is to be. In general the finer the image desired, the closer together should be the craters, and the darker the image desired, the deeper should be the craters. Although not specifically shown in the drawing, a ceramic sleeve is provided on the anilox roll as conventionally done. The craters are provided in the surface of the sleeve in this case rather than in the surface of the roll. Thus, the anilox roll can be used in a wide variety of applications by merely changing the sleeve, rather than having to replace one anilox roll with another having different size craters or craters which are spaced apart from one another either a greater or lesser distance.

As the anilox roll rotates counterclockwise through the reservoir 378 of ink these small craters are filled with ink. In continuing its rotation; excess ink is skimmed off the peripheral surface of the anilox roll by the doctor blade 382, leaving ink only in the craters. The anilox roll is then pressed against the print plate 308 on the print roll (FIG. 13) in a rolling fashion according to usual manner thereby transferring ink from the anilox roll craters to the decoration on the print plate. The print roll causes the print plate with the inked design thereon to roll against the compact disc to be printed, thereby transferring to the compact disc the inked design or decoration on the print plate. The anilox roll enters the ink reservoir again, passing the return doctor blade 380. This doctor blade is merely for the purpose of maintaining a seal between the surface of the anilox roll and the ink reservoir so as to prevent ink from leaking out of the reservoir. The craters are again filled with ink, this ink being transferred to the print plate, etc. until the entire run of compact discs has been printed. Other colors of ink are, of course, applied at other printing stations.

The ink used in the practice of the invention will depend somewhat upon what is being printed upon and the nature of the artwork or text being printed. Although, it is contemplated by the disclosure of the apparatus of FIG. 1 that UV-curing inks are to be used in the practice of the invention, those skilled in the art will appreciate that the invention is not so limited. In some cases, the ink used can be either a solvent-or water-based ink.

The print roll 302 is mounted to a framework so that it can be raised and lowered for purposes of setting up a print run e.g., installing a new printing plate, as hereinafter more fully disclosed, or for removing that printing plate from the print roll and for purposes of disabling the print head during a printing run, if that print head is not required. This is accomplished by the print head lift cylinders, only lift cylinder 356 being shown in the drawing. Nevertheless, it should be understood that a second lift cylinder is provided at the opposite end of the supporting framework for the print roll. Lift cylinder 356 is pivotally mounted at its bottom end to the frame member 384. The end of the piston rod 386 of lift cylinder 356 is pivotally mounted to the frame member 388 at the top.

At the top of the framework, as shown in FIG. 14, there is also pivotally mounted a cylinder 389 having a piston 391, the end 393 of which is pivotally connected to other framework. The latter framework supports the anilox roll 372 and is itself pivotally supported at 390, as later more fully disclosed. The framework supporting the anilox roll is disconnected from the framework supporting print roll 302 and the lift cylinder 356. The purpose of the cylinder 389 is to hold these two framework portions together and to act like a spring and reduce vibrations.

On activation of the lift cylinders, the framework supporting the print roll is raised, and lowered, as desired. When the lift cylinders are operated to raise the print roll the teeth of the print roll gear disengage with the teeth on the gear rack segment 132 provided on the support member. In such a case, the transport member can then be moved without causing rotation of the print roll. The operation of the lift cylinders can be done manually or by control means as desired, or both.

In operative association with the lift cylinders there is provided means for adjusting the nip between the printing plate 308 on the print roll and the surface of the compact disc 130 being printed (See FIG. 13). This nip adjustment means comprises a servo motor 392 mounted to the same framework as the lift cylinders. The purpose of this servo motor is to rotate the cam 394 which is in operative contact with the roller or bearing member 396. Thus, when the servo motor 392 is operated, it functions to make wider or closer the nip between the printing plate on the print roll and the surface of the compact disc tooling fixture. More about this nip adjustment later on. The bearing member 396 is mounted to a vertically disposed arm which, in turn, is mounted to the framework of the apparatus.

The anilox roll 372 is mounted to a framework, as earlier disclosed, so that it can be raised and lowered independently of the print roll when and as desired. Thus, the pinch or contact between the anilox roll and print plate can be adjusted. This is important so as to be able to control the transfer of ink from the anilox roll to the print plate. This adjustment of the pinch between the anilox roll and print roll is made on setup of the print head prior to printing a run of compact discs. As shown in FIG. 14, the anilox roll 372 is mounted to a framework that pivots on a horizontally disposed axis, denoted by reference numeral 390. The raising and lowering of the anilox roll 372 is accomplished by the pinch adjustment motor 404 provided at the top of the framework, as shown in the drawing. Connected to the motor 404 is a shaft (not shown) that is located within the opening (not shown) of the pinch adjustment cam 406, this opening varying in radius from 0.5 to 0.515 inches. Thus, on operation of the motor 404, the pinch between the anilox roll and the printing plate can be adjusted to provide more or less pressure contact of the anilox roll against the printing plate. This pinch is set manually on setup and a test run is made. If too much ink is being transferred by the anilox roll, the pinch is adjusted according to usual techniques known to those skilled in the art, to provide less contact with the printing plate.

The bearing 408 (FIG. 14) is mounted to the frame member 318, a like bearing (not shown) being mounted to the frame member 316 (FIG. 13) by means of an eccentric shaft that varies in radius from 0.500 to 0.520 inches. Thus, there is provided means, i.e., a no part/no print means, that moves the anilox roll out of contact with the print plate in the event that no compact disc is located in the tooling fixture that is approaching the printing station. The movement of the anilox roll out of contact with the printing plate is necessary in order that a layer of ink is not deposited on the printing plate without being transferred to a compact disc. This is important to keep the darkness of the image being transferred to the compact discs uniform. Accordingly, when no compact disc is picked up by the compact disc lifter, as earlier disclosed, this is sensed by the sensor 209 and such information is transferred according to conventional techniques to the computer control means (not shown). This computer controller then sends a signal to the print head to tell it that a compact disc is missing in a particular tooling fixture and that such tooling fixture is approaching the print head. Thus, this information causes a rotary actuator (not shown) to turn the eccentric shaft thereby lifting the anilox roll away from the print roll. That being the case, no ink is deposited on the printing plate.

As shown in FIG. 14, the reservoir 378 is fixedly connected to the doctor blade chamber adjust lever 398 which is mounted so as to pivot on shaft 400. Thus, the ink reservoir 378 can be moved out of sealing contact with the anilox roll 372 to either change the anilox roll or a sleeve thereon, or to change the ink in, or to again fill the reservoir with ink. In either case, however, the reservoir should be drained of any ink therein, according to usual manner in flexographic printing. Once positioned, whether rotated counterclockwise so as to be out of contact with the anilox roll, or to be placed in sealing engagement therewith, the reservoir 378 can be retained in that position by the turning the doctor blade adjust lever clamp 402. The ink reservoir, or closed ink cup, 378 is commercially available from Print Co. of Pulaski, Wis. Located below the ink reservoir 378 is a drip pan 395.

Figure 21:
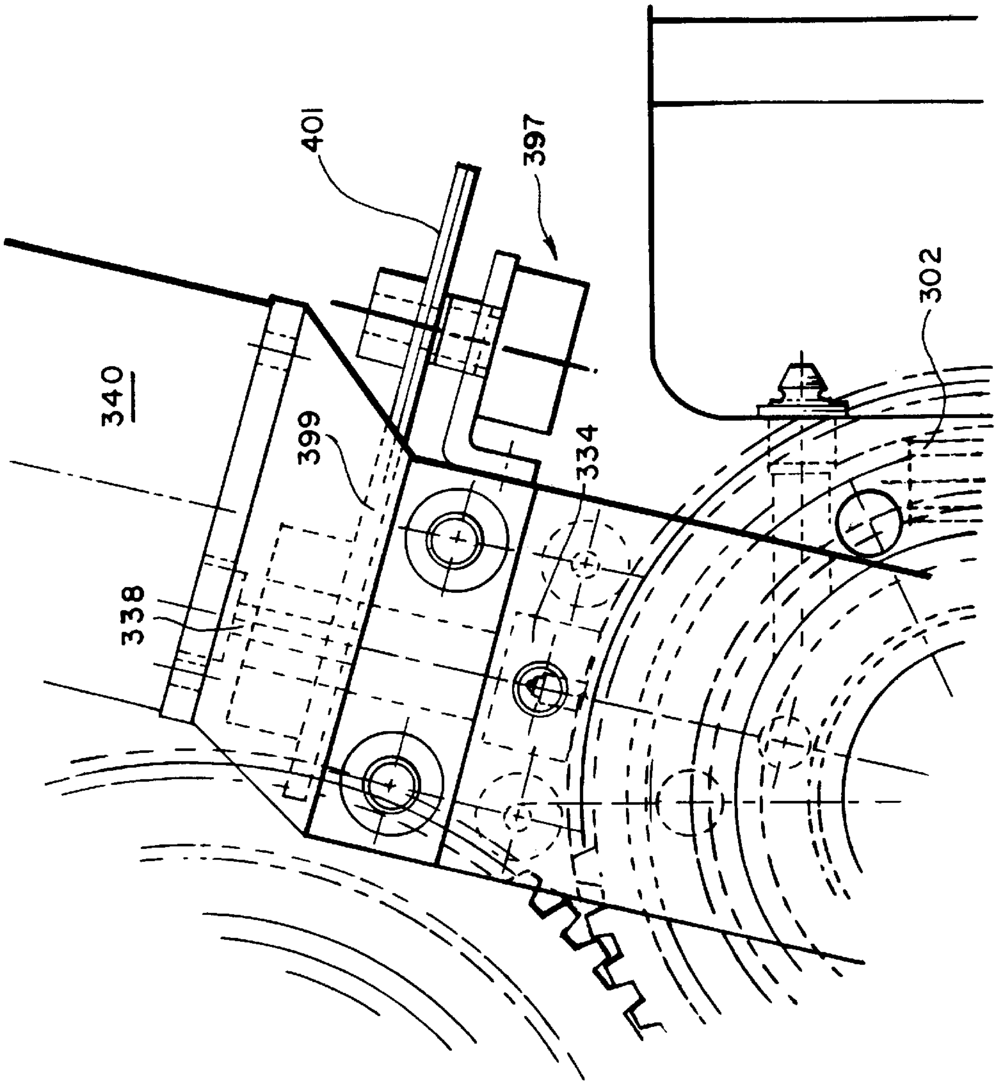
FIG. 21 is a partial view showing a potentiometer mounted to be in contact with the lateral and radial adjust motors whereby fine adjustment signals can be sent to a computer and called out later when the same printing job is again run.

In the more preferred aspect of the invention (FIG. 21), a conventional potentiometer 397 is mounted to be in contact with the lateral and radial adjust motors 340,342, only one of which is shown in the drawing. As shown in this figure of the drawing a conventional gear 399 is mounted on the shaft 338 of the lateral adjust motor 340, this gear meshing with a gear 401 mounted to the potentiometer. The potentiometers send signals to the computer as to any fine radial or lateral adjustment to the print roll during a particular printing run. Thus, the potentiometer allows the computer to know where it is set and to remember that setting so that if the same printing job is run again, the computer controller can be preset with the necessary fine lateral and radial adjustments.

When printing is to be done on flat piece parts, e.g., compact discs, as disclosed herein, by flexographic printing apparatus, the accuracy of the height of the print head, i.e., the printing plate surface above the top surface of the compact disc to be printed, is critical. That height need be repeatable within certain limits, preferably about 0.002 inches, so as to obtain uniform size and shape of dots in the printing of the compact discs. The height should be the same for each print head and for each of the compact discs being printed to provide uniformity in print from one compact disc to another.

Nevertheless, as well known by those skilled in the art of compact disc printing, the tooling fixtures for the compact discs are not all of the same height. Neither are the compact discs of the same thickness. Thus, in accordance with another aspect of this invention there is provided a means and a method for determining the relative height of one tooling fixture to another and to adjust the height of the print head, i.e., the print roll, to a nominal printing height relative to the compact disc tooling fixtures, prior to the printing of a compact disc. There is also made possible by this invention, in the preferred practice, means for determining the thickness of each compact disc to be printed, and to take that thickness into consideration along with the relative heights of the tooling fixtures in adjusting the print heads to a nominal height for printing. Thus, quite advantageously, greater uniformity in print and better quality is obtained.

In general, the height of the top surface of each compact disc tooling fixture on the transport apparatus is determined in a setup/calibration mode. This is accomplished according to usual techniques known to those skilled in the art using a conventional machinist's dial indicator accurate to 0.005 inches. Using the No. 1 compact disc fixture on the transport apparatus as a base, the relative height of each of the other compact disc tooling fixtures is determined. Thus, for example, if the height of the No. 1 tooling fixture on the transport apparatus is used as the base that height figure 0.000 is entered manually into a computer by an operator using a data base program, to establish a base line in the data base. Then, the relative heights of all the other tooling fixtures can be entered in the data base. Such a data base can be programmed by any competent programmer. The height entered in the data base for the first tooling fixture is then used as a nominal position to set the height of all the print heads, relative to each tooling fixture, in advance of a particular tooling fixture approaching that print station. Thus, a signal is sent by the controller to the servo motor 392 for adjusting the nip between the print roll and a compact disc tooling fixture top surface. This is done at each of the printing stations for each of the tooling fixtures.

As an example, if the height of the No. 2 tooling fixture on the transport apparatus is determined to be 0.002", the difference in height relative to that of the No. 1 tooling fixture is calculated manually. It can be either a positive or negative number. That relative height determination is then entered by the operator manually into the computer. This procedure continues until the relative heights of all the tooling fixtures compared to the No. 1 tooling fixture have been determined and entered into the data base. The height data is then called out by the computer controller at a later time, as needed, according to conventional techniques.

In general the height data in the data base in the computer is called out by the PC and a signal is then sent via the servo motor controller to the appropriate printing station in advance of a tooling fixture arriving at the station for printing of a compact disc. Thus, for example, if the height of the No. 1 tooling fixture is taken as the nominal height for the printing plate at printing station No. 1 above the top surface of all the tooling fixtures on the transport apparatus, no adjustment will be made in the height at printing station No. 1 for the arrival of the No. 1 tooling fixture, if that printing plate is already at the nominal height. Prior to the arrival of tooling fixture No. 2 at the No. 1 printing station, however, the height of the printing plate at that station relative to the tooling fixture No. 2 (i.e., the nip) is adjusted depending upon the relative height of tooling fixture No. 2 to the No. 1 tooling fixture. This process continues for each of the tooling fixtures on the transport apparatus as each approaches a printing station. The nip adjustment is made as one tooling fixture is leaving a printing station and the second one thereafter is approaching, as only every other compact disc is being printed. As any nip adjustment from the nominal height is relatively small the transport apparatus can be operated at a speed that allows this adjustment to be easily made. Yet the transport apparatus can be operated at a speed that allows for good productivity.

In the far more preferred aspect of the invention, the variation in thicknesses of the compact discs to be printed are taken into consideration in determining the height at which a printing plate should be in the printing of any compact disc, along with the variation in heights of the compact disc tooling fixtures. This thickness measurement can be determined by various means, as will be appreciated by those skilled in the art. It can readily be determined at some point shown in FIG. 1 of the drawing, before a compact disc is loaded onto the transportation apparatus, e.g., on the platen apparatus.

One manner of determining the thickness of a compact disc is to pass the compact disc in horizontal disposition between two proximity sensors located one above the other. The thickness of a compact disc is then determined in simple manner. The vertical distance between the two sensors is predetermined. The sensors each determine the distance that the sensor is from the respective top or bottom surfaces of the compact disc. The difference that the sensors are from one another minus the total of the differences that each sensor is from a surface of the compact disc is the thickness of the compact disc. Signals from these sensors as to their respective distances from the top surface of a compact disc are sent to the computer. The thickness of any particular compact disc to be loaded onto any particular tooling fixtures can then be tracked in conventional fashion by known computer technology. The thickness of the compact disc, for example, the compact disc loaded into the tooling fixture #1, is added to that height determination already in the data base for that tooling fixture, to provide the height that each print head should be from tooling fixture No. 1 and the compact disc located therein, i.e., the nip, for printing. A signal representing that total height determination is then sent to the nip adjusting motor 392 via the programmable computer controller. The height of the printing plate is then adjusted accordingly, as the No. 1 tooling fixture approaches each print head in turn.

Although not shown in the drawings, a so-called "Sunday Drive." motor is provided on the print head. Thus, a motor and gear is provided that turns the anilox roll at a slow speed when the compact disc transport apparatus is not moving. This allows a fresh layer of ink to be placed on the anilox roll constantly so that when the system is again started up the ink on the roll will not have set up or changed in its properties due to the anilox roll being idle. This feature of the invention is particularly important when printing with water- or solvent-base inks, as these inks dry much faster than UV-curable inks.

Also of importance to the practice of the invention is that the Sunday Drive motor can serve as a braking or drive motor to the print roll. Thus, by adjusting the current allowed to the motor, a drag can be placed on the print roll gear that meshes with the gear rack segment. This ensures that the contact of gear tooth to gear tooth is always on the same side of the backlash. As a result, the accuracy of the printing process is increased. Although such a feature is most important during stops and starts, printing accuracy may also be increased during the normal printing run where there is some fluctuation in the speed of the transport apparatus.

The printing system of the invention is placed into operation for printing a run of compact discs, in general as follows:

First, the print plates are made. In general to make print plates for full-color, i.e., half-tone printing, color separations are first made, according to conventional techniques. Thus, the colors of the artwork or image to be reproduced are separated by camera into each of the primary colors, either from the artwork itself or a color slide (transparency) of the artwork. In this way, a negative is obtained for each of the primary colors. These negatives are then used to make the color process film positives, cyan, magenta, and yellow. A black separation is also usually obtained from the original artwork or color slide. These four color process film positives can then be used in conventional manner to provide color film positives of all the colors to be reproduced in the image to be printed.

Registration marks are provided in usual manner on each of the color process film positives that are to be used in the printing process. This is done by merely providing elongated markings at 3, 6, 9, and 12 o'clock, these markings being provided outside the image area. The color process film positives obtained are then each used to expose a layer of light sensitive photopolymer provided on a printing plate. Afterwards, the printing plates are each washed to remove the unexposed photopolymer, leaving the desired image to be reproduced. The registration marks on the color film positives are also provided on the printing plate. A printing plate so obtained is then used to print each of the colors onto the compact disc or other piece part.

Meanwhile, a print plate sleeve is mounted to a mandrel the outer surface of the mandrel being provided with a layer of pressure-sensitive adhesive tape. The print plate is then located on the sleeve using a plate mounting apparatus made to hold a sleeve in a stationary position whereby the registration marks on the print plate can be aligned to a datum position. This is done by visually aligning the registration marks on the print plate with that position. Once the print plate is registered on the sleeve, the plate is pressed onto the pressure-sensitive adhesive tape applied to the sleeve whereby it is made secure, and will not unintentionally move. All print plates for printing the various colors are registered in the same manner. Thus, when the sleeves with print plates attached are placed on each respective print roll, the print plates will be in register, or only need slight adjustment. Whether an adjustment is to be made or not is determined by running a test run by passing a compact disk under each of the print rolls and then visually inspecting the compact disc for color registration In the event a color is out of the desired registration, e.g.,. cyan overlaps magenta in a lateral manner, a fine lateral adjustment of the print roll is made, as disclosed earlier, and another test run is made. The compact disc is again visually inspected for color registration Those skilled in the art will appreciate, however, that the vacuum as hereafter more fully disclosed, must be activated during this test run.

Following application of the print plates to the print plate sleeves, the sleeves are then each placed on the desired print roll. This is accomplished by lining up the cutouts commonly provided on the sleeve periphery with locating pins provided on the print rolls. Thus, with the print plates each registered in the same way on the mandrel, and the print plate sleeves each registered in the same manner on the print roll the print plates at each of the printing stations are in registration with one another.

The vacuum manifold or plenum 202 is then charged. This is accomplished by first activating the fixed vacuum source 174. Vacuum is thus delivered to one or more of the activated sprocket valves 214 (FIG. 17) via the rotary coupling 172 and the vacuum manifold 244. The vacuum is then transferred, through the activated sprocket valves, out to the sealing members 216 provided at the outlet sides of the sprocket valves. Vacuum is further transferred to the moving vacuum manifold via the activated sprocket valves by way of the check valves 218 operatively associated with a sealing member and an activated sprocket valve. The vacuum is then transferred, as later more fully made clear, from the moving vacuum manifold to the tooling fixtures, as and when needed, via an activated tooling fixture valve, to hold a compact disc in a precise location after registration for printing. See simplified schematic in FIG. 15. Although, the lengths of the flexible tubing connecting adjacent fixed vacuum manifold members together appear in this figure to be greater around the curved path of travel than in the straight runs, this should not be the case in practice.

After the print plates are installed on the print rolls, the print rolls are lowered so that the teeth of the print roll gears are placed in operative engagement with the teeth on the rack segment. The drive motor 190 for the drive chain for the transport apparatus is turned on. This causes rotation of the sprocket hub and the sprocket drive members. Those drive chain segments located in the cutouts of the sprocket drive members are caused to move whereby the segmented drive chain is caused to move. Thus, the compact disc transport apparatus is caused to move in the defined, continuous path of travel shown in FIG. 1 of the drawing.

On activation of the servo motor 190, the upper servo motor 166 is simultaneously activated to cause rotation of the pick-and-place or load/off-load apparatus. This, in turn, as will be best appreciated from FIG. 2 of the drawing, causes rotational movement of the drive chain sprocket 192 which is connected to the shaft of the pneumatic coupling 170. The drive chain sprocket 192 rotates the drive chain 194 which links the load/off-load apparatus to the platen apparatus via the platen apparatus driven chain sprocket 196. The driven chain sprocket is fixedly mounted to the rotatable shaft 198 of the platen apparatus. Thus, the platen apparatus is placed in operation, the platen body member being rotated in clockwise manner, the same as is the load/off-load apparatus, the two being linked together operate at the same speed.

As the segmented drive chain wraps around the sprocket hub, three-four sprocket valves are activated, i.e., opened, to transfer vacuum to the associated check valve by making use of the relative axial motion of the chord created by a rigid drive chain segment 48 as the check valve mounted thereto comes into contact with the ball of the ball-activated sprocket valve in moving along the curved path 24. This is shown in greatly simplified manner in FIG. 17 of the drawing.

The sealing member-check valve contact surface should be located at the pitch diameter of the sprocket drive member to minimize any relative motion between the sealing member and the check valve. If the sealing member-check valve contact surface is inside the pitch diameter of the sprocket drive member, the sealing member-check valve contact point will lag the fully engaged point as the top and bottom rollers of the drive chain segment are coming into engagement with the sprocket drive members and lead as the drive chain segment is leaving the sprocket drive members. In either case vacuum will be lost.

In the preferred aspect of the invention, as above disclosed, the sprocket valves are placed on the pitch line of the sprocket drive members, i.e., the line that passes through the center of the cut-outs of the sprocket drive members, as above-disclosed. Nevertheless, in a somewhat less preferred aspect of the invention, in order to keep the sealing member in tight contact with the check valve and to eliminate any relative motion between the two, a slide mechanism can be provided which allows motion of the sealing member perpendicular to the axis of the sprocket valve and in line with the rotation of the sprocket. Such a sealing member should be biased to lag the center point of its sliding mechanism coming onto the sprocket members and allowed to be pulled by the check valve to lead as the drive chain segment leaves the cut-outs of the sprocket drive members. The design of such a slide mechanism to work as disclosed is believed well within the skill of those in the art.

The check valves 218 allow vacuum to be maintained in the moving vacuum manifold when the check valves are not in contact with the sprocket valves and only allow vacuum to be drawn by the fixed vacuum source when the vacuum at the source is at a lower pressure than that of the vacuum manifold. A constant vacuum source can be maintained to the vacuum manifold by mounting an appropriate number of sprocket valves around the circumference of the sprocket hub so that at least one sprocket valve is always actuated and sealed to a check valve allowing vacuum to be drawn through it. Although, the vacuum system has been earlier disclosed to be charged after preparation of the print plates, those skilled in the art will readily appreciate that the vacuum system can first be charged and then the print plates prepared, if desired. Or such processes can be going on at the same time.

The sender apparatus is then activated. A signal is sent from the PC programmable controller that tells the pistons to fire on the arm 141. Thus, the compact disc pickup member is caused to move downwardly to pickup the top most compact disc in the stack of discs on the sender apparatus, that has been previously indexed into position. A signal from the controller then tells arm 141 to rotate and to place the compact disc onto an empty location pin of the platen apparatus 142. The platen apparatus then indexes clockwise until the platen pin on which the compact disc has been placed is in a dwell position, i.e., momentarily sitting still beneath a compact disc lifter 156 on one of the arms 154 of the load/off-load apparatus 144 (See FIG. 1) for about a third of the cycle of the apparatus.

A signal is sent to the profibus to operate the appropriate valves to supply compressed air to the compact disc lifter 156 on that arm, this air being passed through the fitting 177 and its mate into the cavity of the compact disc lifter. The air supplied is then deflected outwardly across the top of the deflector plate member and flows outwardly to the atmosphere through the multiplicity of saw toothed openings provided along the peripheral edge of the deflector plate member. This causes a high flow of air providing a venturi effect and creating a vacuum between the bottom of the deflector plate member and the top of the compact disc beneath it on the platen apparatus. This vacuum causes the compact disc to be lifted off the platen pin and to be drawn up into the cavity of the compact disc lifter.

At the same time that compressed air is passing through the saw-toothed periphery, compressed air is also escaping through the openings 277 provided in the deflector plate. This provides a cushion of air between the bottom of the deflector plate member and the top of the compact disc being pulled up into the cavity of the compact disc lifter. See FIG. 6. On being sucked up into the cavity of the compact disc lifter, the annular-shaped surface 293 of the body member 159 engages the compact disc around the center hole 204 (FIG. 18) of the compact disc. The plastic nose engages the centerhole of the compact disc. The periphery of the compact disc engages the beveled surface at the bottom peripheral edge of the deflector plate.

The load/off-load apparatus 144 is then brought up to speed so that the speed of the compact disc lifter matches the speed and relative position of an empty compact disc tooling fixture at location "A" (See FIG. 1) via a signal from the controller to the servo motor 166. Thus, the nose 179 of the elongated pin 175 is located directly above and in contact with the tubular-shaped registration pin 129 on the tooling fixture with the central spring 207 being depressed slightly. The compressed air flow to the compact disc lifter 156 is then caused to be shut off by the controller whereby the vacuum holding the compact disc 130 within the cavity of the compact disc lifter is released. Thus, the compact disc is deposited, i.e., loaded, onto the tooling fixture. The deposit of the compact disc onto the tooling fixture is aided by the cushion of air in the cavity on the top side of the compact disc. At this time, a cam (not shown) associated with the tooling fixture valve 228 causes the valve to be opened whereby vacuum is transferred from the moving vacuum manifold 202 and is supplied to the tooling fixture 128 and to the bottom of the compact disc. As a result, the compact disc is held in place for printing and other work to be performed thereon until it is ready to be off-loaded.

Meanwhile the no part/no print apparatus, which may have been previously activated prior to the start of the print run, so that the anilox roll is out of contact with the print plate is again activated to place the anilox roll in contact with the printing plate. The print roll gear and gear rack segment, if not engaged because of setup, are engaged at the time that compact discs are being sent to the platen apparatus, or before. A signal is sent from the controller to operate the servo motor 392 to set the nip height. Even when the anilox roll is not in contact with the printing plate, the print roll gear and rack segments may be in operative engagement with one another. If sensor 209 senses that no compact disc has been picked up by the compact disc lifter, a signal is sent to the controller and in turn relayed to the printing station, to tell the no part/no print apparatus to operate to place the anilox roll out of contact with the printing plate.

Prior to being loaded onto the tooling fixture, the thickness of the compact disc is determined and a signal is sent to the computer whereby that thickness determination is added to the relative height of the tooling fixture transporting the compact disc that has already been entered into a data base. This combined height determination is then sent by signal to the print head, in advance of that compact disc approaching for printing, so that the height of the print plate to the compact disc surface, i.e., the nip, can be adjusted to a previously determined nominal height. This height adjustment is made for each of the tooling fixtures and compact discs being printed and at each of the printing stations.

From time-to-time, during the printing run, a compact disc is recovered and a visual inspection is made thereof to determine whether or not the colors or decorations being applied by the print rolls to the compact disc surface are placed in the proper registration to one another within design requirements and without any overlapping. If not, a change is entered into the computer by the operator and a signal sent to the lateral and radial adjustment motors to make the necessary adjustments.

The off-load cycle for a compact disc is essentially the reverse of the loading cycle just described. The vacuum holding the compact disc on the tooling fixture is first released. This is accomplished by action of a mechanical cam which opens the exhaust side of the tooling fixture valve mounted to the underside of the tooling fixture to the atmosphere. The load/off-load apparatus 144 is brought up to speed so as to match that of the transport apparatus. The nose of the elongated pin 175 is provided in position directly over the registration pin of the compact disc tooling fixture for the compact disc that is to be off-loaded. A short blast of compressed air is introduced at the same time into the elongated pin in the compact disc lifter. This blast of compressed air passes out the nose of the pin into the passageway in the registration pin, down through a passageway provided in the support post for the tooling fixture valve to the exhaust side of the tooling fixture valve and then up again to the registration pin and out to atmosphere. This short blast of compressed air ensures that any residual vacuum is broken, allowing the compact disc to be freely lifted off the tooling fixture.

At the same time compressed air is introduced to the compact disc lifter where it is deflected outwardly by the deflector plate member through the multiplicity of saw toothed openings provided on its peripheral edge. This creates a vacuum on the top side of the compact disc which is to be: off-loaded whereby the compact disc is lifted upwardly off the tooling fixture registration pin and into the cavity in the compact disc lifter. The body member 191, at the same time, is caused to move vertically downwardly by the roller 215 on the compact disc lifter, this causing the body member 159 to move downwardly, and the deflector plate member to be placed in close proximity to the top surface of the compact disc. The annular-shaped bottom surface 293 of body member 159 engages the top surface of the compact disc and the nose 179 of the elongated pin 175 intrudes into the centerhole of the compact disc.

As shown in FIG. 1, the compact disc is picked up from the tooling fixture as the support member 118 for the tooling fixture begins its movement around the curved path at the sprocket end. The arm with the compact disc thereon continues its rotation until it is in position to place the compact disc onto an empty location pin on the platen apparatus. The platen apparatus continues its clockwise rotation until it reaches the point where the arm 153 of the receiving apparatus picks it off the platen pin. At that time, a signal is sent to the servo motor 166 to cause the compact disc lifter to dwell momentarily over the platen apparatus for about a third of the cycle of the operation. A signal is sent by the controller to fire the piston on the arm of the receiver apparatus whereby the pickup member picks up the compact disc. Subsequently, a signal is sent to the rotary actuator and the arm 153 is rotated and the pickup member operated to place the compact disc on a spindle on the receiver apparatus to provide a stack of compact discs.

The platen apparatus 142 provides a dual function, as earlier disclosed: it serves to transfer compact discs one-at-a-time from the sending apparatus 138 to the pick-and-place, i.e., loading/off-loading, apparatus 144, and from the pick-and-place apparatus to the receiving apparatus 140. As shown in FIG. 1, two compact disc lifters 156 are at all times located over a location pin 150 on the platen apparatus. The pick-and-place apparatus works on demand. It must be ready when a compact disc is there (i.e., on a platen pin) or a space is open, i.e., no compact disc is located on a platen location pin. Because the compact discs are moving at a constant velocity on the transport member, as determined by the velocity of the segmented drive chain, and any relative sideways motion of the compact disc might induce scratching on the read side of the compact disc, it is important that the platen apparatus and the pick and place apparatus are moving at the same relative velocity as the transport member, when a compact disc is being loaded onto, or off-loaded from, the transport apparatus. Those skilled in the art will readily appreciate that the operation of the sending and receiving apparatus, the platen apparatus, and the pick-and-place apparatus must be synchronized to perform the functions assigned to them. The manner in which these functions are accomplished is believed to be well within the skill of the art.

As will be understood by those skilled in the applicable arts, various modifications and changes can be made in the invention and its particular form and construction without departing from the spirit and scope thereof. The embodiments disclosed herein are merely exemplary of the various modifications that the invention can take and the preferred practice thereof. It is not, however, desired to confine the invention to the exact construction and features shown and described herein, but it is desired to include all such as are properly within the scope and spirit of the invention disclosed and claimed.

What is claimed is:

1. A method of loading one of a plurality of flat piece parts onto a tooling fixture provided on a continuously moving transport member while simultaneously off-loading a flat piece part from a tooling fixture on said continuously moving transport member comprising the following steps:

(a) providing a continuously moving transport member, a plurality of spaced-apart tooling fixtures being provided on said transport member;

(b) providing means for continuously driving said continuously moving transport member at a predetermined speed;

(c) providing pick-and-place apparatus in operative association with said continuously moving transport member, said apparatus comprising a rotatable body member, a plurality of elongated arms extending radially outwardly from said rotatable body member, a distal end defining each of the plurality of elongated arms, a flat piece part lifter being provided at the distal end of each of said plurality of elongated arms;

(d) providing means for rotatably driving said rotatable body member of said pick-and-place apparatus at a desired speed;

(e) bringing the speed of said rotatable body member of said pick-and-place apparatus up to match the speed of an empty flat piece part tooling fixture on the continuously moving transport apparatus whereby a flat piece part lifter on one of said plurality of elongated arms is in the same relative position as an empty tooling fixture on said continuously moving transport member and a flat piece part lifter on another of said plurality of elongated arms is in the same relative position as a flat piece part on another of said plurality of flat piece part tooling fixtures; and (f) picking up a flat piece part with one of said flat piece part lifters and placing said flat piece part picked up onto an empty flat piece part tooling fixture on said continuously moving transport member and, at the same time, picking up a flat piece part from a flat piece part tooling fixture on said continuously driven transport member with another of said flat piece part lifters.

2. A method according to claim 1 further comprising providing sending apparatus, a top planar surface being provided on said sending apparatus and at least one vertically disposed stack of a plurality of compact discs being provided on said top surface, a top most compact disc being provided in said at least one vertically disposed stack of a plurality of compact discs.

3. A method according to claim 2 further comprising providing receiving apparatus, a top planar surface being provided on said receiving apparatus, and at least one vertically disposed spindle being provided on said receiving apparatus top planar surface for aligning a plurality of compact discs into at least one vertically disposed stack of compact discs.

4. A method according to claim 3 further comprising providing rotatable means, a plurality of vertically disposed circular-shaped pins being provided on said rotatable means, said rotatable means being provided in operative association with said sending and receiving apparatus and with said pick-and-place apparatus.

5. A method according to claim 4 further comprising picking up a top most compact disc from said at least one stack of compact discs and placing said top most compact disc picked up on one of said plurality of vertically disposed circular-shaped pins provided on said rotatable means.

6. A method according to claim 5 further comprising rotating said rotatable means to place said top most compact disc picked up below a compact disc lifter provided on the distal end of one of said plurality of elongated arms on said pick-and-place apparatus for picking up said top most compact disc while at the same time placing a compact disc lifter provided on another of said plurality of elongated arms above one of said plurality of vertically disposed circular-shaped pins provided on said rotatable means for placing another compact disc onto another of said plurality of vertically disposed pins.

7. A method of loading a flat piece part onto a tooling fixture provided on a continuously moving transport member comprising the following steps:

(a) providing a transport member, a plurality of spaced-apart empty, tooling fixtures being provided on said transport member;

(b) providing means for driving said transport member at a predetermined continuous speed;

(c) driving said transport member continuously at said predetermined continuous speed;

(d) providing pick and place apparatus in operative association with said transport member comprising a rotatable body member, a plurality of equally spaced-apart elongated arms each of equal length being connected to and extending radially outwardly from said rotatable body member, a distal end defining the end of each of the plurality of elongated arms, a flat piece part lifter being provided at the distal end of each of said plurality of elongated arms for picking up a flat piece part;

(e) picking up a flat piece part with one of said flat piece part lifters;

(f) providing means for rotatably driving said pick-and-place apparatus;

(g) driving said pick-and-place apparatus whereby to bring the speed of said pick-and-place apparatus up to match the speed of one of said plurality of empty flat piece part tooling fixtures on the continuously moving transport member whereby said flat piece part picked up by said flat piece part lifter is in the same relative position as said one of said plurality of empty piece part tooling fixtures on said continuously moving transport member; and (h) placing said flat piece part picked up onto said one of said plurality of empty flat piece part tooling fixture on said continuously moving transport member.

8. A method of loading a flat piece part onto an empty tooling fixture on a continuously moving transport member comprising the following steps:

(a) continuously driving a transport member at a predetermined speed, a plurality of spaced-apart empty tooling fixtures being provided on said transport member;

(b) providing pick and place apparatus in operative association with said transport member comprising a rotatable body member, a plurality of elongated arms being connected to and extending radially outwardly from said rotatable body member, a distal end defining the end of each of said plurality of elongated arms, a flat piece part lifter being provided at the distal end of each of said plurality of elongated arms for picking up a flat piece part;

(c) picking up a flat piece part with one of said flat piece part lifters;

(d) rotatably driving said pick-and-place apparatus whereby to bring the speed of said pick-and-place apparatus up to match the speed of said continuously moving transport apparatus whereby said flat piece part picked up by said flat piece part lifter is in the same relative position as one of said plurality of empty tooling fixtures on said continuously moving transport member; and (e) placing said flat piece part picked up onto said one of said empty flat piece part tooling fixtures on said continuously moving transport member.

9. A method according to claim 8 further comprising driving said continuously moving transport member in an oval defined path of travel.

10. A method according to claim 9 further comprising rotatably driving said pick-and-place apparatus whereby said flat piece part lifters define a circular path of travel.

11. A method according to claim 10 wherein the continuously moving transport member and pick-and-place apparatus are both driven in a clockwise direction of travel.

12. A method according to claim 8 wherein a flat piece part is placed on every other one of said plurality of tooling fixtures.

13. A method according to claim 8 further comprising providing rotatable means in operative association with said pick-and-place apparatus, a plurality of vertically disposed circular-shaped pins being provided on said rotatable means defining the circumference of a circle and a circular-shaped opening being provided in each of said plurality of flat piece parts and driving said rotatable means in clockwise manner so as to match the speed of said pick-and-place apparatus, the speed of said pick-and-place apparatus being such as to match the relative velocity of said continuously moving transport member at the time that a flat piece part is placed onto said one of said plurality of empty tooling fixtures.

14. A method according to claim 13 further comprising providing sending apparatus, a top planar surface being provided on said sending apparatus and at least one vertically disposed stack of a plurality of flat piece parts being provided on said top surface, a top most flat piece part being provided in said at least one vertically disposed stack of a plurality of flat piece parts and picking up said top most flat piece part from said at least one stack of flat piece parts and placing said top most flat piece part picked up on one of said plurality of vertically disposed circular-shaped pins provided on said rotatable means.

15. A method according to claim 14 further comprising rotating said rotatable means to place said top most flat piece part picked up below a flat piece part lifter provided on the distal end of one of said plurality of elongated arms on said pick-and-place apparatus whereby said top most flat piece part is picked up by said flat piece part lifter.

16. A method for loading a compact disc onto an empty tooling fixture provided on a continuously moving transport member comprising:

providing a transport member, a plurality of empty tooling fixtures being provided on said transport member;

providing pick-and place apparatus for picking up a compact disc from a predetermined location and for transferring it to another predetermined location and for loading said compact disc onto one of said plurality of empty tooling fixtures;

providing means for independently driving said transport member and said pick-and-place apparatus;

driving said transport member at a predetermined continuous speed in a predetermined path of travel;

picking up a compact disc with said pick-and-place apparatus for loading onto one of said plurality of empty tooling fixtures;

rotatably driving said pick-and-place apparatus at a speed whereby to provide said compact disc at a relative velocity equal to that of the continuously moving transport member;

locating said compact disc in a position above that of said one of said plurality of empty tooling fixtures; and loading said compact disc onto said one of said plurality of empty tooling fixtures.

* * * * *